United States Patent
Rao et al.

(10) Patent No.: US 11,673,788 B2
(45) Date of Patent: Jun. 13, 2023

(54) BEVERAGE DISPENSING AND MONITORING SYSTEM

(71) Applicant: LAB2FAB, LLC, Fremont, CA (US)

(72) Inventors: Krishna Rao, San Ramon, CA (US); Shawn Lange, Walnut Creek, CA (US); Derek Pietz, San Jose, CA (US)

(73) Assignee: Lab2Fab, LLC, Fremont, CA (US)

( * ) Notice: Subject to any disclaimer, the term of this patent is extended or adjusted under 35 U.S.C. 154(b) by 520 days.

(21) Appl. No.: 16/780,793

(22) Filed: Feb. 3, 2020

(65) Prior Publication Data

US 2020/0247661 A1    Aug. 6, 2020

Related U.S. Application Data

(60) Provisional application No. 62/891,239, filed on Aug. 23, 2019, provisional application No. 62/819,326, (Continued)

(51) Int. Cl.
  *G06Q 10/08* (2023.01)
  *G05B 19/042* (2006.01)
  (Continued)

(52) U.S. Cl.
  CPC .............. *B67D 1/0888* (2013.01); *A21B 1/42* (2013.01); *A23L 5/10* (2016.08); *G05B 13/0265* (2013.01); *G05B 19/0428* (2013.01); *G05B 19/4183* (2013.01); *G05B 19/4188* (2013.01); *G05B 19/41865* (2013.01); *G05B 19/41875* (2013.01);
  (Continued)

(58) Field of Classification Search
  CPC ..... B67D 1/0888; A23L 5/10; G05B 13/0265; G05B 19/0428; G05B 19/4183; G05B 19/41865; G05B 19/41875; G05B 19/4188; G05B 2219/24015; G05B 2219/2645;
  (Continued)

(56) References Cited

U.S. PATENT DOCUMENTS 2,642,207 A    6/1953   Renzi
3,920,149 A    11/1975  Fortino et al.
(Continued)

FOREIGN PATENT DOCUMENTS

CN    101044956 A    10/2007
CN    107531475 A    1/2018
(Continued)

OTHER PUBLICATIONS

"Understanding APIs", Red Hat, Published Jun. 29, 2018 https://www.redhat.com/en/topics/api#:~:text=APIs%20are%20about%20integration%E2%80%94the,one%20another%20or%20anyone%20else's. (Year: 2018).
(Continued)

*Primary Examiner* — Peter Ludwig
*Assistant Examiner* — Reva R Moore
(74) *Attorney, Agent, or Firm* — Van Hoven PC; Joshua Van Hoven

(57) ABSTRACT

A beverage operations control system of an establishment such as a bar communicates with numerous wireless beverage control devices that monitor and control the pouring of beverages. The system provides monitoring and predictive analysis based on the monitoring, including real-time modifications to the operations of the beverage control devices.

40 Claims, 51 Drawing Sheets

Related U.S. Application Data filed on Mar. 15, 2019, provisional application No. 62/800,380, filed on Feb. 1, 2019.

(51) Int. Cl.

| | | |
|---|---|---|
| *B67D 1/08* | (2006.01) | |
| *G05B 13/02* | (2006.01) | |
| *G06Q 20/20* | (2012.01) | |
| *A23L 5/10* | (2016.01) | |
| *G05B 19/418* | (2006.01) | |
| *G06Q 50/12* | (2012.01) | |
| *A21B 1/42* | (2006.01) | |

(52) U.S. Cl.
CPC ............. *G06Q 20/20* (2013.01); *G06Q 50/12* (2013.01); *G05B 2219/24015* (2013.01); *G05B 2219/2645* (2013.01)

(58) Field of Classification Search
CPC .... G06Q 20/20; G06Q 50/12; G06Q 10/0631; G06Q 10/087
See application file for complete search history.

(56) References Cited

U.S. PATENT DOCUMENTS

| | | | |
|---|---|---|---|
| 4,877,066 | A | 10/1989 | Okamizu |
| 5,255,819 | A | 10/1993 | Peckels |
| 5,318,197 | A | 6/1994 | Martindale |
| 6,354,468 | B1 | 3/2002 | Riek |
| 8,869,847 | B2 | 10/2014 | Browne-Wilkinson |
| 9,428,374 | B2 | 8/2016 | Houck et al. |
| 9,718,665 | B2 | 8/2017 | Wittrup et al. |
| 9,821,997 | B2 | 11/2017 | Zapp |
| 10,031,505 | B2 | 7/2018 | Martindale et al. |
| 10,072,964 | B2 | 9/2018 | Gurumohan et al. |
| 10,267,667 | B2 | 4/2019 | Gurumohan et al. |
| 11,247,891 | B1 | 2/2022 | Hempy et al. |
| 2007/0214055 | A1* | 9/2007 | Temko ................. G06Q 20/203 705/22 |
| 2008/0178749 | A1 | 7/2008 | Stutman |
| 2009/0277931 | A1 | 11/2009 | Zapp |
| 2011/0036873 | A1 | 2/2011 | Peckels |
| 2014/0034686 | A1 | 2/2014 | Guerette et al. |
| 2014/0144935 | A1 | 5/2014 | Okeefe et al. |
| 2014/0272816 | A1 | 9/2014 | Callahan |
| 2014/0324607 | A1 | 10/2014 | Frehn et al. |
| 2014/0351068 | A1 | 11/2014 | Renfroe |
| 2016/0023804 | A1 | 1/2016 | Tuyls et al. |
| 2016/0096717 | A1* | 4/2016 | Keating ............... B67D 3/0041 222/1 |
| 2017/0024789 | A1 | 1/2017 | Frehn et al. |
| 2017/0121063 | A1 | 5/2017 | Ledun et al. |
| 2017/0210610 | A1 | 7/2017 | Henson et al. |
| 2017/0290345 | A1 | 10/2017 | Garden et al. |
| 2018/0265344 | A1 | 9/2018 | Keating et al. |
| 2020/0249660 | A1 | 8/2020 | Rao et al. |
| 2022/0048752 | A1 | 2/2022 | Hempy et al. |
| 2022/0177292 | A1 | 6/2022 | Hempy et al. |

FOREIGN PATENT DOCUMENTS

| | | |
|---|---|---|
| CN | 108983654 A | 12/2018 |
| TW | 201740340 A | 11/2017 |

OTHER PUBLICATIONS

International Search Report and Written Opinion received for PCT Patent Application No. PCT/US2020/016439, dated May 27, 2020, 10 pages.

International Search Report and Written Opinion received for PCT Patent Application No. PCT/US2021/045402, dated Nov. 24, 2021, 14 pages.

The Editors of Encyclopedia Britannica, "Data structure", Britannica Jan. 2, 2018 https://web.archive.org/web/20180102152326/ https://www.britannica.com/technology/data-structure (Year: 2018).

Nicola La Gloria, "CloudFlo—The Next Generation Liquor Dispensing System Featuring Java Embedded", https://docs.huihoo.com/javaone/2012/CON11072-Liquor-Dispensing-and-Management-Systems-Featuring-Java-SE-7-Embedded.pdf, 33 pages, Dec. 30, 2012.

"Skyflo Brings Latest Technology to Bar P&L While Respecting On-Premise Culture", https://totalfood.com/skyflo-brings-latest-technology-bar-onpremise-culture, 4 pages, Sep. 20, 2018.

"Skyflo (TM) Wireless Bar Control", https://web.archive.org/web/20180816102006if_http://kipflo.com/img/Brochure%20-%20Skyflo%20Products.pdf, 8 pages, Aug. 16, 2018.

International Search Report and Written Opinion in PCT/US2020/016437 dated May 27, 2020.

* cited by examiner

Features
- Connect to Spouts
- Cloud Data Streaming
- Continuous Monitoring
- Live Status
- Real-Time / Scheduled Alerts

FIG. 25

| Beverag.. | \<-- June --\> | | | | | | | | | | | | \<-- July --\> | | | | | | | | | | Grand Total |
|---|---|---|---|---|---|---|---|---|---|---|---|---|---|---|---|---|---|---|---|---|---|---|---|
| | 15 | 16 | 17 | 18 | 19 | 20 | 22 | 23 | 27 | 28 | 29 | 30 | 1 | 2 | 3 | 4 | 5 | 6 | 8 | 9 | 10 | 12 | |
| Bombay | *3 | | | | *8 | | | | | | | | | | | | | *1 | | | | | *38 |
| Captain Morgan | | *5 | | *4 | | *1 | *3 | | | | *2 | *5 | | | | *4 | | | | | | | *22 |
| Centenario | *5 | | | | | | | | | | | *6 | | | | *1 | | | | *1 | | | *30 |
| Crown Royal | | *3 | | *8 | *4 | | | | | | *8 | | | | | | | | | | | | *58 |
| Don Julio 1942 | | *1 | | | *2 | | | | | | | | | | | | | | | | | | *9 |
| Don Julio Blanco | | | | | | | | | | | | | | | | | | | | | | | *66 |
| Hornitos Reposado | | | | | | | | | | | | | | | | | | | | | | | *5 |
| | | | | | | | | | | | | | | | | | | | | | | | *31 |
| | *1 | | | | | | | | | | *2 | | | | | | | | | | | | *304 |
| | | | | | | | | | | | | | | | | | | | | | | | *13 |
| | | | | | | | | | | | | | | | | | | | | | | | *125 |
| | | | | | | | | | | | | | | | | | | | | | | | *267 |
| Jameson | | | | | | | | | | | | | | | *1 | | *4 | | | *2 | | | *6 |
| Ketel One | | | | | | | | | | | *5 | | | | | | | | | | | | *50 |
| Milagro | | | | | | | | | | | | | | | | | | | | | *4 | | *12 |
| Patron Silver | | | | | | | | | | | | | | | | | | | | | | | *24 |
| Titos | | | | | | | | | | | | | | | | | | | | | | | *6 |
| | | | | | | | | | | | | | | | | | | | | | | | *304 |
| | | | | | | | | | | | | | | | | | | | | | | | *143 |
| Grand Total | 66 | 62 | 28 | 37 | 81 | 106 | 80 | 186 | 18 | 71 | 60 | 69 | 25 | 28 | 89 | 27 | 25 | 21 | 25 | 57 | 27 | | 1,513 |

FIG. 32

Day of Pour

| Beverag.. | June | | | | | | | | | | | | | | | July | | | | | | | | | | | | | Grand Total |
|---|---|---|---|---|---|---|---|---|---|---|---|---|---|---|---|---|---|---|---|---|---|---|---|---|---|---|---|---|---|
| | 15 | 16 | 17 | 18 | 19 | 20 | 22 | 23 | 27 | 28 | 29 | 30 | 1 | 2 | 3 | 4 | 5 | 6 | 8 | 9 | 10 | 11 | 12 | | | | | | |
| Bombay | ×1 | | | | ×1 | | | | | | | | | | | | | | | | | | | | | | | | ×5 |
| Captain Morgan | | | | | | | | | | | | | | | | | | | | | | | | | | | | | |
| Centenario | ×2 | | | ×4 | | ×4 | ×1 | | | | | | | | | | | | | ×1 | | | ×6 | | | | | | ×6 |
| Crown Royal | | ×2 | | | | | | | | | | | | | | | | | | | | | ×2 | | | | | | ×1 |
| Don Julio 1942 | | | | ×4 | ×12 | | ×2 | | | | | | | | | | | | | | | | | | | | | | |
| Don Julio Blanco | ×4 | ×5 | | | | | ×1 | | | | ×1 | | | ×3 | | | | | | | | | | | | | | | ×6 |
| Hornitos Reposado | ×10 ×8 | | | | | ×10 | | | ×3 ×2 | | | | | | ×3 | | | | | | | | | | | | | | ×18 ×70 |
| Jameson | | | | | | | | | | | | ×1 | | | | | | | ×1 | | | | | | | | | | ×2 |
| Ketel One | | | | | | | | | | | | | | | | | | | | | | | | | | | | | |
| Milagro | ×1 | | | | | | | | | ×1 | | | | | | | | | | | | | | | | | | | ×1 |
| Patron Silver | | | | | ×8 ×7 | | ×7 | | | ×1 ×1 | | | | | | | | ×1 | ×1 | ×1 | ×2 | | | | | | | | ×78 |
| Titos | | | | ×9 | | | | | | | | | | | ×2 | | | | | | | | | | | | | | ×30 |
| Grand Total | 19 | 19 | 12 | 11 | 13 | 41 | 17 | 6 | 19 | 12 | 9 | 6 | 9 | 18 | 3 | 3 | 3 | 3 | 1 | 3 | 11 | 3 | | | | | | | (347) |

FIG. 33

| Beverage... | Day of Pour | | | | | | | | | | | | | | | | | Grand Total |
|---|---|---|---|---|---|---|---|---|---|---|---|---|---|---|---|---|---|---|
| | June | | | | | | | | | | | | | | July | | | |
| | 15 | 16 | 17 | 18 | 19 | 20 | 21 | 22 | 23 | 25 | 26 | 27 | 28 | 29 | 1 | 2 | 3 | 11 | |
| Centenario | | | | | | | | | | | | | | | | | | | 4oz $25 |
| Crown Royal | | | | | | | | 2oz $9 | | | | | | | | | | | 5oz $26 |
| Don Julio 1942 | | | | | | | | | | | | | | | 1oz $30 | | | | 1oz $30 |
| Don Julio Blanco | 2oz $28 | | | | 2oz $22 | | | | | | | | | | | | | | 2oz $22 |
| Hennesy | | | | | 6oz $45 | | | | 4oz $53 | | | | 3oz $28 | | 3oz $39 | | | | 18oz $211 |
| Jack Daniels | | | | | | | | | | | | | | | | | | | 4oz $32 |
| Jameson | | | 2oz $28 | | | | | | | | | | | | | 1oz $23 | | | 26oz $197 |
| Patron Silver | | | | | 2oz $13 | | | | 6oz $27 | 5oz $49 | | | | | | | 5oz $49 | | 41oz $429 |
| Titos | | | | | | | | | | | | | | | | | | | 10oz $50 |
| Grand Total | 5oz $63 | 6oz $47 | 3oz $56 | 3oz $12 | 21oz $178 | 4oz $44 | 5oz $33 | 19oz $171 | 5oz $53 | 5oz $49 | 9oz $50 | 4oz $23 | 6oz $80 | 3oz $30 | 3oz $39 | 1oz $23 | 5oz $49 | 5oz $26 | 110oz $1,023 |

Day of Pour/Hours
2018 July

| Virtual Bar Name | Beverage Name | 28 | | | | | 31 | | | | | Grand Total |
|---|---|---|---|---|---|---|---|---|---|---|---|---|
| | | 3 PM | 5 PM | 7 PM | 9 PM | Total | 9 AM | 6 PM | 8 PM | 10 PM | Total | |
| Controlled Pours | Stoli | 3 | | 16 | | | | | 10 | | 48 | 101 |
| | Hurradura | | 4 | 3 | | 14 | | | 2 | | 25 | 39 |
| | Spare | | | | | | | | | | 6 | 6 |
| | Jack Daniels | | | 3 | 8 | 16 | 6 | | | | 16 | 32 |
| | Crown Royal | | | 1 | 4 | 10 | | | 2 | | 15 | 25 |
| | Flora De Cana | | | 1 | | 8 | | | | | 13 | 13 |
| | Bombay | | | | 1 | 9 | | | 2 | | 3 | 12 |
| | Gentleman Jack | | | 3 | | 4 | | | | 1 | 10 | 10 |
| | Sailor Jerry | | | | 1 | 2 | | | 2 | | 2 | 4 |
| | Total | 3 | 4 | 30 | 14 | 145 | 6 | | 38 | 3 | 191 | 336 |
| Free Pour | Stoli-FP | | 2 | 11 | | 30 | | | 29 | 12 | 60 | 90 |
| | Spare | | | | | | | | | | 31 | 31 |
| | Hurradura-FP | | | 4 | | 18 | | | 1 | | 25 | 25 |
| | Bombay-FP | | | | 2 | 2 | | 1 | 4 | 5 | 14 | 16 |
| | Crown Royal-FP | | | | 2 | 8 | | | | | 4 | 8 |
| | Sailor Jerry-FP | | | 3 | | 4 | 2 | | 1 | 2 | 4 | 8 |
| | Spare-FP | 1 | | | | 6 | | | | | 4 | 8 |
| | Jack Daniels-FP | | | | | | | | | | 4 | 7 |
| | Total | 3 | 2 | 21 | 5 | 85 | 2 | 32 | 41 | 23 | 170 | 255 |
| | Grand Total | 6 | 6 | 51 | 19 | 230 | 8 | 32 | 79 | 26 | 361 | 591 |

3802 →

3804 → Beverage Name: Stoli, Hurradura, Spare, Bombay, Spare-FP, Sailor Jerry

FIG. 39

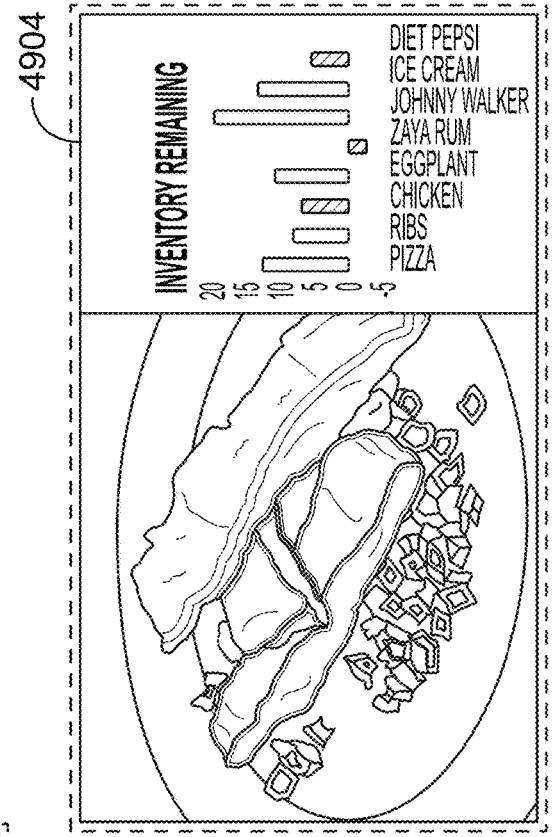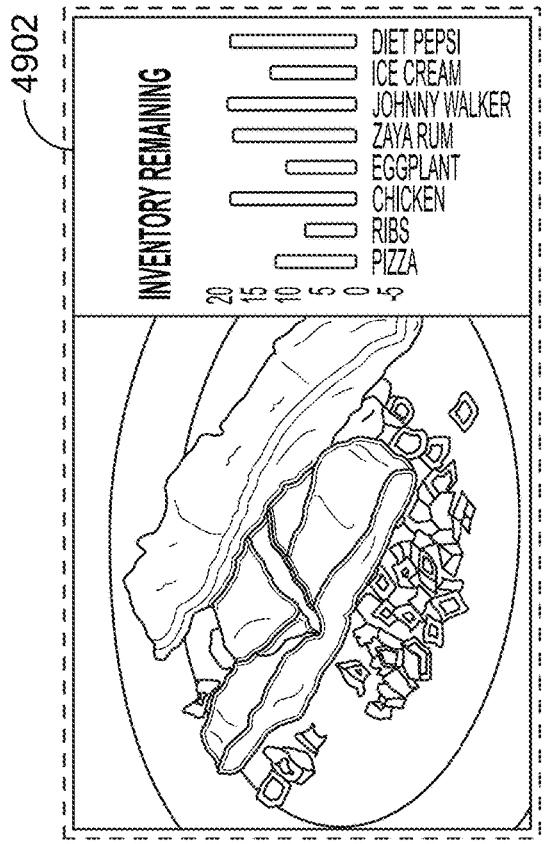
FIG. 49

FIG. 50

| L2F | | | | | Hello : Admin | ⏻ Log Out |
|---|---|---|---|---|---|---|
| Hiton Stadium ⌄ | Filter | | | | | |
| ○ Location ⌃ | Category | Wine ⌄ | Input Search Text for Product Name | | Search | |
| ⛓ Bar1 | Stock Level | | | | | |
| ⛓ Bar3 | | Name | Brand | Category | Volume | Current Stock |
| ⛓ Inventory ⌃ | 3 | Bogre Chardonnay | Napa Vineyaros | Wine | 1000ml | 3 | ⊕ Add Stock |
| ☐ Stock Level | 13 | Krug Vintage Brut | Krug Vintage Brut | Wine | 750ml | 0 | ⊕ Add Stock |
| | 14 | Louis Roederer, Cristal | Louis Roederer, Cristal | Wine | 750ml | 15 | ⊕ Add Stock |
| | 21 | Po Rogre Winston Goicses | Po Rogre Winston Goisses | Wine | 1000ml | 0 | ⊕ Add Stock |
| | | | | | < Previous | Next > |

BEVERAGE DISPENSING AND MONITORING SYSTEM

CROSS REFERENCE TO RELATED APPLICATIONS

The present application claims priority to U.S. Provisional Patent Application No. 62/800,380, entitled "Beverage Dispensing and Monitoring System" and filed on Feb. 1, 2019; U.S. Provisional Patent Application No. 62/819,326, entitled "Integrated Real-Time and Predictive Front-of-House and Back-of-House Food Service Control System" and filed on Mar. 15, 2019; and U.S. Provisional Patent Application No. 62/891,239, entitled "System and Method for Integrating Automated Electromechanical Functions in a Food Production Environment" and filed on Aug. 23, 2019, each of which is hereby incorporated by reference herein in its entirety.

BACKGROUND

The current approach that most bars, nightclubs and entertainment venues take in order to minimize losses from overpours, giveaways and spills is to insist on the bartender ringing up every spill and "comp" to give the management of the establishment some information as to the extent of these losses and to identify actual theft. An additional approach that is used currently is to have bartenders ring up drinks before they begin to pour, with the bar manager or owner spot-checking the bartenders' pours and tabs to ensure that drinks are being recorded and are being recorded correctly. In addition, bar managers or owners may require the bar staff to use jiggers, i.e., small measuring cups that help measure a precise amount of alcohol. In some instances, pour controllers may be attached to a spout of a bottle or an outlet of another drink dispenser to limit the amount that can be poured in any single pour. Pour controllers may be mechanical or electromechanical, and in some instances may be adjustable.

All these methods require significant effort on the part of the bar owner or manager, and even with that effort, provide a very limited ability to proactively manage and control losses. These methods further require close and obtrusive monitoring of bartenders, employees, and patrons by the bar owner or manager, particularly during the busiest hours at the establishment, as well as time-consuming procedures for closing or opening the business. Even with pour control systems, there are still significant opportunities for loss and theft, such as repeated pours and accidental pours. Also, with one of the highest turnovers in the industry, these methods require significant training of the bar staff every time a trained member leaves and a new member joins the team, as well as ongoing refreshers and reminders to ensure that rules that are implemented are adhered to over time. It is therefore impractical to expect that day in and day out these methods will work consistently and prevent the business from losing significant amounts of revenue from overpours, giveaways, and other errors.

SUMMARY OF THE INVENTION

In an embodiment of the present disclosure, a method for modifying operation of a beverage control device comprises receiving, from each of a plurality of beverage control devices, beverage pour data. The method may further comprise determining, based on the beverage pour data from the plurality of beverage control devices, an instruction for a particular beverage control device, and transmitting the instruction to the particular beverage control device, wherein the instruction modifies the operation of the particular beverage control device.

In an embodiment of the present disclosure, a beverage operations system comprises a wireless communication interface configured to wirelessly communicate with a plurality of beverage control devices, a memory comprising instructions stored thereon, and a processor coupled to the communication interface and the memory. The processor may be configured to execute the instructions to receive, from each of the plurality of beverage control devices, beverage pour data; determine, based on the beverage pour data from the plurality of beverage control devices, an instruction for a particular beverage control device; and transmit the instruction to the particular beverage control device, wherein the instruction modifies the operation of the particular beverage control device.

In an embodiment of the present disclosure, a non-transitory computer-readable medium has instructions stored thereon, that when executed by a processor of a beverage operations system, cause the processor to perform operations. The operations may comprise receiving, from each of a plurality of beverage control devices, beverage pour data; determining, based on the beverage pour data from the plurality of beverage control devices, an instruction for a particular beverage control device; and transmitting the instruction to the particular beverage control device, wherein the instruction modifies the operation of the particular beverage control device.

BRIEF DESCRIPTION OF THE FIGURES

The above and other features of the present disclosure, its nature and various advantages will be more apparent upon consideration of the following detailed description, taken in conjunction with the accompanying drawings in which:

FIG. 25 shows analysis data of total pours by month, bar, and beverage in accordance with some embodiments of the present disclosure.

FIG. 32 shows a snapshot of pours for a time period across beverage names at a bar in accordance with some embodiments of the present disclosure;

FIG. 33 shows a snapshot of mis-pours for a time period across beverage names at a bar in accordance with some embodiments of the present disclosure;

FIG. 34 shows a snapshot of the cost of mis-pours for a time period across beverage names at a bar in accordance with some embodiments of the present disclosure;

FIG. 37 shows analysis data of pours by beverage across two days in accordance with some embodiments of the present disclosure;

FIG. 38 shows analysis data of the number of pours and mis-pours by time of day and by beverage in accordance with some embodiments of the present disclosure;

FIG. 39 shows analysis data of beverage trends by hour and beverage type in accordance with some embodiments of the present disclosure;

FIG. 49 shows an exemplary user interface for inventory control in accordance with some embodiments of the present disclosure;

FIG. 50 shows an exemplary user interface for inventory management in accordance with some embodiments of the present disclosure; and FIG. 51 shows an exemplary user interface for inventory management in accordance with some embodiments of the present disclosure.

DESCRIPTION

Figure 1:
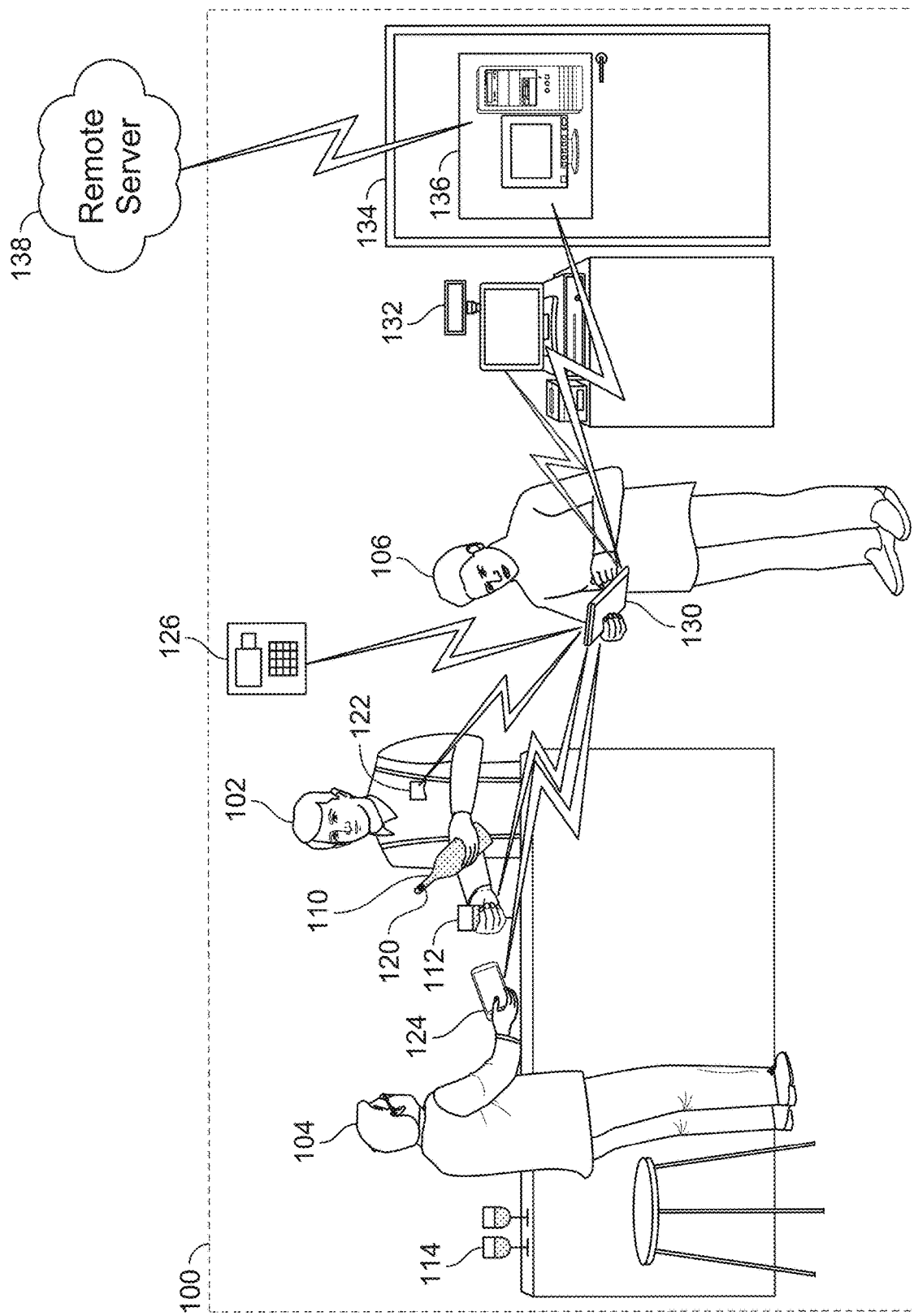
FIG. 1 depicts an exemplary establishment including beverage control devices and other supporting hardware and software of a beverage control system, in accordance with some embodiments of the present disclosure.

The present disclosure relates to an integrated system to allow establishments and companies to automatically capture and control beverage flows and other restaurant operations based on local sensing and control of beverage pours and other restaurant operations, establishment-level analysis and control of operations, entity-level analysis and control of operations, and industry-level analysis and identification of actionable insights. In an exemplary embodiment of an establishment that serves alcoholic beverages, all of the liquor and beverage pours at any given time in a bar, nightclub or similar establishment may be monitored (e.g., by a connected spout and other sensors) to identify loss events such as overpours, giveaways, comps, and spills. Other information, such as from a point-of-sale system, employee identifiers, customer identifiers, and other sensors and data sources may also be collected. At an establishment level, this information may be collected at a common gateway point, enabling local actions to be implemented based on this monitored information. For example, suitable persons (e.g., a bar manager, bar owner and/or the bar staff) may be provided a variety of information in the form of live data, alerts, reports and trends that will significantly alleviate the losses that bars, nightclubs, and entertainment venues face today. Such systems may further provide for automated control of other systems, such as connected spouts, inventory control systems, premises access and alarm systems, automated kitchen systems, advertising systems, media control systems, and other related systems that collectively facilitate the operations of the establishment.

In some embodiments of the present disclosure, the variety of information available on the premises described herein may be aggregated at a gateway device that captures the data collected by the beverage control device, stores it either locally in a local network device (e.g., a "fog" device that is located at the establishment or close to the premises, providing a physical and logical layer between a particular establishment and the internet) and/or in cloud storage. Each of the gateway device, fog device, or other devices executing beverage operations programs and applications as described herein may include suitable processors, memory, and communications interfaces as is known in the art. In some embodiments, the gateway may be an application or program providing operations through a local connected device or devices, e.g., may be primarily cloud-based for the collection and processing of data with operations and user interfaces provided or instantiated via the cloud. In some embodiments, the gateway may manage the movement and storage of raw data and locally processed data analysis at the fog location and further, to a server at a remote location (e.g., in the cloud), which may apply additional mathematical, statistical, and probabilistic approaches to the raw data and fog-transformed data while aggregating and anonymizing additional data from similar and different locations in order to deliver insights and actionable results graphically, through real-time alerts or reports, and/or through control actions.

For example, the system may represent and relay the information over a period of time or instantaneously, in the form of a live data stream to a mobile device or desktop through a browser or through a specially designed app, in order to enable the bar, nightclub and other entertainment venue to obtain an understanding of details including, but not limited to, the changing dynamics of the bar, the place of business, the region in which the establishment and other similar or different establishments are located, the macro and micro environment in which the establishment operates, and the demographics of the establishment patrons. In this way, the establishment may significantly drive and improve sales, curtail losses, and manage the business.

FIG. 1 depicts an exemplary establishment including beverage control devices and other supporting hardware and software of a beverage control system in accordance with some embodiments of the present disclosure. Although it will be understood that components described herein with respect to FIG. 1 may be added, removed, or replaced, in an exemplary embodiment the beverage control system of the establishment includes a plurality of beverage control devices 120, a permitted customer device 124, an employee tag 122, other sensors 126, a point-of-sale system 132, a gateway device 130, a fog device 136, and a remote cloud server 138.

The beverage control devices 120 may provide monitoring of information about bottles 120 and pours of drinks 112 and 114 (e.g., including number of pours, amount of pour, flow rate, volume of liquid in a bottle, liquid temperature, lock/unlock, pour device types, pour device IDs, beverage types, beverage IDs, binary indicators whether a pour was complete, etc.) as well as additional information about the environment (e.g., temperature, pressure, humidity, employee access attempts, etc.) and may communicate that information to a gateway 130 and/or fog device 136. An employee tag 122 may communicate with the beverage control device 120 (e.g., to permit flow of fluid, associate the employee with particular beverage control devices, authorize modifications to settings, etc.) and/or with the gateway 130, POS system 132, and/or fog device 136 (e.g., providing location, on-the-clock information, or select employee inputs). A user device 124 may permit access to certain functionality, for example, via an application associated with the establishment, entity, or an operator of the beverage control system. The user device 124 may communicate with the gateway 130, POS system 132, and/or fog device 136, providing information such as user preferences, user orders, coupons, demographic information, age, etc. Other sensors 126 may include a variety of suitable sensors, such as a camera (e.g., video or time-of-flight) that captures images and/or identifies locations of employees (e.g., via a beacon of an employee tag), customers, and beverage control devices (e.g., via a beacon associated with the beverage control devices), and communicates the other sensor data to a gateway and/or fog device. A POS system 132 may also communicate with the gateway 130 and/or fog device 136, and may provide order, pricing, customer, payment and other POS information to the gateway 130 and/or fog device 136.

In some embodiments, aspects of the system may be automated, for example, including automated fulfillment of inventory, preparation of food, and pouring of drinks. This automation in some embodiments may include robots that perform some functions typically performed by food service employees, such as taking orders, pouring drinks, preparing food, serving food, etc. Equipment within the establishment, inventory systems, etc., may be equipped with processing and communication equipment that allows exchange of information with the gateway and/or fog device. Information may be monitored, and requests (e.g., build and cook a hamburger, prepare a cup of coffee with cream, deliver a bottle of wine from inventory) may be transmitted from the gateway and/or fog device to any such automated equipment.

In some embodiments, the operations of the establishment are monitored by authorized users (e.g., a manager 106) with a gateway device or devices 130 (e.g., tablets, mobile devices, POS system, personal computer, etc.). The gateway device 130 and fog device 136 are communicatively linked to e.g., each other, such that the fog device 136 can store and analyze data to be transmitted to a remote server 138 (e.g., the cloud). As described in further detail herein, this communication system may further allow the manager to monitor and analyze data collected at other bars that are linked to this network via the remote server. In some embodiments, the gateway device 130, fog device 136, and/or cloud 138 may access other information as described herein, such as crowd information, promotions, inventory, supplier data, weather, events, satellite data, geolocation data, inventory data, delivery/warehouse data, social media data, etc. The data collected at any of the devices and available from third-party sources may be structured or unstructured data, and in some embodiments, may be normalized into common formats (e.g., for use as data primitives, as described herein).

In some embodiments, as the data is collected, the data is sorted and stored in databases locally in a fog device 136. The data may then be sent to a cloud server 138. The database can have multiple tables, each of which can concentrate on one type of entity with detailed attributes for that entity. For example, a "pour" table may focus on data such as pour volume, time of pour, pour completion indicators, etc. New entities can be added when new information, features, types, etc., become available. New information may include new beverage pouring devices, beverages, bars, drink recipes, etc.

In one embodiment, a manager 106 may be on site monitoring the establishment. The manager 106 may have a bartender or other employee 102 who is pouring a customer 104 a drink 112 (e.g., a glass of wine). The bottle 110 (e.g., wine bottle) that the bartender 102 is pouring from may be equipped with a beverage control device 120 that monitors the liquid being poured from the bottle 110 as well as other information about the pour, bottle 110, liquid or environment. The beverage control device 120 may be equipped with various sensors, processors, memory, and/or a communication chip to be able to detect a pour, determine the volume poured, store the data, and/or transmit the data to another device (e.g., to a gateway device 130), as described herein.

Once a bartender 102 has finished pouring the volume corresponding to the amount both that the customer 104 has asked for and that will be entered into the POS system, the bartender may return the bottle 110 to the bar shelves. At this point, the manager 106 may see the volume poured as a data point displayed on a gateway device 130 showing a chart of volume pours by time and beverage type or brand. The bartender 102 may also decide to give the customer 104 extra wine as a favor or may accidentally spill the wine as he pours it, due to inexperience. The manager 106 can likewise see the amount of wine poured displayed on a gateway device 130.

As the gateway device 130 receives data from the beverage control devices 120 at the bar, the gateway device may store the data locally or transmit the data to a fog device 136 for storage or processing. An exemplary fog device 136 may be a desktop computer located at an office within the bar. The fog device 136 may be able to perform more intensive analysis with the data collected due to its larger storage space or higher processing speed. For example, the fog device 136 may receive instructions from the gateway device 130 to perform analysis upon a specific subset of data it has stored (e.g., to analyze the amount of low-calorie beer poured each day during the past 30 days). The fog device 136 may also communicate with a cloud server 138 to store data or to process data remotely. When the data has been processed to achieve the desired analysis, the fog device 136 may send the results back to the gateway device 130 for display.

In some embodiments, the operations of the beverage control devices 120 may be controlled by a gateway device 130. In some embodiments, the gateway device 130, fog device 136, or cloud 138 may perform analytics that facilitate control of the operation of the beverage control devices 120. For example, parameters such as amount of pour, particular liquors used in a drink, recommended drinks, selection of well drinks, limitations on drinks to pour or consume by employees and customers and other related parameters may be determined based on information acquired by the system, as described herein. For example, the cloud system 138 may identify that a particular brand has low local inventory and may temporarily enact measures to limit consumption of that brand, such as suggesting substitutes for mixed drinks. The analytics system may also provide information to facilitate the relative consumption of particular brands, for example, based on bulk purchase incentives or promotions for the entity, such as providing specials necessary to achieve attainment of the incentives or promotions, or to exhaust an excessive inventory. Similarly, analytics can provide for selective enabling or disabling of access to certain beverages based on events or known situations (e.g., time of day, consumption patterns for an evening, etc.) that have an enhanced risk of undesirable conditions such as violence and/or property damage.

In an exemplary embodiment, the gateway device 130 may provide a centralized system for controlling the entire beverage control system. For example, patterns can be monitored based on employee 102, mixed drink type, brand type, per bottle, and (if permission is given) customer 104. Analysis with historical data and other current data (e.g., from other establishments, other data sources, promotional information, inventory and delivery data, etc.) can be used to determine drink prices, specials, recipes, and the like. In some embodiments, an employee 102 may be required to input a drink into the POS system 132 (e.g., one or more central POS systems and/or employee POS devices) before accessing a bottle 110. The gateway 130 may process the request based on the current recommendations and may dynamically select the bottles that are used to satisfy a particular generic drink request (e.g., to select which bottles to use for a margarita). Particularized user requests may result in specials or offers for other drinks being provided to the user 104. In any event, once a particular drink is finally selected by the POS system, the beverage control devices 120 associated with the appropriate bottles 110 may be activated. In some embodiments, the bottles may provide an indicator to assist the employee 102 with the pour, such as by activating a LED in a color associated with the employee 102. If it is desirable to pour the bottles 110 in a particular order this information may also be indicated on the beverage control device 120 or a mobile device 124 associated with the user 104. In some embodiments, such information may be relayed to the employee 102 by other means, such as on an augmented reality ("AR") device (e.g., overlaying the employee's view of the bar with visual indicators, which may be associated with beverage control devices 120 such as by beacons) or auxiliary displays located at strategic locations. During the pour, the beverage control device 120 may automatically pour the correct amount for the selected drink 112.

In exemplary embodiments, a beverage control system may operate at the level of a single establishment, or an entity having multiple establishments, or across an entire industry. Entity-level and industry-level operations may be supported by connecting local monitoring and control information for an establishment to the cloud, e.g., via the internet. As described herein, the establishment may collect data from numerous other sources in addition to beverage control devices, such as local sensors (e.g., video, audio, time-of-flight, inventory monitoring, etc.) and from other connected devices (e.g., of employees and customers). This information may be collected locally at the establishment and portions of the analysis and operational controls may be handled at the establishment by a gateway and/or fog device.

Entity-level information may be gathered from multiple establishments associated with the entity while industry-level information may be gathered from multiple entities within a shared industry (e.g., concert venues, sports venues, nightclubs, pubs, casual eateries, etc.). Entity-level and industry-level information may also be gathered from data sources other than the establishments, for example, based on beverage supplier data (e.g., drink inventory, prices, time-to-delivery, supply auctions, etc.), third-party data suppliers (e.g., trade organizations, proprietary data sources), and other information that may be relevant to beverage usage, consumption, theft, and operations (e.g., promotions, events, venue information, performer information, human movement and commute patterns, social media data, etc.).

Different information at different levels of the analysis stack may be selectively transmitted, encrypted, anonymized, obscured, deleted, monitored, analyzed, and/or controlled in different circumstances. For example, only some monitored data (e.g., analysis, reports, removal of personal identifying information, etc.) may be provided from the establishment to the entity, and similarly, the entity may limit the types of information that are provided to the industry-level system. Communications may similarly be limited or modified within the establishment, for example, to prevent association with particular employees or customers. Information transmitted to and from the beverage control devices 120 may be encrypted or obscured to limit the possibility that personal information or other information such as financially valuable information is intercepted (e.g., encrypting drink "recipe" transmissions within the network, or preventing third-party snooping on consumption of particular beverages).

In some embodiments, the beverage control devices and supporting hardware and service can be provided as a service, e.g., such that the establishment or entity is not required to make a significant capital investment to employ the beverage control system. In such a system, fees and/or credits may be based on a flat fee or may be selected based on amount poured, functionality utilized, analytics provided, promotions, etc. In some embodiments, pricing may be dynamic based on these factors, for example, to facilitate reduced pricing if a volume of certain beverages is poured, breakdown rate, quality of care and preventative maintenance, identified incidents of theft or fraud, etc.

Figure 2:
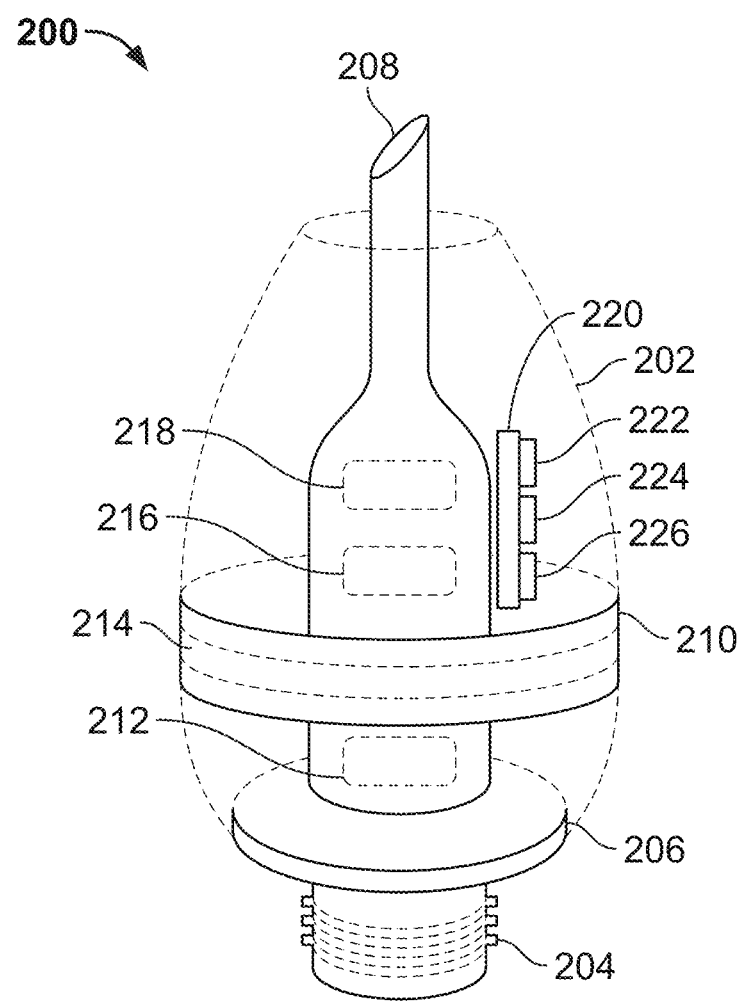
FIG. 2 depicts an exemplary beverage control device, in accordance with some embodiments of the present disclosure.

FIG. 2 depicts an exemplary beverage control device in accordance with some embodiments of the present disclosure. A beverage pouring system may include multiple beverage control devices including monitoring, control, and user interface features. Exemplary beverage control devices are described in U.S. Pat. No. 9,821,997 entitled "Spout and Dispensing System" and filed on Nov. 22, 2016, and U.S. Pat. No. 5,318,197 entitled "Method and Apparatus for Control and Monitoring of Beverage Dispensing" and filed on Oct. 22, 1992, each of which are hereby incorporated by reference herein their entirety for all purposes.

An exemplary beverage control device 200 may include a fitted insert 204 for frictional engagement with an interior surface (e.g., cylindrical surface) of a bottle. Although not depicted in FIG. 2, in some embodiments an insert may be automatically or selectively expandable to match the interior surface of the bottle. A seat 206 may provide a surface to engage with an upper opening of the bottle. Liquid being poured from the bottle may travel through the interior of insert 204 and spout 208 during pouring, where the liquid may interface with flow control device 212, flow sensor 216, and other sensors 218 (e.g., temperature, presence, color, etc.). An enclosure 210 may include a battery 214 for providing power to the beverage control device 200, which in an embodiment may be charged by inductive charging (e.g., by placing the beverage control device 200 in a charging fixture such that the enclosure 210 and battery 214 interface with charging coils of an inductive charger). Exemplary electrical systems 220 may include wireless communication circuitry 222, control circuitry 224 (e.g., processor, memory, registers, etc.), and user interface circuitry 226 (e.g., to control lights, displays, user inputs, and the like (not depicted)).

The sensors 216 and 218 may monitor characteristics of the liquid (e.g., flow volume, flow rate, temperature, viscosity, turbidity, etc.) as well as device and environmental characteristics (e.g., battery level, component self-tests, attachment to a bottle, acceleration, rate of rotation, temperature, humidity, pressure, presence of individuals/devices/signals, light, etc.). The beverage control device 200 may include flow control features 212, which may determine whether a spout is allowed to allow any liquid flow; they may also allow an amount of liquid allowed to flow through the device (e.g., a volume of the liquid), and a flow rate for the liquid. The beverage control devices may also include other control features, for example, activating alert notifications, activating monitoring hardware, modifying the attachment of the beverage control device (e.g., locking or unlocking), changing operation modes, etc.

The beverage control device may include user interface features 226 to provide information to users, for example, via lights, LEDs, displays, haptic interfaces, embedded speakers, local communication interfaces (e.g., Bluetooth Low Energy, NFC, etc.), etc. The user interface 226 may provide a variety of information such as an indication that a pour is complete or almost complete, an alert that a bottle needs to be changed, an alert for a pour error, an indication that a bottle should be selected for a pour, an indication that a bottle is one of a number of possible bottles to pour, an identifier for a brand or type of drink, etc. The beverage control devices 200 may include user interface features 226 to receive information from local users, such as by buttons, touchscreens, time-of-flight data, voice, or motion (e.g., particular motion profiles sensed by accelerometers and/or gyroscopes), local communication interfaces (e.g., Bluetooth Low Energy, NFC, etc.), etc. Employees may provide information, such as beverage selection, pour amounts, user identification, settings modification, requests to unlock a beverage container, overrides, drink selection, etc. The user interface features 226 may also facilitate associating the beverage control device with a particular type of drink (e.g., a brand and bottle size of wine or liquor). In some embodiments this association may be performed automatically, e.g., based on scanning of barcodes or other identifying information on the bottle by the beverage control device or a device in communication with the beverage control device.

The beverage control devices may include communication interfaces 222 for exchanging data with other electronic devices. Suitable wireless interfaces may include Bluetooth, Bluetooth Low Energy, NFC, RFID, mesh networking protocols (e.g., ZigBee), cellular, 5G, unlicensed spectrum protocols, or any other suitable protocols for exchanging information wirelessly. In some embodiments, the beverage control devices may include a wired interface, e.g., that detachably connects to a base unit or data reader for selectively exchanging information or providing bulk data downloads. In instances of multiple types of connections (e.g., wired and wireless, multiple types of wireless connections), high-bandwidth connections (e.g., with higher energy usage and possibly intermittent connectivity) may be used for bulk data download, software updates, and non-urgent or periodic communications, while lower-bandwidth connections may be used for alerts, drink information, lock/unlock/change requests, pour requests, and other similar time-sensitive information that relates to the ongoing operation of the establishment.

The beverage control devices may include a variety of sleep and wakeup features to conserve battery life and/or initiate communications, for example, based on sensed movement of the device (e.g., by an accelerometer and/or gyroscope), approved users entering the area (e.g., an authorized user having a tag or device emitting a beacon signal such as a signal that activates an RFID or NFC component), periodic network polling, or other suitable methodologies for periodically activating the beverage control devices or particular circuitry or functionality thereof. In some embodiments, some subset of the beverage control devices may have enhanced functionality, e.g., to collect data from other local beverage control devices to a gateway, relay control information from a gateway, and receive local inputs (e.g., from an authorized user accessing an enhanced user interface functionality). In this manner, most of the beverage control devices can be relatively "dumb" programmable devices with a series of predetermined actions based on available control, monitoring, and user interface components and programmed functionality, limiting cost and power usage for the non-enhanced devices.

Figure 3:
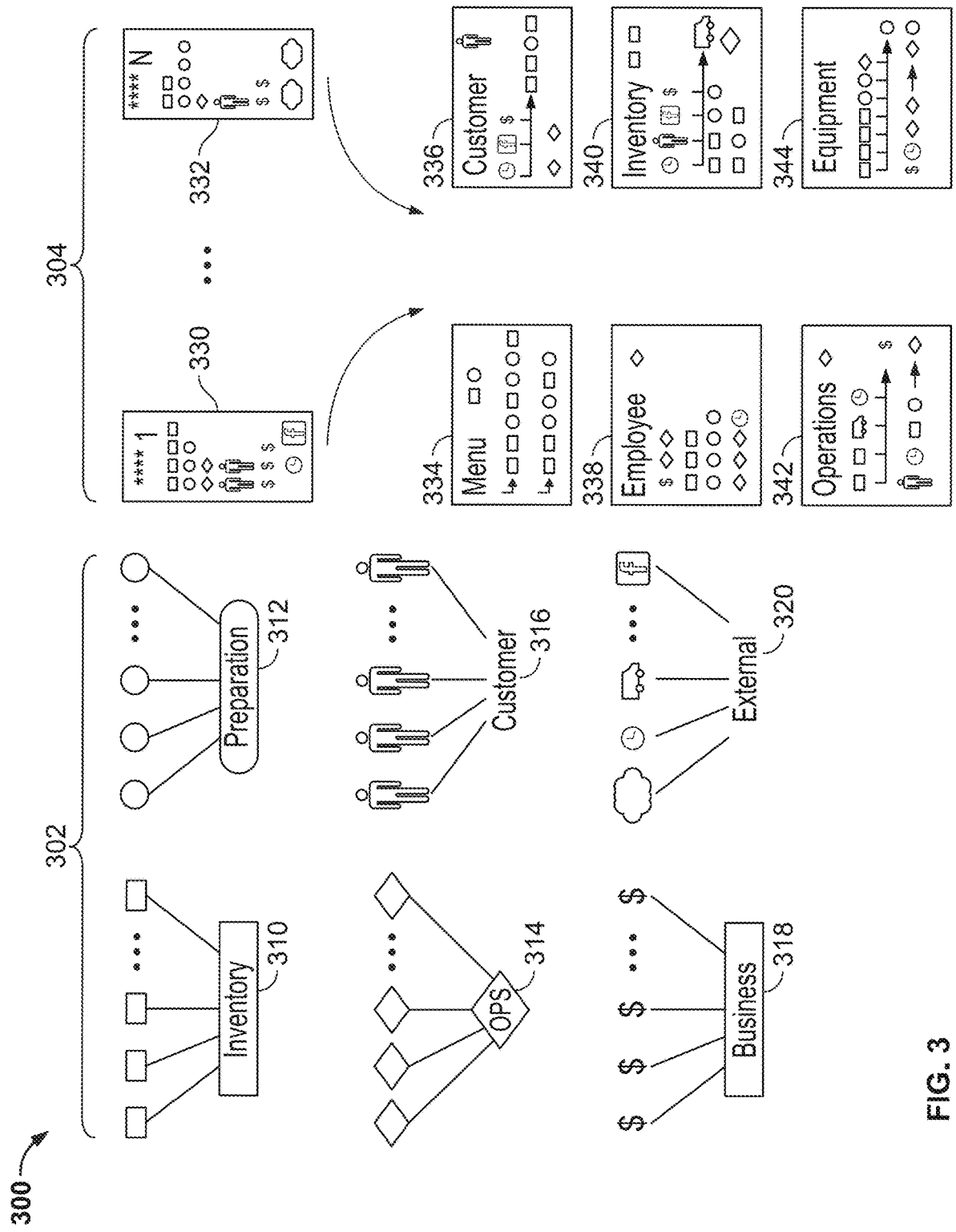
FIG. 3 depicts exemplary data primitives, order-level primitive collections, and primitive-based analytics, in accordance with some embodiments of the present disclosure.

FIG. 3 depicts exemplary data primitives, order-level primitive collections, and primitive-based analytics in accordance with some embodiments of the present disclosure. In accordance with the present disclosure, data structures and data primitives may enable real-time establishment beverage controls, data analytics, and predictive management of restaurant operations. In this manner, the systems and methods of the present disclosure enable real-time integration of front-of-house information (e.g., menu items, drinks that are ordered by the customer, charge for the order, POS information, time of order, type of drinks being ordered, employee ID, employee information, wait time, drinks consumed, customer reviews, etc.) with back-of-house information (e.g., drink inventory, supplier drink availability, storage capacity, state of the cold storage, location and state of the automated devices or employees for transporting drink items and prepared drink accessories, location of the robots or employees, location of drink storage, status of drink preparation equipment, quality checks, electromechanical components, etc.) to perform real-time process controls (e.g., accessing drinks and ingredients from inventory, providing AR-guided instructions to employees, queuing orders, reassigning employees, adjusting menu items, providing specials and promos, performing preventative maintenance, reconfiguring modular workstations, modifying electromechanical operations, etc.) and analytics and predictive modeling (e.g., managing inventory and suppliers, modifying menu items, changing recipes, adjusting prices, integrating seasonal items and menus, modifying food preparation equipment, changing food preparation procedures, performing preventative maintenance, etc.). Other external information such as event information, weather, location, demographics, social media, customer location data, etc., may also be integrated with the system as described herein.

Although a variety of primitive data types and categories may be utilized in accordance with the present disclosure, exemplary primitive data types include inventory data 310 related to consumable components (e.g., items in inventory, time of receipt, location, supplier, expiration date, ideal usage date, time accessed, quantity, etc.), preparation data 312 (e.g., recipes, time of preparation, employees involved in different preparation operations, time at each station or stage in the drink preparation process, QC data, parameters and measurements of each station, associations with automated vehicles and robots, available electromechanical operations and parameters, compatible consumable components, utility requirements, maintenance data, libraries or APIs for communicating with electromechanical components, equipment status and utility usage, associated sensors, module integrations, available modifications, other compatible modules, etc.), operations data 314 (e.g., utility usage, alerts and warnings from equipment, PM schedules, PM checklists, locations and inventory of replacement parts, supply sources, available non-food raw materials, utensils, trays, glasses of different types, containers, scrap, kitchen layouts, etc.), customer data 316 (e.g., for customers who opt in, location data, order history, survey results, item rankings, custom menus, preferred menu items, birthday, event calendar, and other customer-related information and preferences, etc.), business data 318 (e.g., cost of inventory, menu prices, menu items, utility costs, drink suppliers, equipment and consumable suppliers, employee information, employee costs, overhead costs, etc.), and external data 320 (e.g., weather information, date/calendar/event information, links to third party data sources such as real-time delivery information, social media, third-party analytics and pricing info, etc.).

Although data primitives can be grouped in other fashions than by orders (e.g., time of day, customer, employees, menu item, etc.), in an exemplary embodiment a variety of data primitives representing the integrated front-of-house and back-of-house operations can be added to an order throughout the preparation and service process to build an order-based data structure 304, as depicted by associations of each of the categories of primitive data with particular orders 330 and 332 in FIG. 3. In this manner, an order can be established with the POS system, and all aspects of the order may be tracked from inventory source to scrap. For example, a single completed order data structure may include transaction ID, customer ID, establishment ID, glass or other container IDs, equipment IDs, employee IDs, elapsed time at each step, ingredient and inventory data, equipment status, electromechanical operations, monitoring of electromechanical operations, QC results, equipment faults, customer ratings, delivery time, virtual restaurant settings, scrap, related orders, robot and AVG status and movement records, utility and resource usage records, energy management information (e.g., bang-bang controls, energy cycling), coupons and promotions used, current advertisements being run, location of ordered item on the menu, weather conditions, event data, relevant social media posts, suppliers for inventory, data from equipment (e.g., for fridges, freezer burn, relative locations, humidity) and other related information. In some embodiments only core order information such as inventory, employee data, equipment data, and time for each operation may be stored with the order data structure while other data structures may store other information (e.g., utilities, supplier info, equipment faults) in a manner that may be associated with particular orders at a later time (e.g., based on timestamps).

The order-level data may be aggregated and analyzed to perform a variety of analyses, e.g., based on associations with data primitives from the orders. For example, menu items 334 may be associated with inventory, preparation, and operations primitives. Such a data structure may be used to automate restaurant operations, effectively providing a structured guide for the preparation of food items. Other example analyzes data sets based analysis of order-level data as depicted in FIG. 3 and include customer data structures 336, employee data structures 338, inventory data structures 340, operations data structures 342, and equipment data structures 344.

Based on the analysis of data sources as described herein, the system (e.g., an AI system) may remotely stop drink orders made in error (e.g., drink scrap items) based on real-time analysis of scrap and QC trends with respect to particular orders or inventory items, or based on other criteria as described herein. The system may provide feedback and feed-forward correction of drink preparation errors (e.g., scrap items). The system may also provide process control for drink preparation processes. For example, drink preparation patterns may be analyzed by the system and changes to processes (e.g., temperature, time to prepare, etc.) may be automatically recommended.

The system may perform predictive maintenance of the drink preparation equipment and operations. Examples of maintenance triggers include divergence between expected and actual inventory usage, excessive utility usage, high percentages of scrap, movements within QC tolerance, etc. For example, drink preparation and item storage equipment may be equipped with sensors, processors, and communication chips that allow it to send an alert to a gateway device when critical components exceed a percentage of recommended usage hours. Predictive maintenance may be based on aggregated data at the entity level or industry level to optimize predictive maintenance routines.

The system may remotely, from the cloud, identify and push recipes and promotions to establishments. In some embodiments, the desired recipes may be custom recipes or standard recipes that have been modified. For example, social media or other trend data may identify "hot" recipes or items, and in response, the system may automatically recommend compatible recipes based on in-bar inventory or readily available items provided by suppliers.

The system may automatically generate coupons, combo meals, recommendations, etc., based on aggregated order information. For example, a customer may opt in to receive customized coupons and specials, which the establishment may use to dispose of inventory at relatively low prices for the customer, but at a time when they otherwise would not likely be spending any money at the establishment. In an exemplary embodiment, the system may coordinate with services such as meal delivery services to offer discounted items for distribution to customers. In another exemplary embodiment, customers may set strike points at which they are willing to buy bulk amounts of particular food items, which the establishment may utilize with inventory and demand-related information to properly manage inventory and utilization of employee and equipment time.

The system may analyze the order data to predict evolving tastes. For example, the order data collected may show that there was a drop in ordering of a particular mixed-drink item. The system may combine the order data with inventory data to show that the level of related inventory items has not decreased for a certain period. The system can then identify alternate possibilities (e.g., based on available electromechanical operations) for utilizing the inventory, including alternate menu items to prepare or third parties willing to purchase the inventory. The system may additionally analyze drink-item inventory or customer orders across restaurants to predict changing tastes. For example, the data collected may show an increased trend in ordering drink items low in sugar (e.g., low-sugar alcoholic beverages and mixes). The system may further recommend food items to conform to the evolving tastes. The system may identify that a customer, using a customer ID associated with orders, has been ordering drink items with reduced sugar and, in response, provide recommendations for various low-sugar drink items.

The system may use the order data from locations to forecast emerging food item trends according to location, demographic, region, etc. A bar in Kentucky may be more likely to stock bourbon because of the localized association with the product. If the drinks in Kentucky begin to trend away from bourbon, the unlikely trend is captured by the aggregated order-level information of completed items and allows for the restaurant owner to take corrective action.

The system may use social media in the predictive analytics used to manage store inventory, recommend drink items, create events to host at a venue, etc. For example, social media may reflect diet trends, which in turn may be used by bar owners to shape their inventory and menu. In another example, social media may show high attendance for weekly Friday night comedy shows in a neighborhood. A bar owner can use this data to determine that his bar near the comedy club needs to have more items, specials, employees, kitchen supplies, etc.

In some embodiments, a component of the system may be offline (e.g., disconnected from the communication network). For example, if an ingredient station is located outside of the wireless reception range of the gateway device, it may store the data it's collected in local memory. Once it has reconnected to the communication network, it may transmit its locally stored data to the gateway device. The offline device may be instructed to attempt a certain number of times to contact the gateway device before storing the data locally.

In some embodiments, drink or mixer containers may comprise sensors that are also communicatively interfaced with the gateway device. For example, a mass sensor embedded within a plate or glass may detect that the mixer item is nearly or fully consumed. Upon this exemplary detection, the sensor may communicate with an embedded processor and communications device to send an alert to the gateway device or a wearable device. In some embodiments, a customer ID may be associated with a container. The service employee may have a wearable device that is enabled to wirelessly communicate with the container system. The container system may then transmit information to the wearable device, indicating to the service employee that the food belonging to customer ID is fully or nearly consumed.

Due to the connection over the cloud, the analysis and recommendation of drinks may take into account a global taste palette. For example, the system may connect restaurants in the U.S. with a restaurant in Japan. A customer in San Francisco may be recommended a trending cocktail recipe in Tokyo due to his preference for rice wines.

The predictive analysis referenced herein may be accomplished through linear regression, logistic regression, K-means, K-Nearest Neighbors (KNN) algorithm, time-series forecasting, any suitable supervised or unsupervised learning technique, or any combination thereof.

Figure 4:
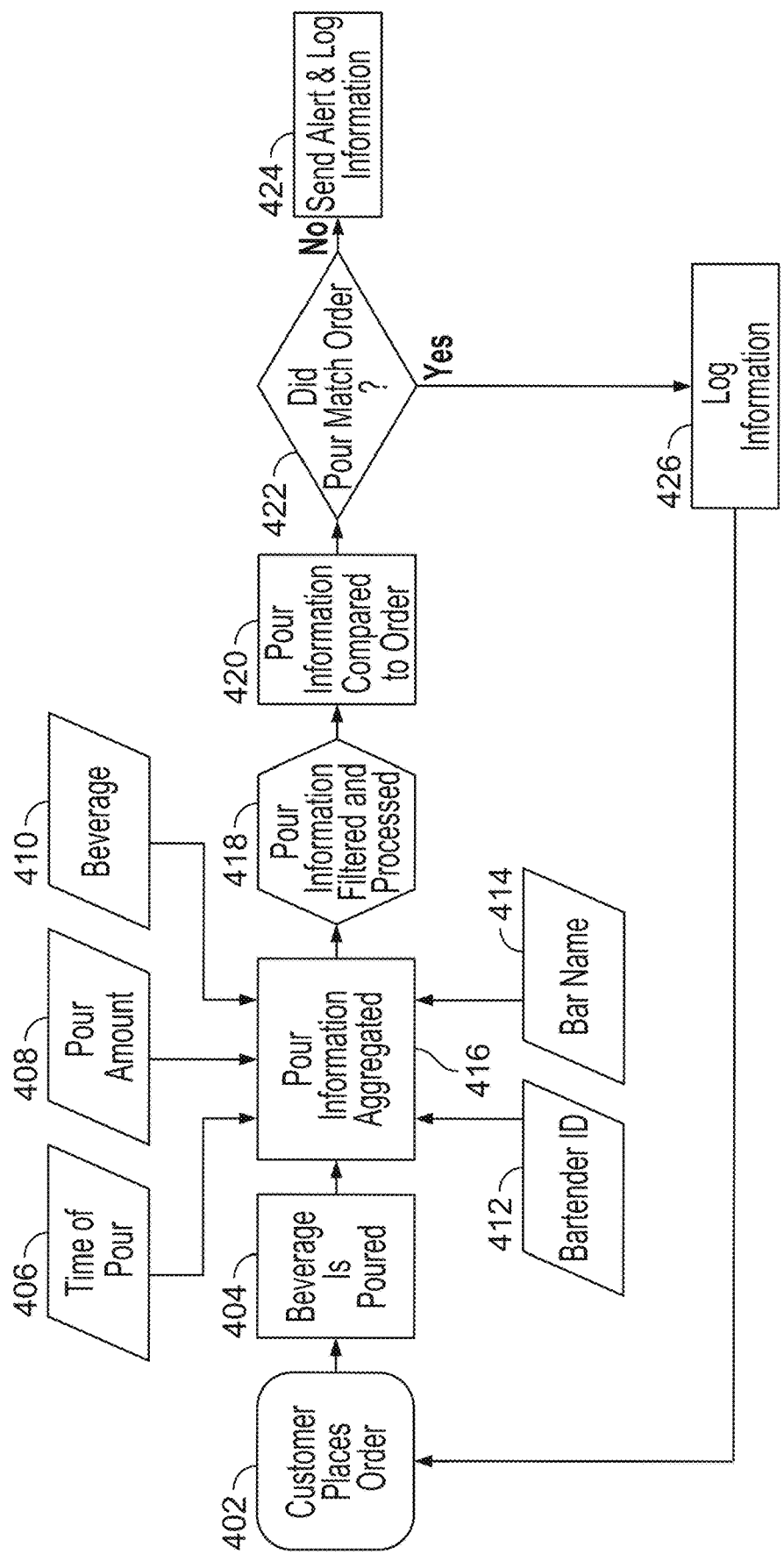
FIG. 4 shows a flowchart of a process for indicating that the quantity of beverage ordered by a customer and charged for in a Point-of-Sale (POS) system has been poured in accordance with some embodiments of the present disclosure.

FIG. 4 shows a process for indicating that the quantity of beverage ordered by a customer and charged for in a Point-of-Sale (POS) system has been poured in accordance with some embodiments of the present disclosure. In some embodiments, when an order is placed and a beverage pour is made for the order, the pour information is captured by the beverage dispensing device along with ancillary information such as time of pour, pour amount, beverage, bartender ID, bar name, etc. The data can be processed and filtered, and a comparison may be done to verify that the pour did match the order placed. In some embodiments, when the match is correct, the information can be sent out as an alert and logged in a database.

At step 402, a customer may place an order, such as through an application on a user device, a kiosk, a voice-recognition interface of the user device or establishment, or by conventional means of providing an order to a bartender or other employee. However the order is placed, this may be processed by the system, such as by a gateway device, fog device, and/or POS system. Information relating to the order (e.g., bottles and other items to be used for preparation of the order, other items such as mixers and garnishes to be added to the order, items to access from inventory, automated systems to activate, etc.) may be distributed to the system to assist in completing the beverage order.

At step 404, the beverage may be poured in accordance with the order. In some embodiments, the process may be directed and/or automated such as by indicators (e.g., LEDs or displays) on beverage control devices and containers for mixers and garnishes, augmented reality displays provided to employees, and/or automated equipment such as pour robots or automated devices to distribute inventory, glasses, and the like.

At step 416, data about the pour, the usage of other items, usage of glasses, environmental and employee information, and other data described herein may be captured and processed as described herein (e.g., as primitives aggregated from multiple sensors and sources and associated with the particular order). For example, information such as pour time 406, pour amount 408, beverage order details 410, employee information 412, and establishment data 414.

At step 418, the information that is aggregated for the particular order may be filtered and processed, for example, by confirming that collected information falls within parameters, identifying possible system or pour errors, and identifying relevant information from other data sources. Processing may continue to step 420, at which the collected information relating to the order is compared to expected order information. In some embodiments, a range of suitable values (e.g., pour amounts of liquors, usage amounts of garnishes, customer preferences, etc.) may be compared to the measured aggregated values for the order. At step 422, if the measured values fall within acceptable thresholds, the order may be logged at step 426 (e.g., at the fog device and/or cloud system). If the measured values don't meet the thresholds, alerts may be created and processed at step 424, such as by sending notifications to managers or other employees to take corrective action.

Figure 5:
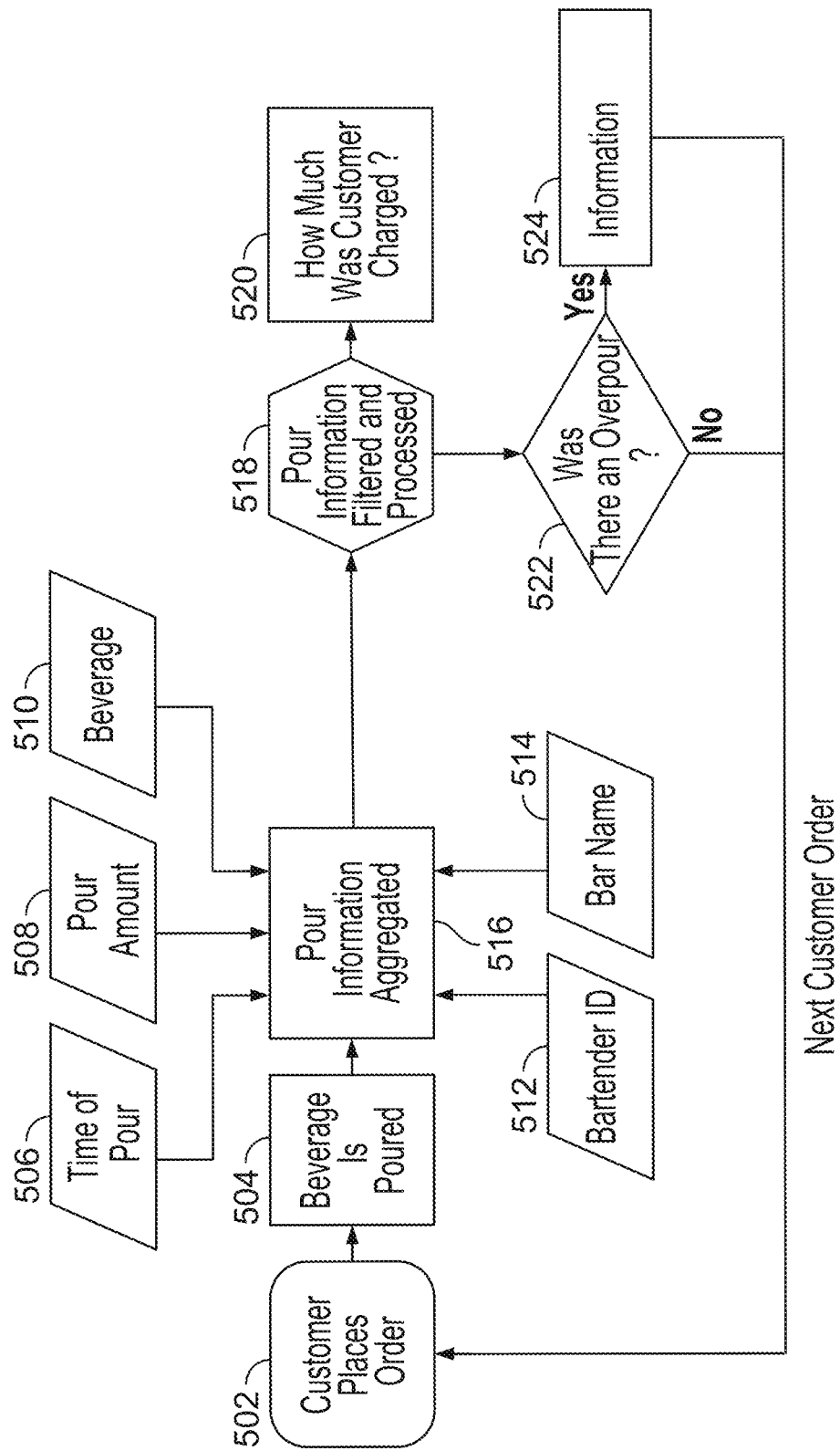
FIG. 5 shows a flowchart of a process for verifying the amount of a beverage poured and cross-referencing with beverage cost and profitability in accordance with some embodiments of the present disclosure.

FIG. 5 shows a process for verifying the amount of a beverage poured and cross-referencing with beverage cost and profitability in accordance with some embodiments of the present disclosure. In some instances, the amount of beverage poured may be matched, along with time of pour, beverage type, bartender ID, bar name, etc. to the customer order and the charge amount for the order, in the method shown in the process. In this way, the system may determine if there was a pour error, and if so, generate an alert, and/or store this information to a database. For example, each customer order may be reconciled to the pour data with a time stamp, the beverage poured, the bartender ID, and bar name to be reported as an alert. Further in this example, the pour data may be sent to the POS system to be reconciled with the charged amount.

At step 502, a customer may place an order, such as through an application on a user device, a kiosk, a voice-recognition interface of the user device or establishment, or by conventional means of providing an order to a bartender or other employee. In some embodiments, the order may be initiated by drink specials, rewards, or other notifications provided to the customer. The notifications may be provided to drive business during slow periods, reward customer loyalty, incentivize sale of items that have a high inventory, and other similar business logic and incentives. Once the order is placed, it may be processed by the system, such as by a gateway device, fog device, and/or POS system. Information relating to the order (e.g., bottles and other items to be used for preparation of the order, other items such as mixers and garnishes to be added to the order, items to access from inventory, automated systems to activate, etc.) may be distributed to the system to assist in completing the beverage order.

At step 504, the beverage may be poured in accordance with the order. In some embodiments, the process may be directed and/or automated such as by indicators (e.g., LEDs or displays) on beverage control devices and containers for mixers and garnishes, augmented reality displays provided to employees, and/or automated equipment such as pour robots or automated devices to distribute inventory, glasses, and the like.

At step 516, data about the pour, the usage of other items, usage of glasses, environmental and employee information, and other data described herein may be captured and processed as described herein (e.g., as primitives aggregated from multiple sensors and sources and associated with the particular order). For example, information such as pour time 506, pour amount 508, beverage order details 510, employee information 512, and establishment data 514.

At step 518, the information that is aggregated for the particular order may be filtered and processed, for example, by confirming that collected information falls within parameters, identifying possible system or pour errors, and identifying relevant information from other data sources such as financial information relating to a particular incentive that initiated the order. Processing may continue to step 520, at which the financial information relating to the order and related incentives may be processed along with other orders from the establishment, and in some embodiments, related orders for an entity or industry. In this manner, financial information about profitability for the drink and/or incentives related to the drink may be determined. Other data such as likelihood of pour errors or other scrap may be processed to identify opportunities for training or other corrective action.

At step 522, collected information relating to the order is compared to expected order information to generate possible alerts. In some embodiments, a range of suitable values (e.g., pour amounts of liquors, usage amounts of garnishes, customer preferences, etc.) may be compared to the measured aggregated values for the order. If the measured values fall within acceptable thresholds, the order may be logged (e.g., at the fog device and/or cloud system) and processing may return to process the next order. If the measured values don't meet the thresholds, alerts may be created and processed at step 524, such as by sending notifications to managers or other employees to take corrective action.

Figure 6:
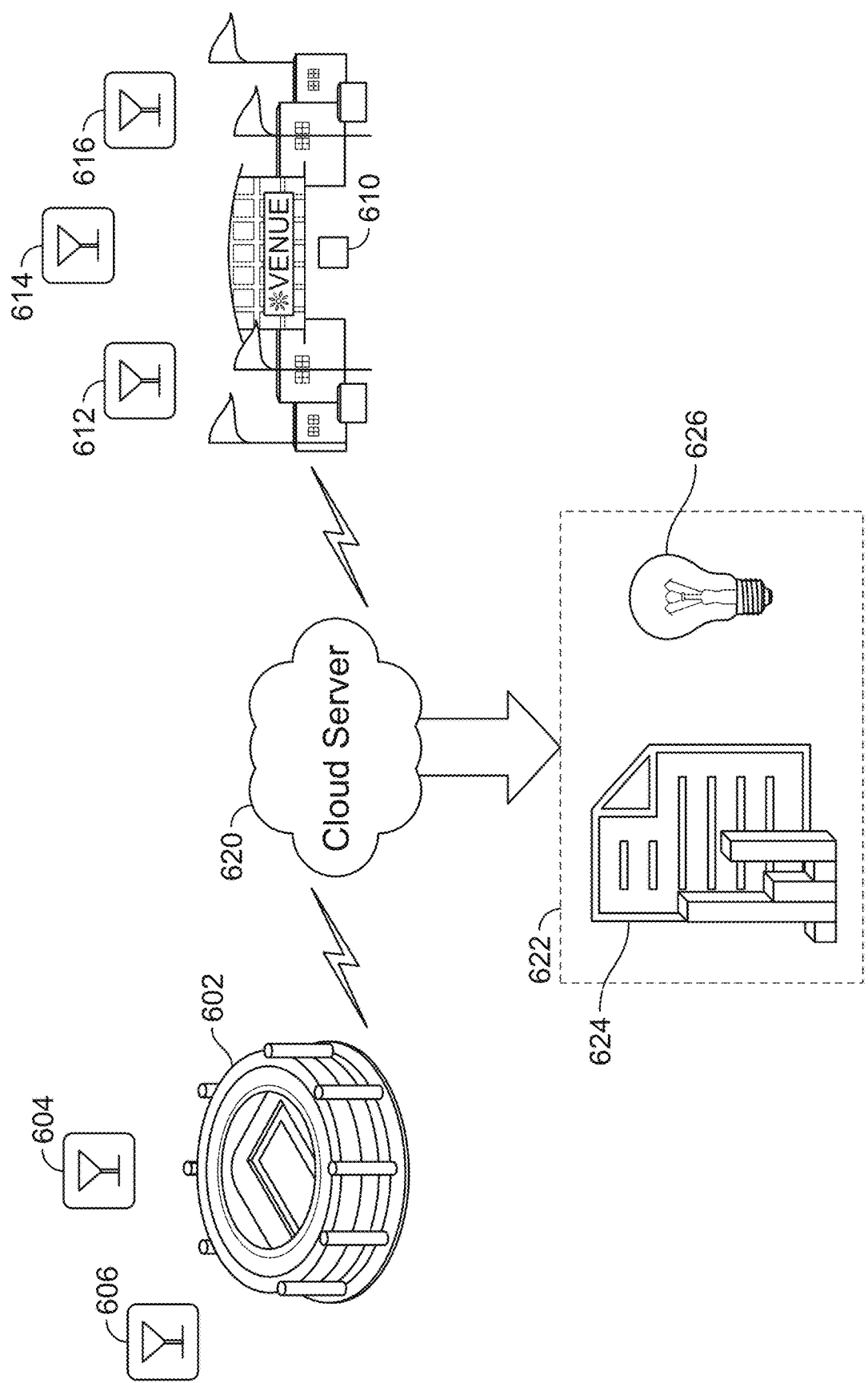
FIG. 6 depicts a network of communication systems integrated with the beverage pour system in accordance with some embodiments of the present disclosure.

FIG. 6 depicts a network of communication systems integrated with the beverage pour system in accordance with some embodiments of the present disclosure. In some embodiments, a cloud server aggregates data collected at multiple venues to produce summary reports and predictive analytic reports. For example, a sporting venue 602 within a metropolitan area may be hosting an event and may include multiple establishments serving drinks (e.g., bars 604 and 606) while a concert venue 610 in close proximity to the sporting venue 602 may also have multiple establishments serving drinks (e.g., bars 612, 614, and 616). The individual establishments and venues may provide information to cloud server 620, which may aggregate information based on a variety of parameters (e.g., establishments owned or franchised from a common entity in both of venues 602 and 610, all establishments within a respective venue, information for other adjacent businesses, etc.). The information may be processed by the analytics system 622 to provide predictive analytics 626 (e.g., predicting traffic, drinks that will be in demand, employee needs and deployment, etc.) and reports (e.g., identifying patterns, profitability, etc.).

In an embodiment, the analytics system 622 may aggregate and indicate the number of pours by beverage, by location, by region, by number of customers, by event occurring during the time of pour, as well as combining this information with user, inventory, supplier, environmental, and other data sources as described herein. For example, a bar located near a sports arena may register an increased number of customer orders due to the occurrence of a football game that evening. The data can be collected and associated with context such as time, location, and/or nearby events to be used to forecast service information such as the expected number of orders, pours over a shift, and/or beverages likely to be ordered. This forecasted information may then be used to plan future business operations such as bar staff, beverage inventory, etc.

Figure 7:
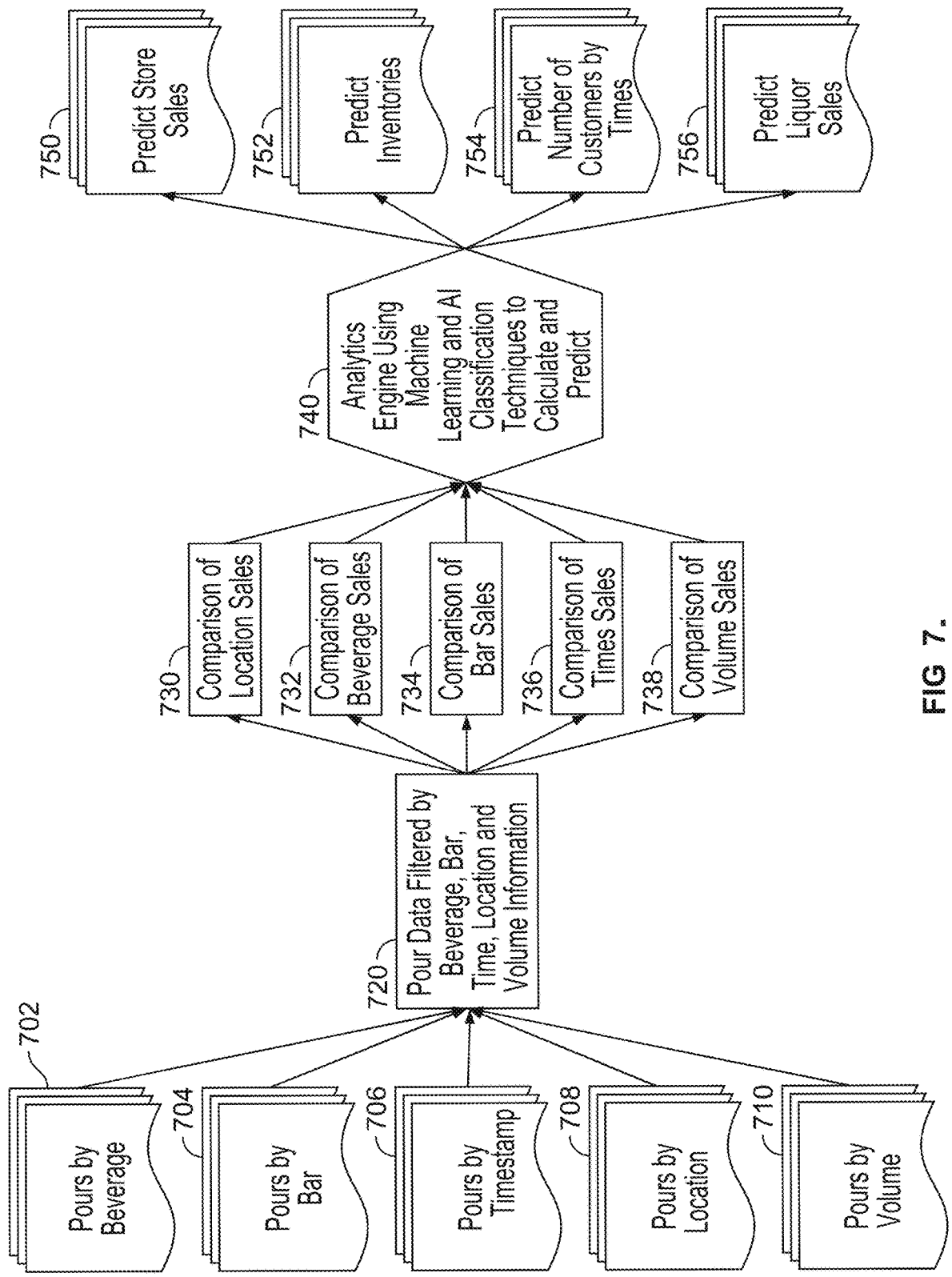
FIG. 7 shows a diagram depicting the production of business operations predictions from business operation data in accordance with some embodiments of the present disclosure.

FIG. 7 shows a diagram depicting the production of business operations predictions from business operation data in accordance with some embodiments of the present disclosure. In some embodiments, the relationship between the amount of beverage poured and the receipts therefor across several locations may be monitored and compared to predict store sales, inventories, number of customers visiting the location, prices and popularity of the store items, etc. A probabilistic classifier (e.g., Naïve Bayes classification) or other suitable machine learning or artificial intelligence algorithm may analyze data across locations may make the predictions, with or without training data (i.e., supervised or unsupervised analysis may be applied to the data collected).

Although any of the data sources described herein may be used as data sources for business operations predictions in accordance with the present disclosure, in an exemplary embodiment of the present disclosure, the data sources may include pours by beverage 702, pours by bar 704, pours by timestamp 706, pours by location 708, and pours by volume 710. At step 720, the aggregated and collected data is filtered based on common criteria from the collected data and associated with operational data such as pricing and sales data, resulting in streamlined data structures representative of patterns, spikes, and anomalies in the individual data sources, as well as correlations between those patterns, spikes and anomalies. For example, optimized data structures are created for each category of acquired data (e.g., sales by location 730, sales by beverage 732, sales by entity 734, sales by time/date 736, and sales by volume of individual sale 738). At step 740, a probabilistic classifier (e.g., Naïve Bayes classification) or other suitable machine learning or artificial intelligence algorithm may analyze data across locations may make the predictions, with or without training data (i.e., supervised or unsupervised analysis may be applied to the data collected). The resulting output may provide predictions of sales by store 750 (e.g., based on time/date, events, weather, traffic patterns, and the like), predictive inventory management 752 (e.g., for transfer from inventory to the bar or a staging area, for purchase of long lead time items, for selective purchasing to take advantage of price reductions and volume discounts, etc.), customer predictions and management 754 (e.g., selective pricing, promotions, specials, pre-orders, etc.), and predictive sales targets 756 (e.g., to provide goals, quotas, and benchmarks for a time period such as a day or shift).

Figure 8:
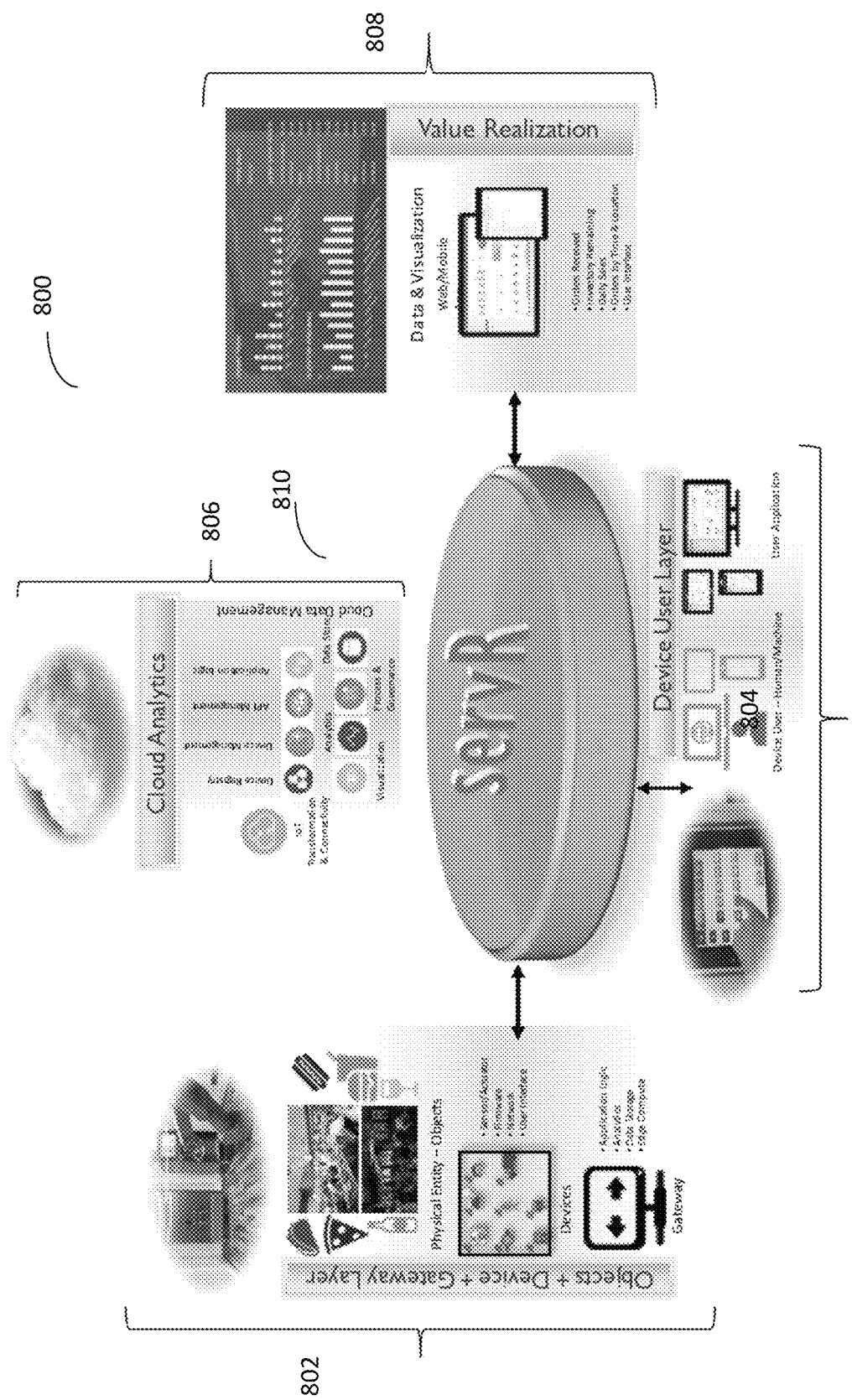
FIG. 8 depicts components of an exemplary comprehensive bar operations system in accordance with some embodiments of the present disclosure.

FIG. 8 depicts components of an exemplary comprehensive bar operations system in accordance with some embodiments of the present disclosure. Although a bar operations system can include a variety of components in different configurations, in an exemplary embodiment the system may include a bar operations layer 802, a user interface layer 804, an analytics layer 806, and a visualization layer 808. These respective layers interface via an integrated software and hardware control system 810 such as the ServR™ beverage and restaurant control system developed by the assignee of the present application, L2F Inc. The software and hardware control system may be implemented at a variety of devices include local devices of the establishment (e.g., via applications and/or websites at the gateway, POS system, fog device, and/or company-owned mobile devices), devices of employees or customers (e.g., via applications executing on mobile devices or A/R devices), and internet-connected servers (e.g., via custom instances running on servers of an entity or establishment, cloud-implemented servers, and/or servers of a bar services provider).

An exemplary bar operations layer 802 includes the various devices, sensors, and equipment that interface the physical aspects of the bar—including inventory, employees, customers, POS system, bottles, containers, glasses, stools, seats, tables—with the data collection and analytics system as described herein. An exemplary user interface layer 804 provides the means for employees, customers, managers, and others (e.g., regulators) in the bar environment to interface with the bar operations layer 802, for example, through touch-screen applications and voice recognition as described herein. An exemplary cloud analytics layer 808 receives data that is acquired via the bar operations layer 802 and user interface layer 804 and aggregates the data as appropriate (e.g., at an establishment, entity, and/or industry level) to provide analytics and predictive analysis as described herein. The results of such analytics and predictive analysis are provided to the visualization layer, which may provide custom insights for various levels of stakeholders, such as bar employees (e.g., maintenance recommendations, drink recommendations, inventory actions, etc.), middle management (e.g., store-level comparisons and patterns), and upper management (e.g., macro-level trends relating to supply chain and profitability).

Figure 9:
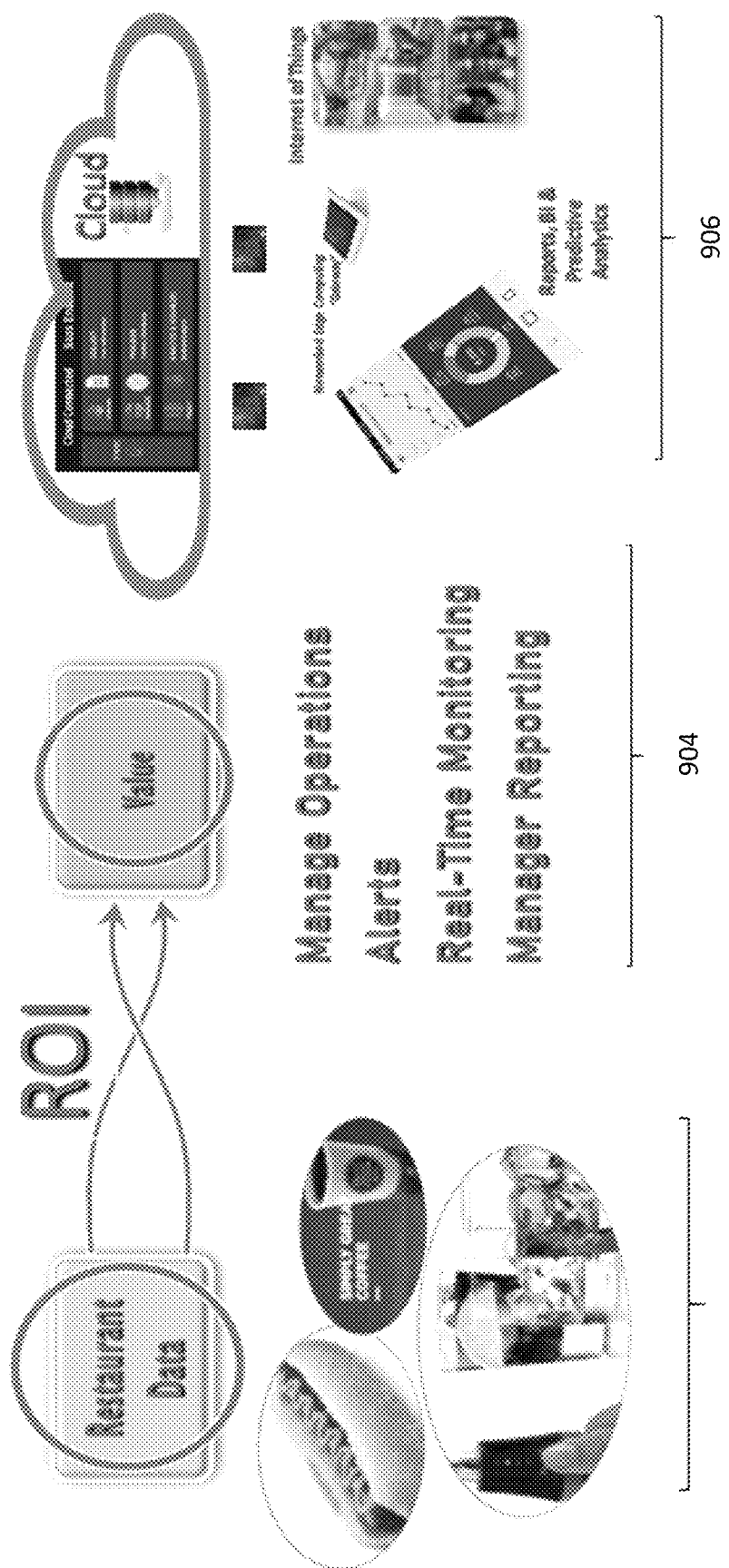
FIG. 9 depicts exemplary cloud reporting features of a bar operations system in accordance with some embodiments of the present disclosure.

FIG. 9 depicts exemplary cloud reporting features of a bar operations system in accordance with some embodiments of the present disclosure. Although a bar operations system can include a variety of cloud reporting features in different configurations, in an exemplary embodiment the system may include data collection systems 902, management systems 904, and analysis and reporting systems 906. As described herein, data is collected from a variety of sources of data collection systems, such as beverage control devices, sensors, public or proprietary data feeds, customer and employee devices and the like. In some embodiments, control information is also pushed back to these systems, such as to modify or control the operation of beverage control devices, automatically access inventory, perform preventative maintenance, and perform other table control operations as described herein. Management systems 904 such as gateway devices, fog devices, servers, and/or cloud systems may control and manage establishment and/or entity operations as described herein, for example, by performing real-time processing, alerting, monitoring, reporting, and other daily operational functions as described herein. Analysis and reporting systems 906 may be at a variety of locations from the gateway to the cloud, including implementations as distributed systems. These systems store and analyze operational data for establishments and entities over an extended period of time, and through analysis of historical collected data and forward-looking information are able to provide detailed historical reporting and predictive analytics, as described herein.

Figure 10:
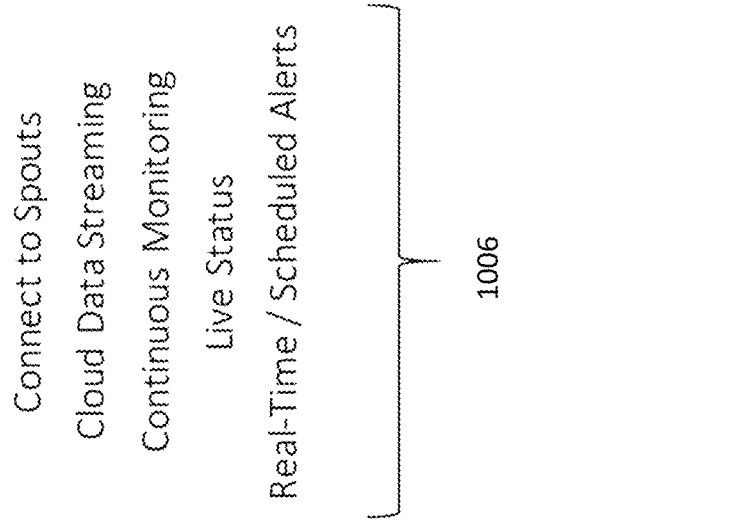
FIG. 10 depicts exemplary beverage control devices and user interfaces in accordance with some embodiments of the present disclosure.

FIG. 10 depicts exemplary beverage control devices and user interfaces in accordance with some embodiments of the present disclosure. Exemplary beverage control devices 1002 are attached to beverage containers such as liquor bottles, and perform monitoring, communication, and control functions as described herein. A local user interface such as gateway device 1004 provides for setup, control, and monitoring of the beverage control devices. For example, a gateway device 1004 can facilitate setup routines for beverage control devices, such as by cycling lights or other indicators on beverage control devices to confirm attachment to particular beverage bottles. The gateway device 1004 facilitates a variety of control and monitoring functions as described herein, such as connecting to the beverage control devices, streaming collected data to fog and/or cloud systems, and providing real-time monitoring, status, and alerts.

Figure 11:
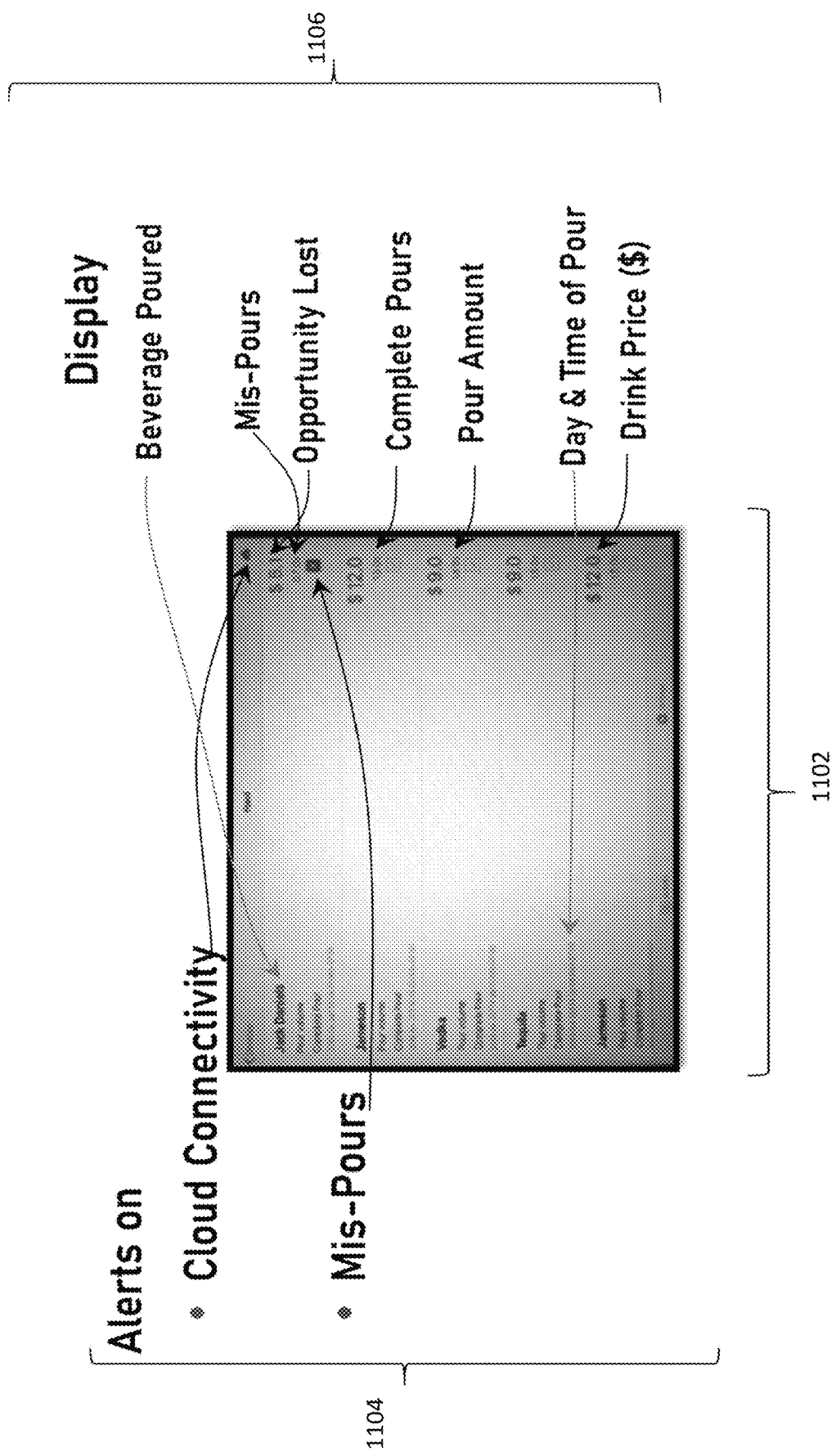
FIG. 11 depicts exemplary on-site-real-time data of a bar operations system in accordance with some embodiments of the present disclosure.

FIG. 11 depicts exemplary on-site, real-time data of a bar operations system in accordance with some embodiments of the present disclosure. In an exemplary embodiment, a gateway device display 1102 includes a variety of displayed information such as alerts 1104 (e.g., connection status, battery levels for beverage control devices, failure status, preventative maintenance warnings, overpours, underpours, leaks, etc.) and status display 1106 (e.g., amount paid, profit/loss, price, discounts, timestamp, pour amount, employee, customer, drink, etc.).

Figure 12:
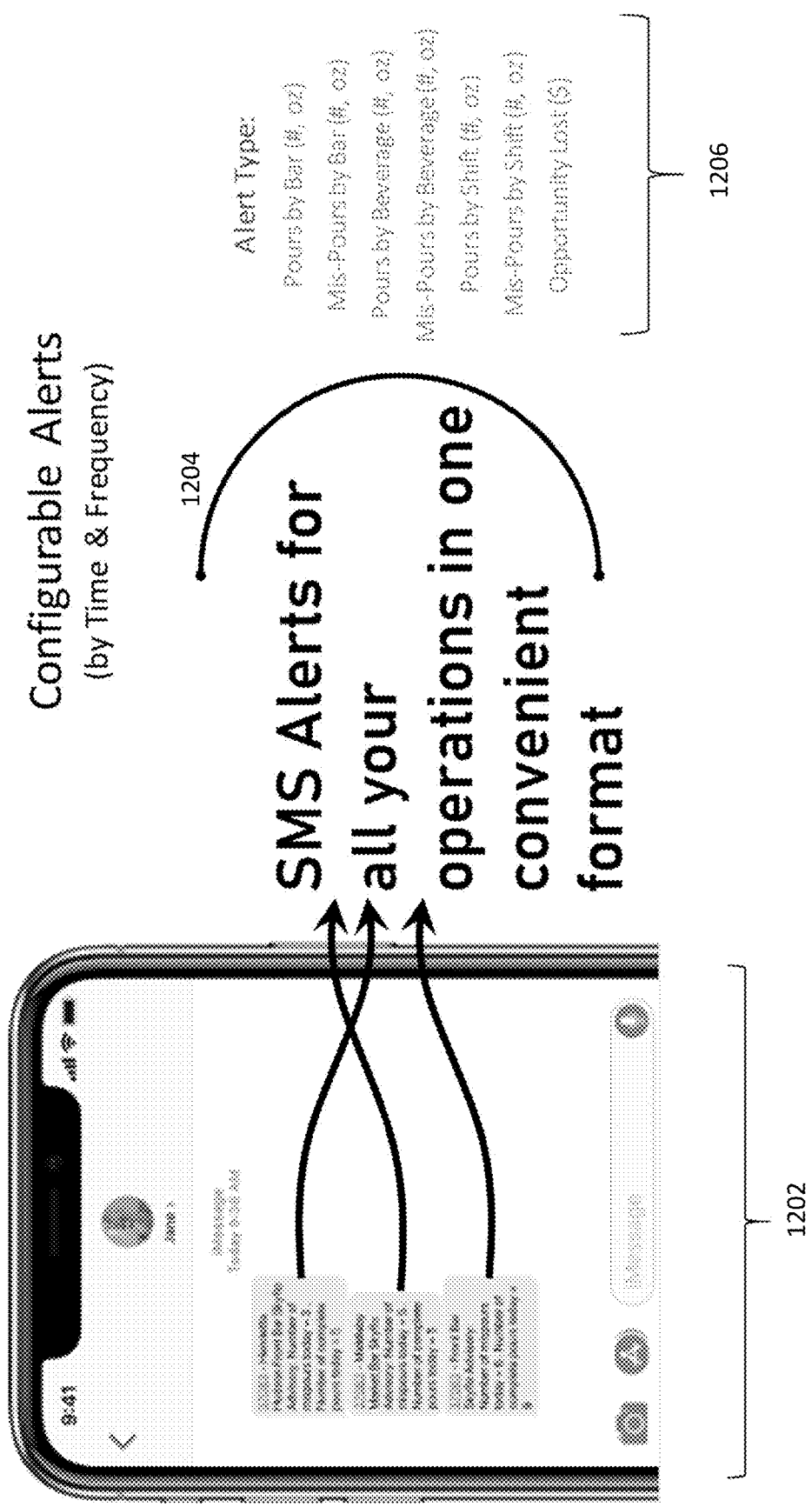
FIG. 12 depicts an exemplary messaging system of a bar operations system in accordance with some embodiments of the present disclosure.

FIG. 12 depicts an exemplary messaging system of a bar operations system in accordance with some embodiments of the present disclosure. Alerts 1204 of a variety of information or warning alert types 1206 (e.g., pours by bar in ounces or number of pours, mis-pours by bar in ounces or number of mis-pours, pours by beverage in ounces or number of pours, pours by shift in ounces or number of pours, mis-pours by shift in ounces or number of pours, losses due to mis-pours, and the like) may be provided to a suitable user interface (e.g., based on preconfigured and/or user-selectable parameters for providing different types of warnings).

Figure 13:
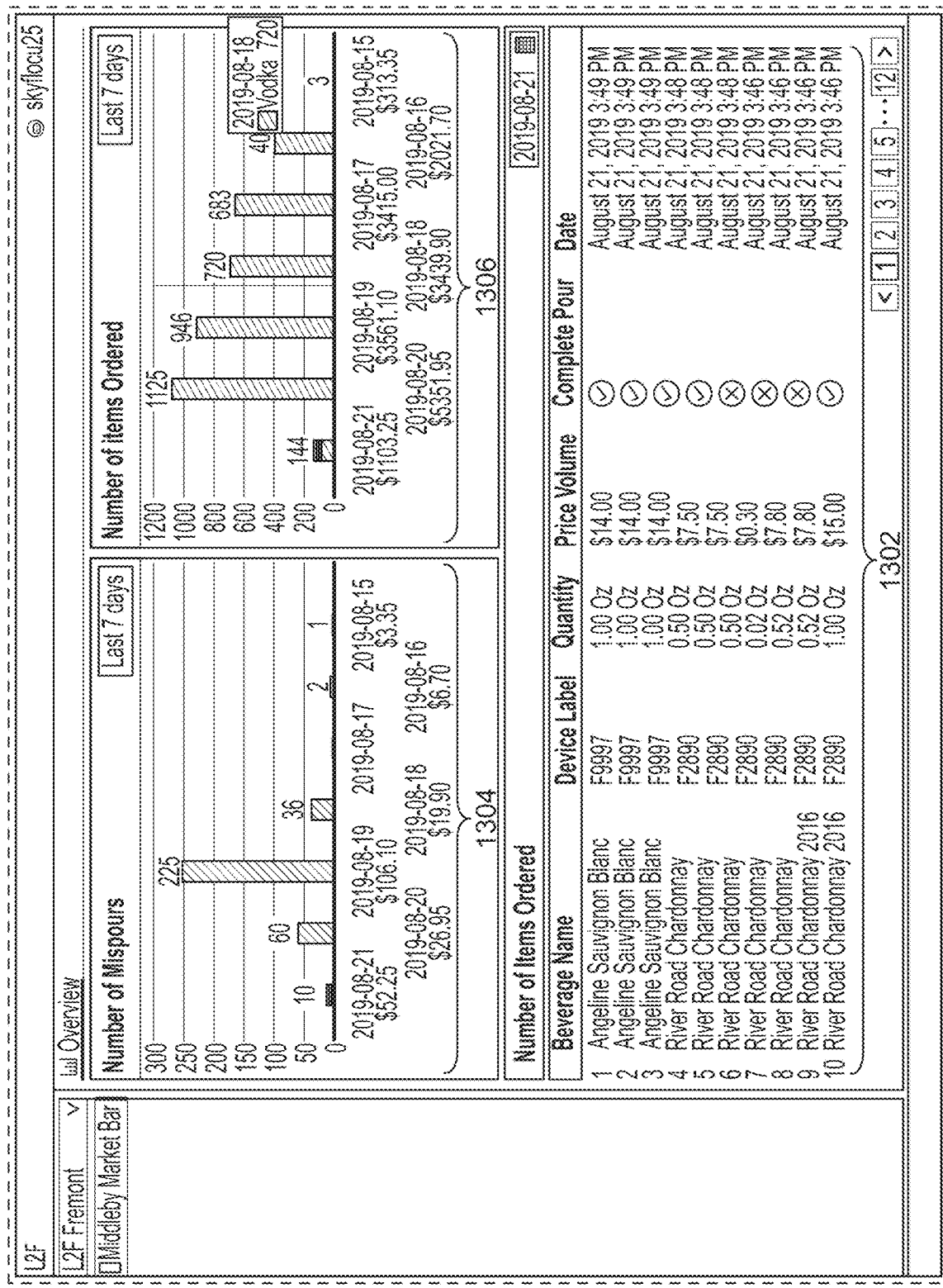
FIG. 13 depicts an exemplary management application of a bar operations system in accordance with some embodiments of the present disclosure.

FIG. 13 depicts an exemplary management application of a bar operations system in accordance with some embodiments of the present disclosure. In an exemplary embodiment, such an interface is made available to management employees via a gateway device or an application to provide pertinent information for identifying actionable data from measurements of bar operations, such as mis-pours 1304, successful pours 1306, and details 1302 regarding the same.

Figure 14:
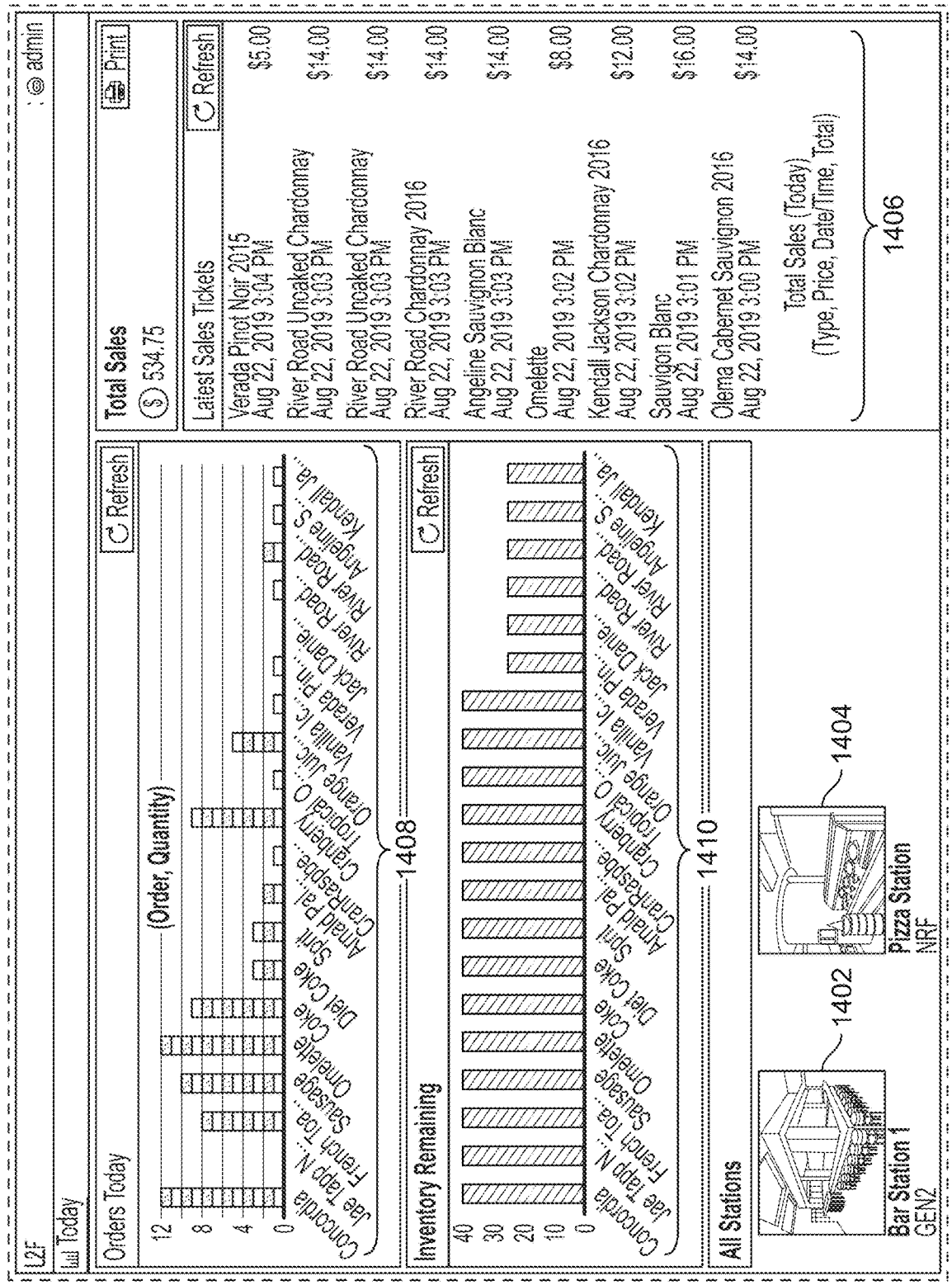
FIG. 14 depicts an exemplary management application for inventory of a bar operations system in accordance with some embodiments of the present disclosure.

FIG. 14 depicts an exemplary management application for inventory of a bar operations system in accordance with some embodiments of the present disclosure. In an exemplary embodiment, such an interface is made available to management employees via a gateway device or an application to provide pertinent information for identifying actionable data relating to orders and inventory in bar operations. Exemplary displays may include information relating to order histories 1408, inventory 1410, and an ongoing timestamped ticker of order and inventory information for multiple stations 1402 and 1404 within an establishment.

Figure 15:
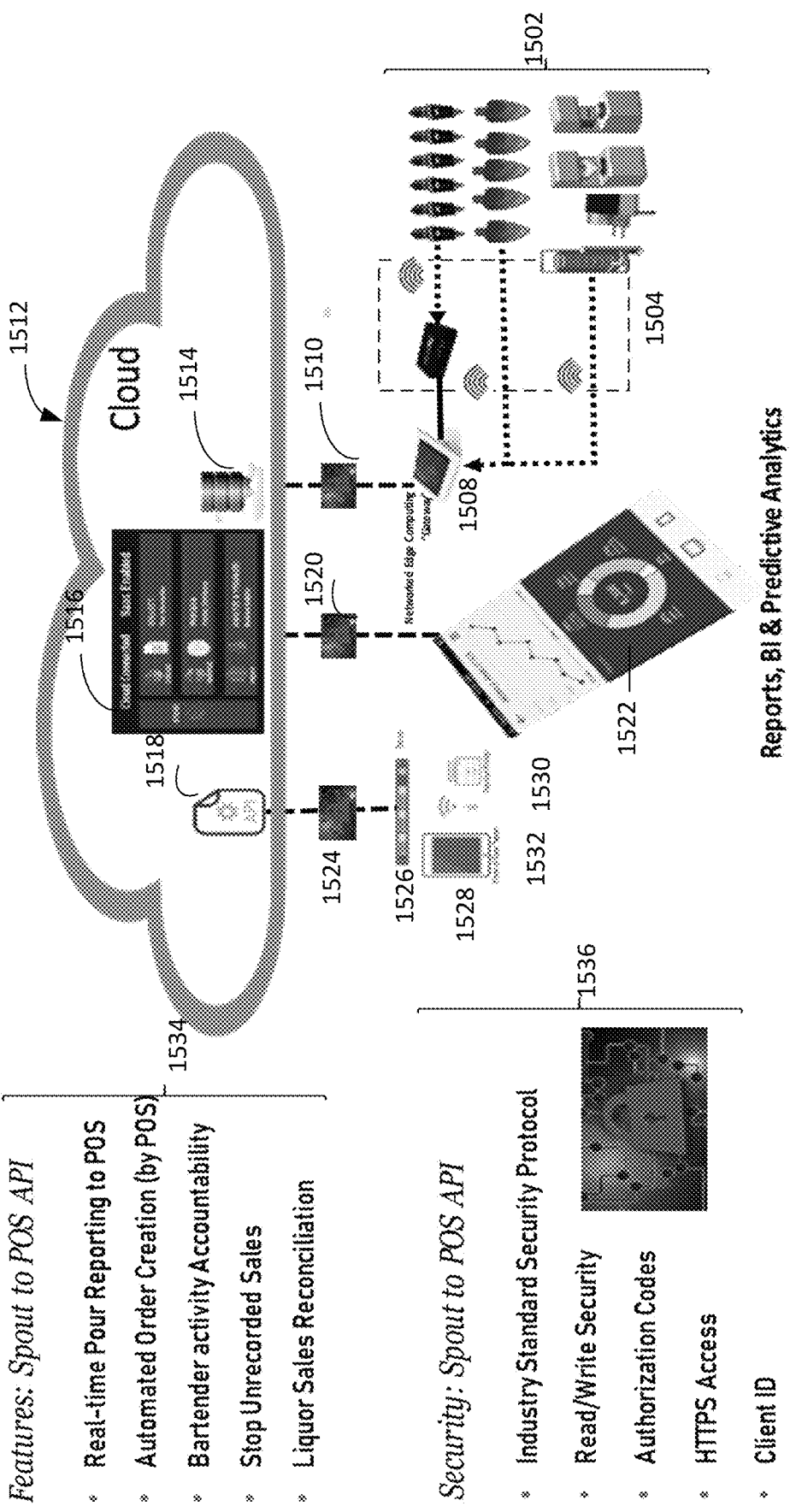
FIG. 15 depicts an exemplary system architecture for a bar operations system in accordance with some embodiments of the present disclosure.

FIG. 15 depicts an exemplary system architecture for a bar operations system in accordance with some embodiments of the present disclosure. Local monitoring and control devices 1502 such as spouts, dispensers, automated prep systems, inventory access systems, and sensors are connected to a gateway 1508 via encrypted wireless connections 1504, and may have an additional layer of encryption between the devices and the gateway (e.g., established via a registration or pairing process unique from overlying connection procedures for wireless protocols). The gateway may communicate with servers 1514 of a beverage management cloud system 1512 via a secure connection 1510 (e.g., secured via a unique registration process, in addition to any standard security protocols). The cloud system 1512 in turn provides access to real-time data and analytics via APIs 1518 accessible via secure connection 1524 by applications operating on remote servers/devices 1526 and wireless devices 1528, 1530, and 1532. A secure web portal 1516 may provide similar information to browsers 1522 via a secure connection 1520. In this manner, the bar operations system can provide secure and universal access to features 1534 such as real-time pour reporting, automated order creation, employee activity reports, remote intervention into unrecorded sales/pours, sales and inventory reconciliation, and the like.

Figure 16:
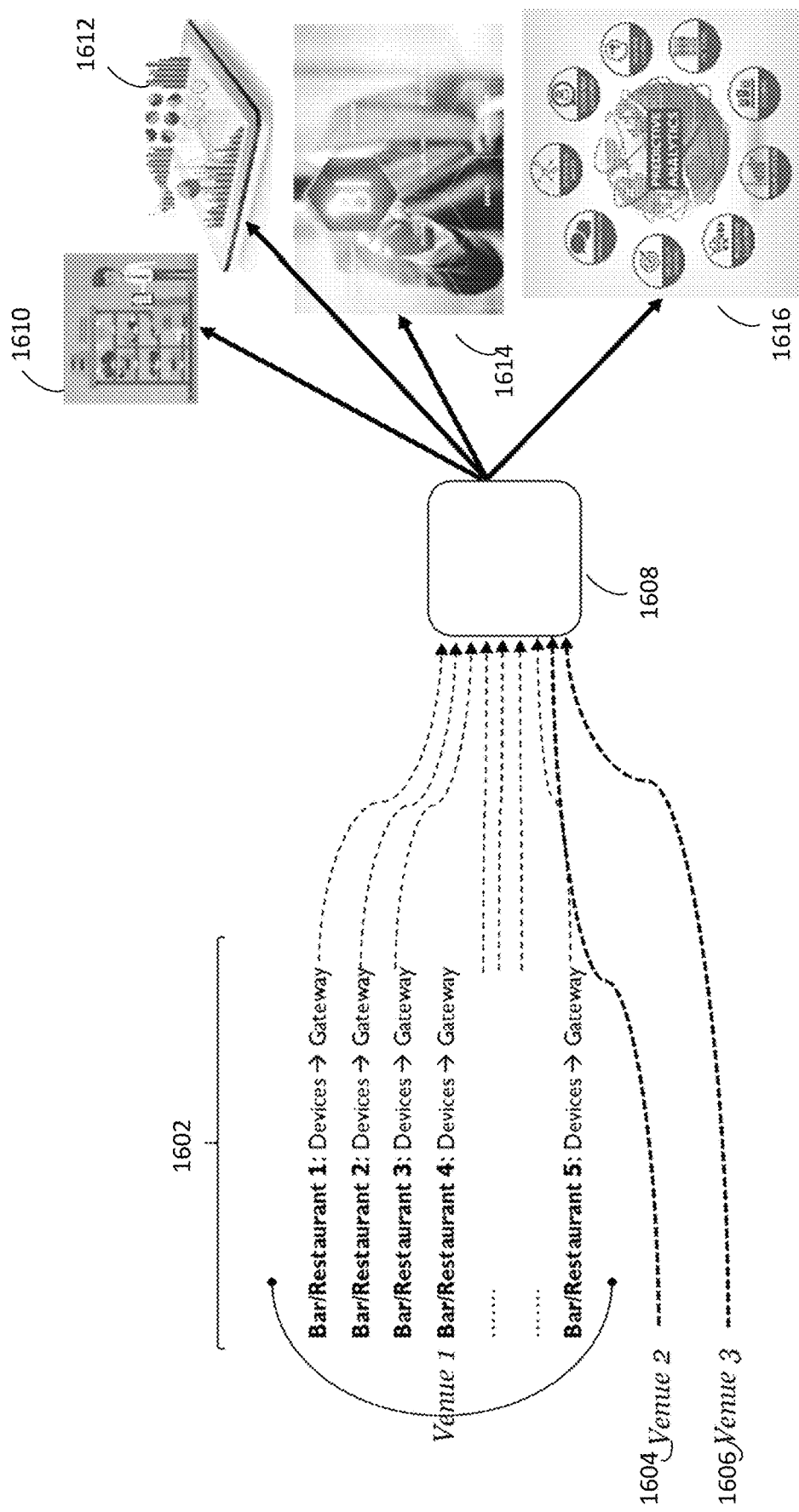
FIG. 16 depicts exemplary cloud analytics of a bar operations system in accordance with some embodiments of the present disclosure.

FIG. 16 depicts exemplary cloud analytics of a bar operations system in accordance with some embodiments of the present disclosure. In the exemplary embodiment of FIG. 16, multiple venues 1602, 1604, and 1606 provide data to a cloud-based bar management system 1608, which in turn provides remote services at an establishment, entity, and industry level such as inventory management 1610, reporting and analytics 1612, business intelligence 1614, and predictive analytics 1616, as described herein.

Figure 17:
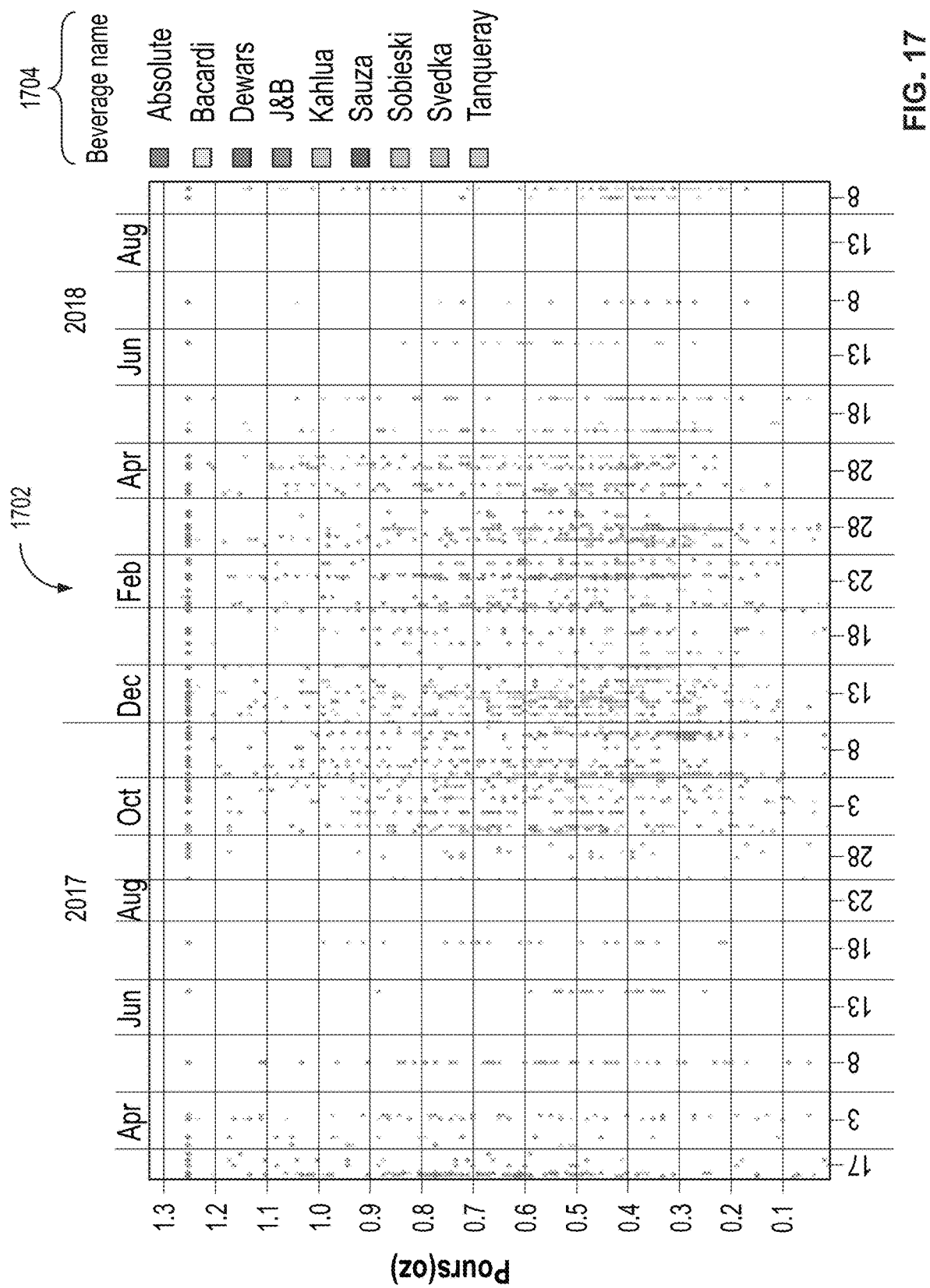
FIG. 17 shows an exemplary display of pour data collected over time in accordance with some embodiments of the present disclosure.
Figure 18:
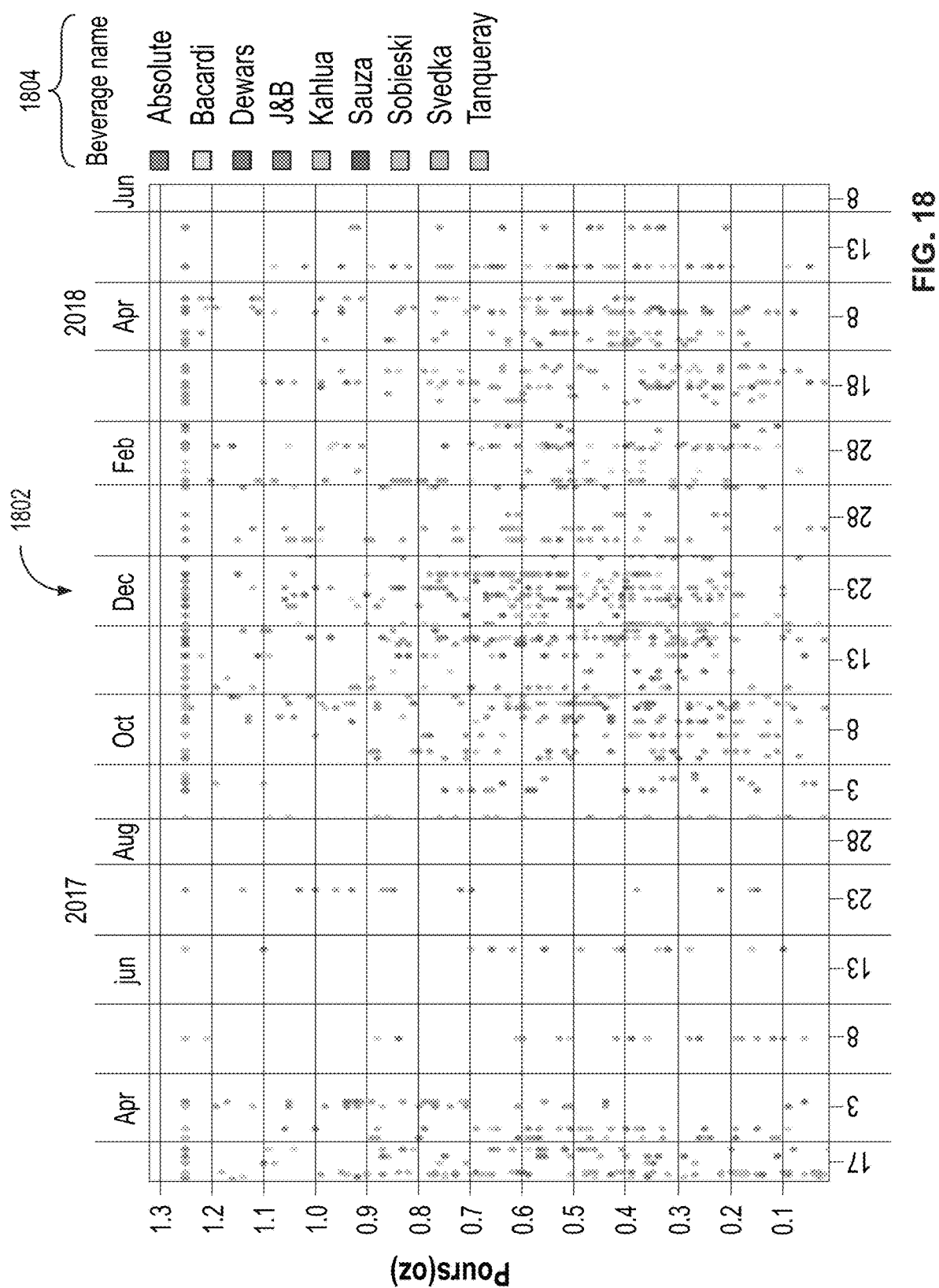
FIG. 18 shows another exemplary display of pour data collected over time in accordance with some embodiments of the present disclosure.

FIGS. 17-18 show displays of pour data collected over time in accordance with some embodiments of the present disclosure. In the exemplary charts, pour data 1702 and 1802 for particular beverages 1704 and 1804 has been collected in real-time and is organized by time periods (e.g., year, month, day, hour, minute, and second of pour). In some embodiments, each data point describes the pour volume and time of pour. Displays may also contain information about ordered pour amounts, overpours, and the total pours over time. The pour data can then be identified or sorted by various categories such as pour date and time, pour amount, pour volume, bartender ID, etc. For example, a color may distinguish data points that reflect overpours from the underpours and exact pours. In a further example, the data display may be sorted such that only data points reflecting pour amounts over a specific volume are displayed.

Data can be displayed either remotely or locally. For example, the data may be locally displayed on a web browser or a mobile application with continuous updates. Notifications may be generated based on the data gathered. For example, the system may generate alerts based on the amount of overpours in a set time period, the amount of overpours by bartender ID, periods of bar inactivity, etc. In this way, a bar manager may make real-time changes to the operations of the bar to address problems as they arise.

In some embodiments, a user can set an alert to raise attention to a specific event triggered by the data. For example, a bar manager can filter the collected data such that only the data of interest is delivered, and an alert can be generated for when the data of interest crosses a certain threshold. In one embodiment, the bar manager may want to specifically track when the amount of overpours and giveaways have reached a certain maximum or other statistical criteria. A preconfigured data filter in such an embodiment may be to show only datapoints reflecting pour volume greater than a set point by some percentage or other measure, e.g.:

$$Pour_{amount} = Pour_{setpoint} + x \%$$

In this embodiment, the number of displayed datapoints may be limited to only those corresponding to pour volumes of at least $Pour_{amount}$. For example, when a certain number of data points appears in a predetermined time period, an alert may be triggered such that the bar manager can be notified of the overpours.

Figure 19:
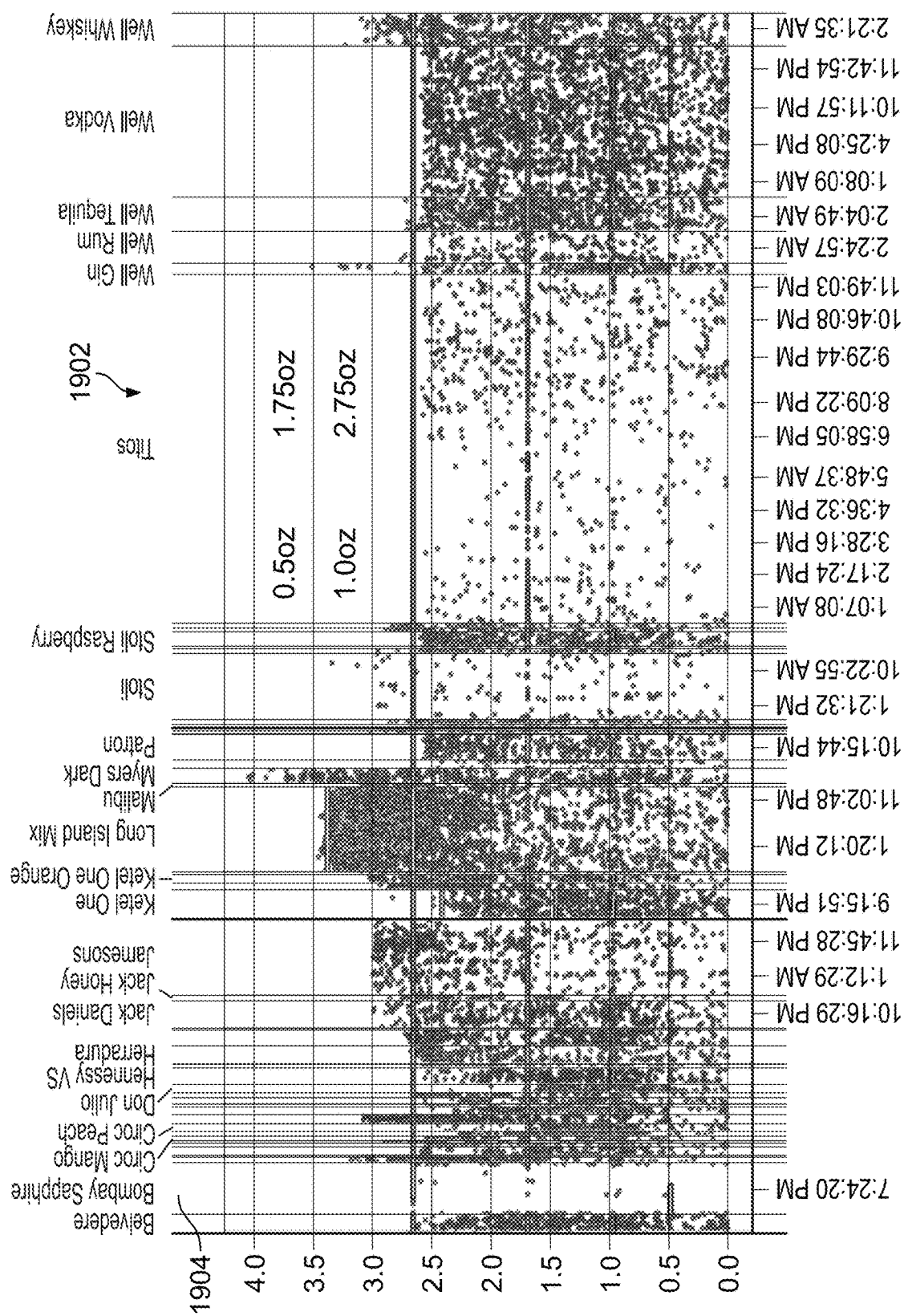
FIG. 19 shows analysis data of pour data collected over time and by beverage in accordance with some embodiments of the present disclosure.

FIG. 19 shows analysis data of pour data 1902 collected over time and by beverage 1904 in accordance with some embodiments of the present disclosure. The x-axis of the chart may first sort the pour data indicated on the y-axis by beverage name and may then sort each beverage's pour data by time of pour. For example, every pour made for a time period across a day may be recorded and presented such that the display highlights, by beverage, the pours during a time of day. For example, FIG. 19 shows that the beverage "Tito's vodka" is poured more consistently throughout the day than other beverages.

Figure 20:
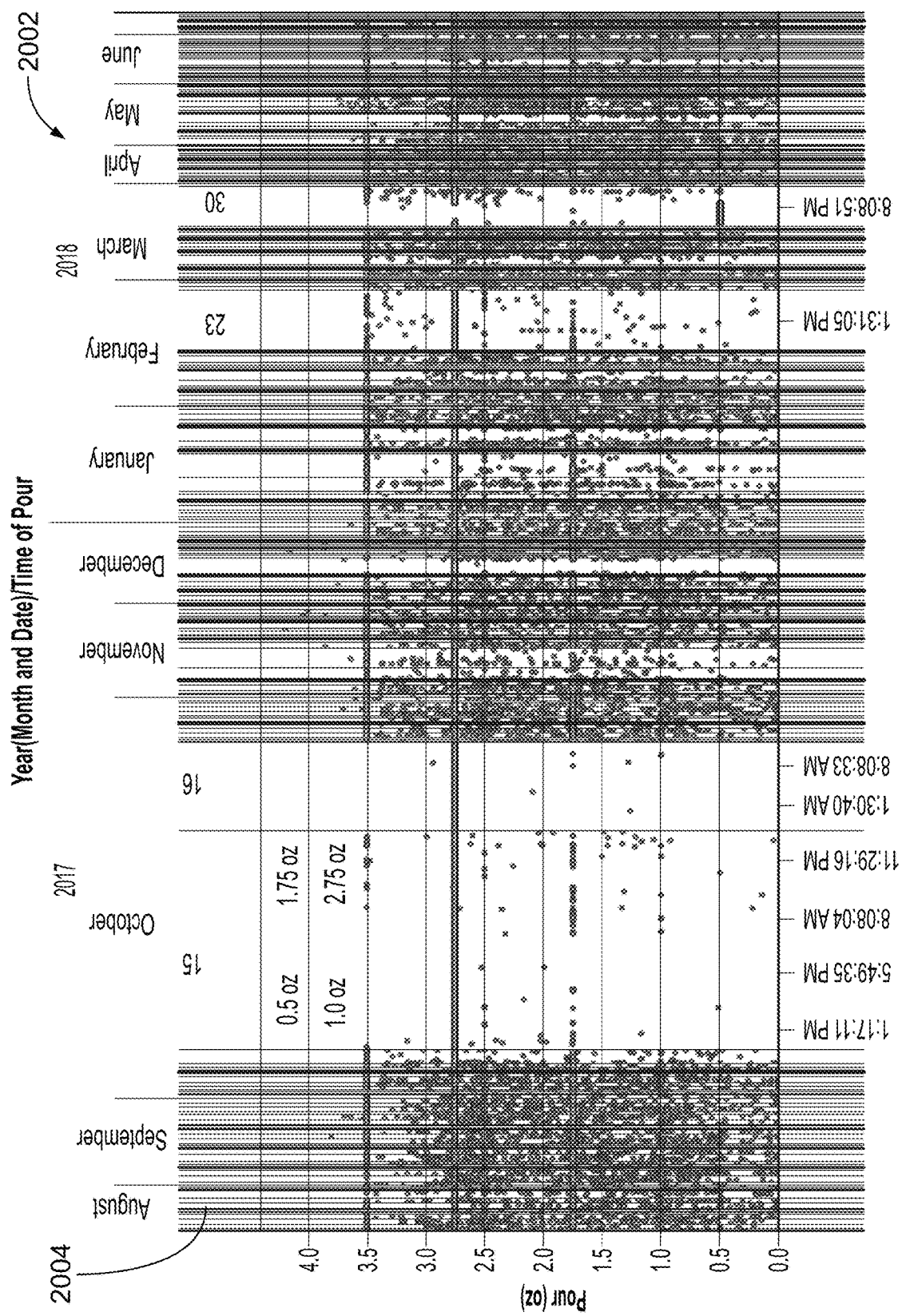
FIG. 20 shows analysis data of pour data collected over time in timescales of year, month, day, and hour in accordance with some embodiments of the present disclosure.

FIG. 20 shows analysis data of pour data 2002 collected over time in timescales of year, month, day, and hour in accordance with some embodiments of the present disclosure. The x-axis 2004 of the chart may be sorted first by day and second by the hours in each day. For example, FIG. 20 shows that more pours were made on a particular day (e.g., October 15) than on any other day of the displayed time period.

Figure 21:
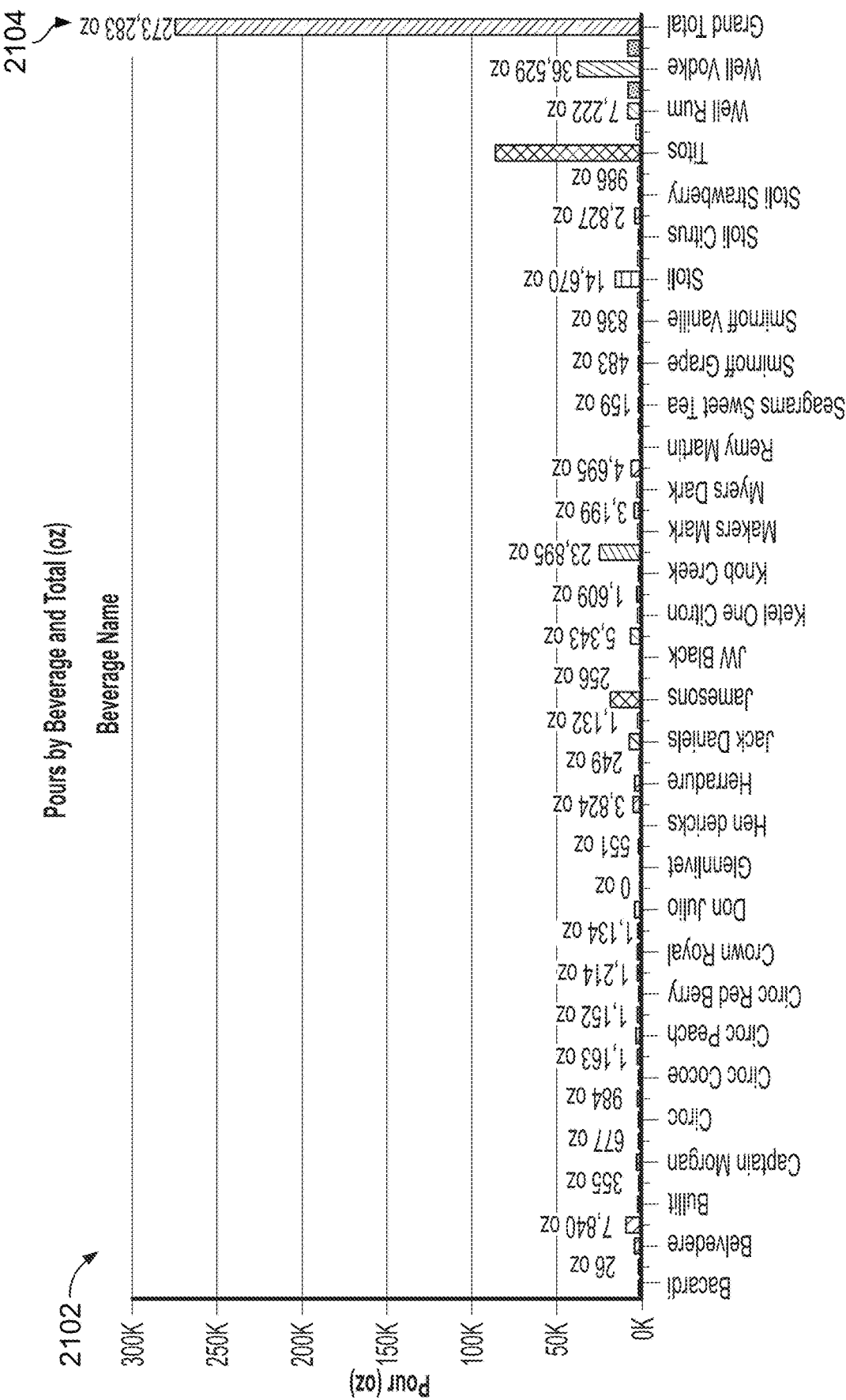
FIG. 21 shows analysis data of pour data collected over a time period by beverage in accordance with some embodiments of the present disclosure.

FIG. 21 shows analysis data of pour data 2102 collected over a time period by beverage in accordance with some embodiments of the present disclosure. In some embodiments, the total ounces 2104 poured across all beverages is included in the display (e.g., "Grand Total" of 273,282 oz). An exemplary predictive recommendation can be made from the data in FIG. 21, e.g., that shows that Tito's Vodka was the most-poured drink in the year (e.g., the system may produce various permutations of cocktail recipes featuring Tito's Vodka).

Figure 22:
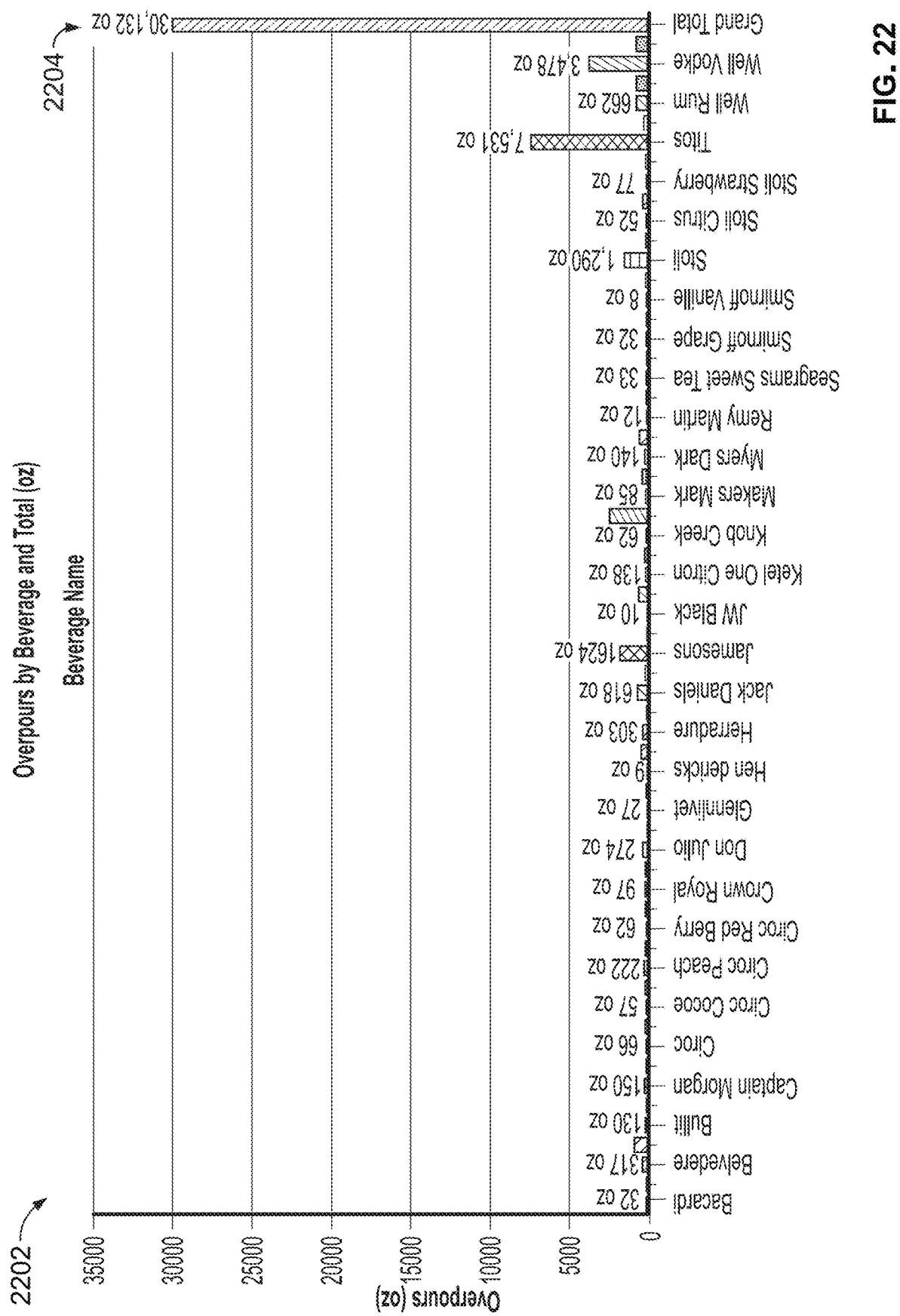
FIG. 22 shows analysis data of overpour data collected over a period of time by beverage in accordance with some embodiments of the present disclosure.

FIG. 22 shows analysis data of overpour data 2202 collected over a period time by beverage in accordance with some embodiments of the present disclosure. In some embodiments, the total ounces overpoured 2204 across all beverages is included in the display (e.g., "Grand Total" of 30,132 oz). A corrective action can be suggested, e.g., using the data in both FIG. 21 and FIG. 22 that shows that approximately 20% of Long Island Mix is overpoured as compared to the 9% of the total Tito's Vodka poured is overpoured (e.g., the system may instruct the beverage control devices associated with Long Island Mix to allow a consecutive pour only after at least 30 seconds to discourage top-offs).

Figure 23:
FIG. 23 shows analysis data of sales by beverage in accordance with some embodiments of the present disclosure.

FIG. 23 shows analysis data of sales by beverage 2302 in accordance with some embodiments of the present disclosure. In some embodiments, the total sales across all beverages 2304 is included in the display (e.g., "Grand Total" of $1,236,444), as well as sales data from all specific beverages. As described herein, this information can be processed with a variety of data sources to optimize establishment operations and recommendations to optimize profitability and sales volume.

Figure 24:
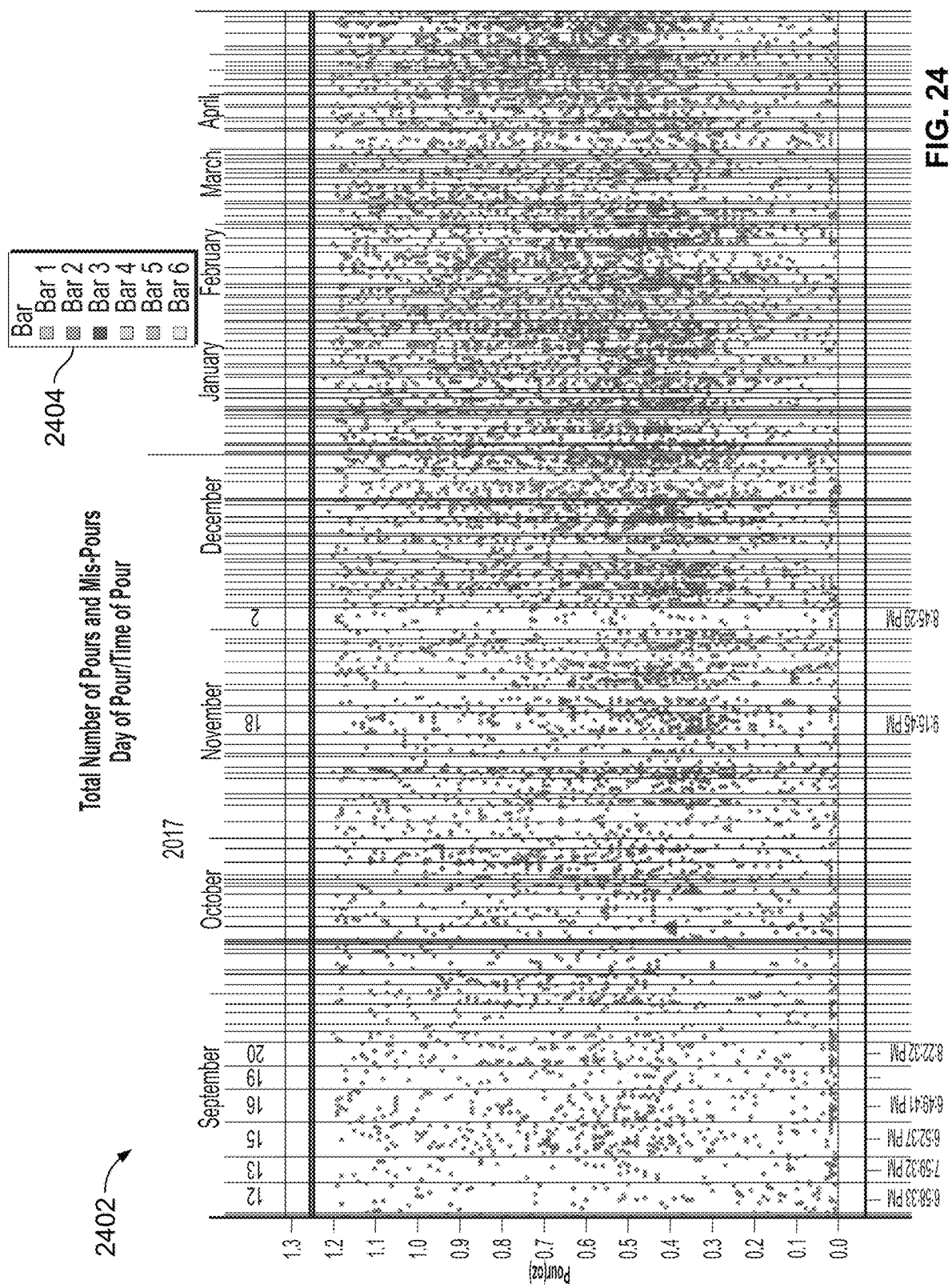
FIG. 24 shows analysis data capturing pour data and classifying the data as pours and mis-pours in accordance with some embodiments of the present disclosure.

FIG. 24 shows analysis data capturing pour data 2402 and classifying the data as pours and mis-pours in accordance with some embodiments of the present disclosure. The system may control, monitor, and report beverage pour errors (e.g., beverage mis-pours) by bar 2404. For each pour that occurs at a bar 2404 and at a certain time, the pour amount can be captured and relayed by the beverage control device via the gateway to the fog server. At the gateway and/or fog server, the pour amount may go through a data criterion to determine if the pour amount conforms to a set pour (e.g., within a threshold, based on the drink menu and the order) or an overpour. This determination may be done immediately after the set pour or a giveaway by reconciling the pour data and time to the charge for the order. The exemplary data is aggregated from data collected at a bar and classified into set pours and mis-pours by time, day, month, and amount of pour.

Figure 25:
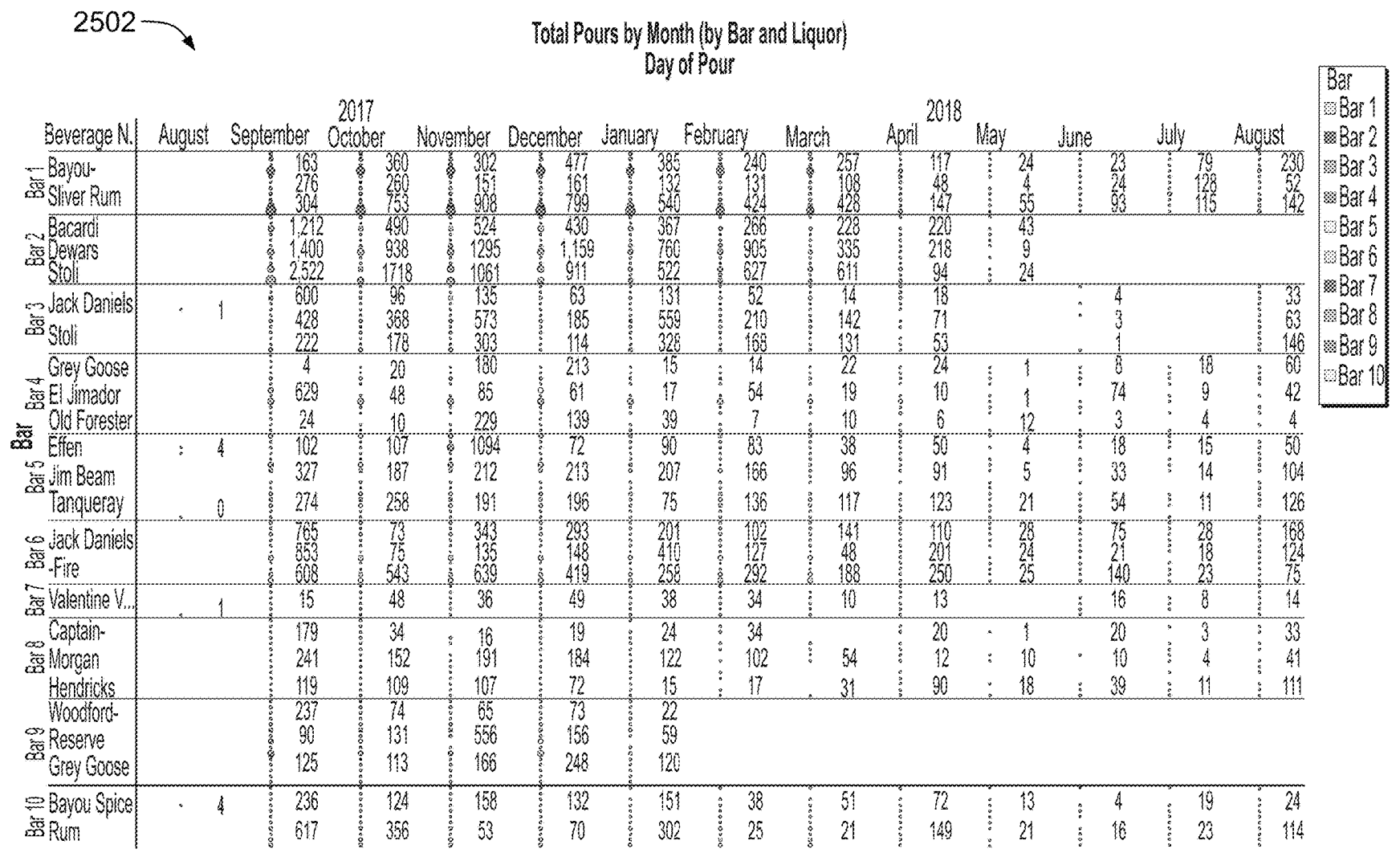

FIG. 25 shows analysis data of total pours 2502 by month, bar, and beverage in accordance with some embodiments of the present disclosure. In some embodiments, data points may be represented by varying sized circles, where the larger circles correspond to larger pour volume. For example, bar with bar ID "Bar1" has a large volume of both Jack Daniels and New Amsterdam Vodka compared to other liquors the bar offers.

Figure 26:
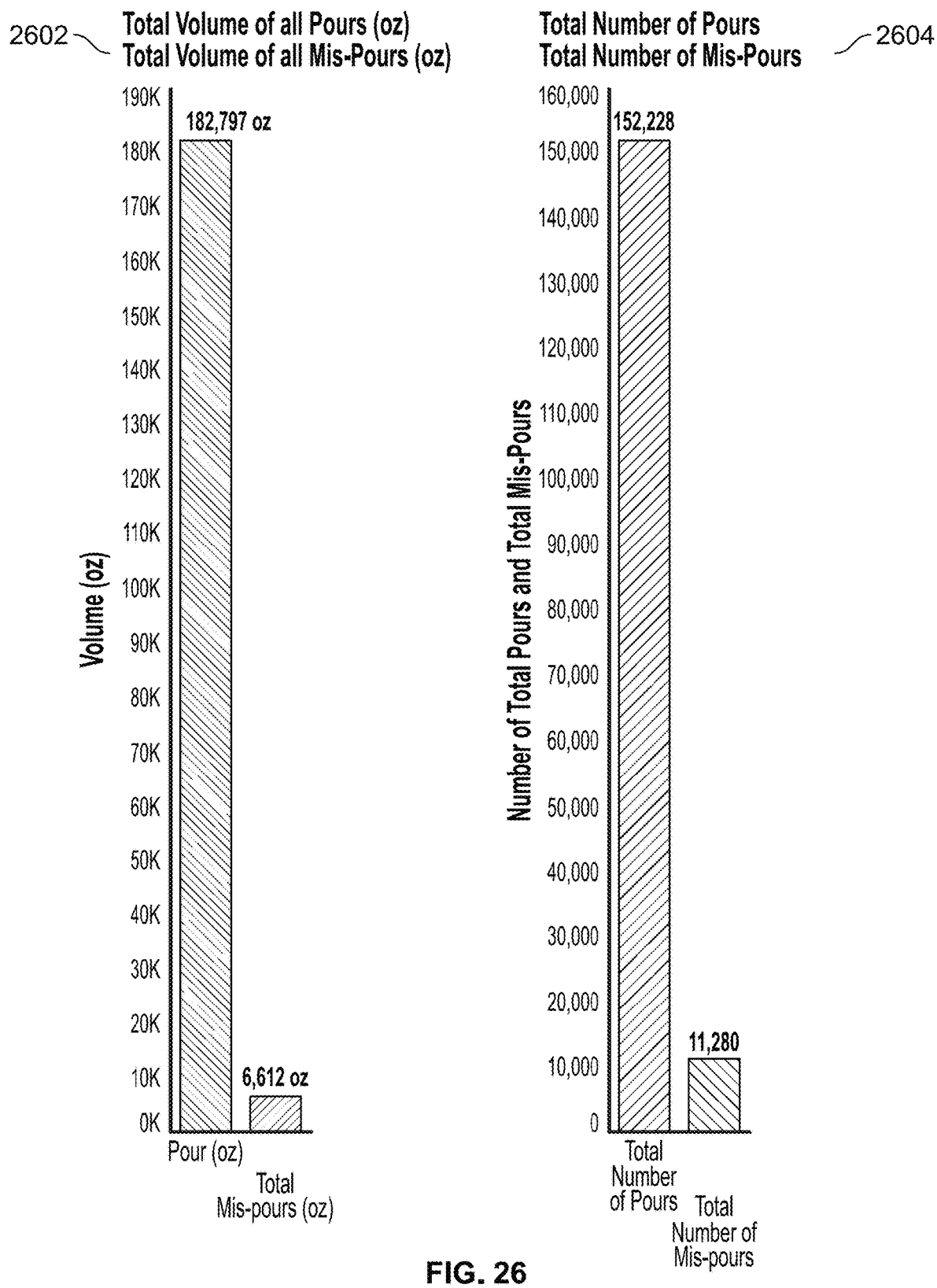
FIG. 26 shows a comparison of total volume and total number of both pours and mis-pours in accordance with some embodiments of the present disclosure.

FIG. 26 shows a comparison of total volume 2602 and total number 2604 of both pours and mis-pours in accordance with some embodiments of the present disclosure. In some embodiments, the mis-pours are a relatively small fraction of the total pours by both number and volume as depicted in FIG. 26. The comparison may be taken over a defined time period (e.g., over one year).

Figure 27:
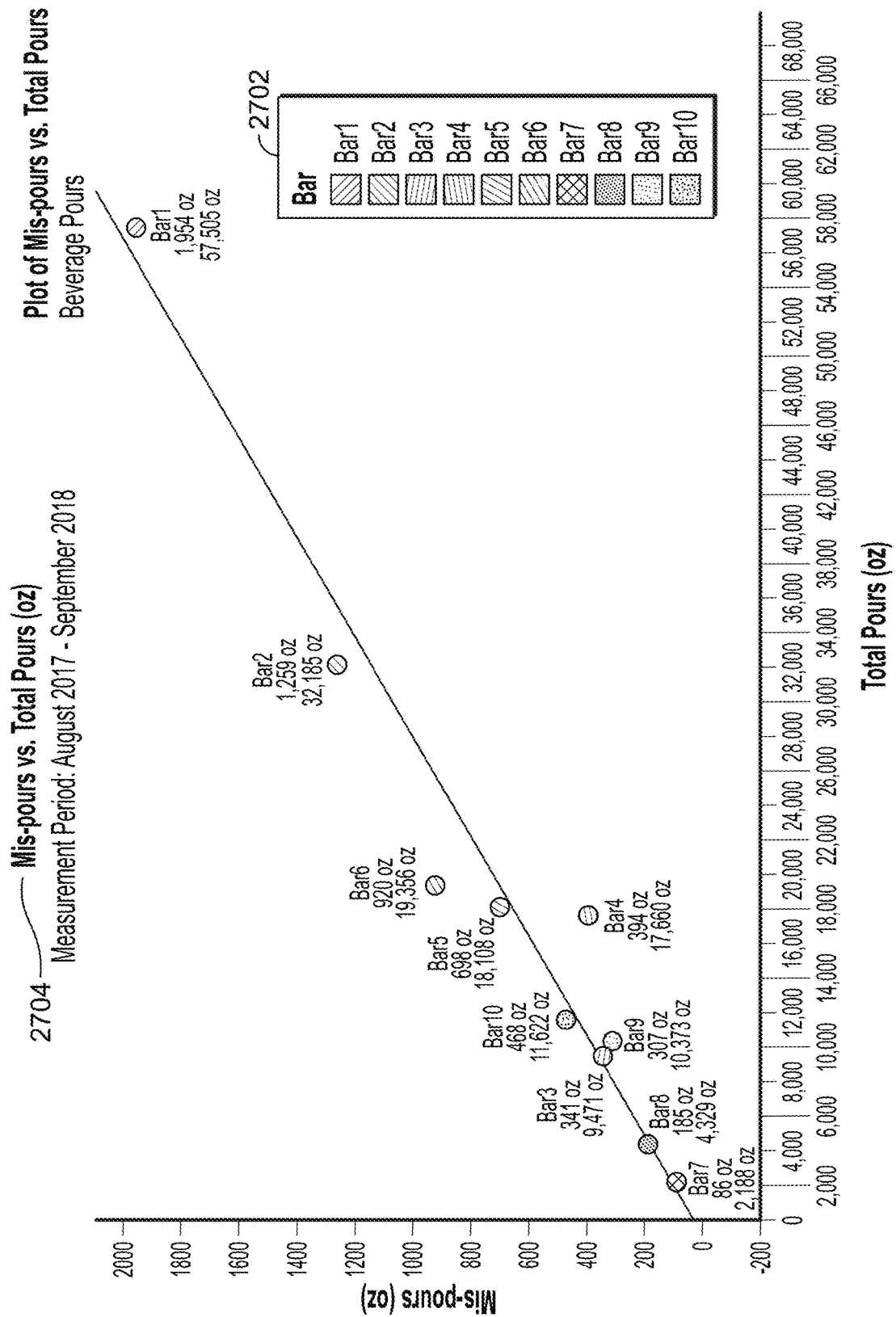
FIG. 27 shows analysis data of mis-pours over total pours across individual bars in accordance with some embodiments of the present disclosure.

FIG. 27 shows analysis data of mis-pours over total pours 2704 across individual bars 2702 in accordance with some embodiments of the present disclosure. The system may perform a linear regression analysis on the data points to show that the volume of mis-pours increases linearly with the total volume of pours. A system may apply this analysis to each venue with multiple bars to provide larger trends that indicate that the staff at one venue is mis-pouring at larger rate than the staff at another venue.

Figure 28:
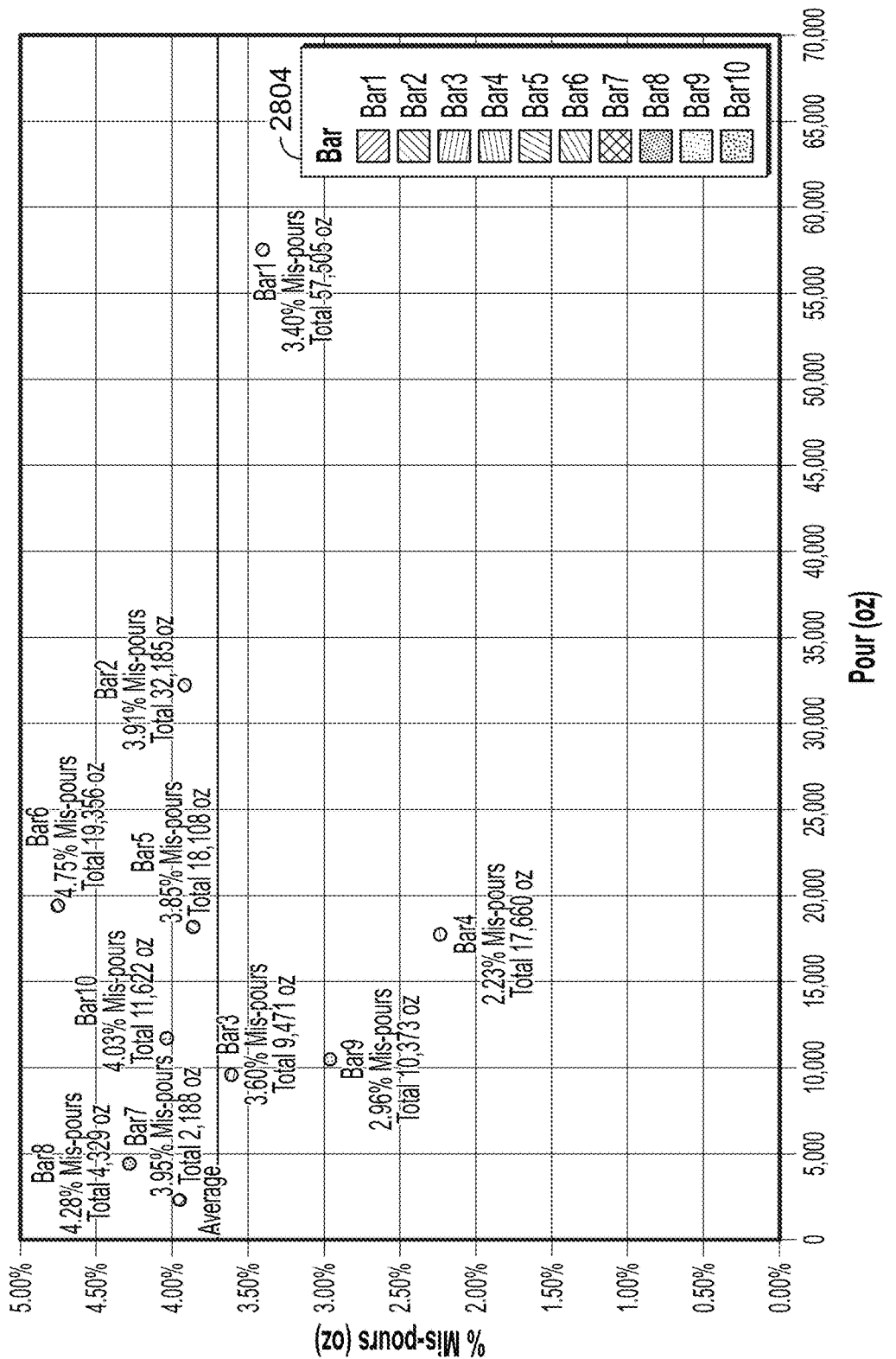
FIG. 28 shows analysis data of mis-pours as a percent of total pours by volume for particular bars in accordance with some embodiments of the present disclosure.

FIG. 28 shows analysis data of mis-pours as a percent of total pours 2802 by volume for particular bars 2804 in accordance with some embodiments of the present disclosure. The data may show that mis-pours, on average, are 3.70% of Total Pours by Volume for all bars, while showing significant variances between individual bars. Outliers from this data (e.g., significant volume-related changes, or significant differences at or near a particular volume) may be indicative of operational or equipment issues to be addressed to improve operations.

Figure 29:
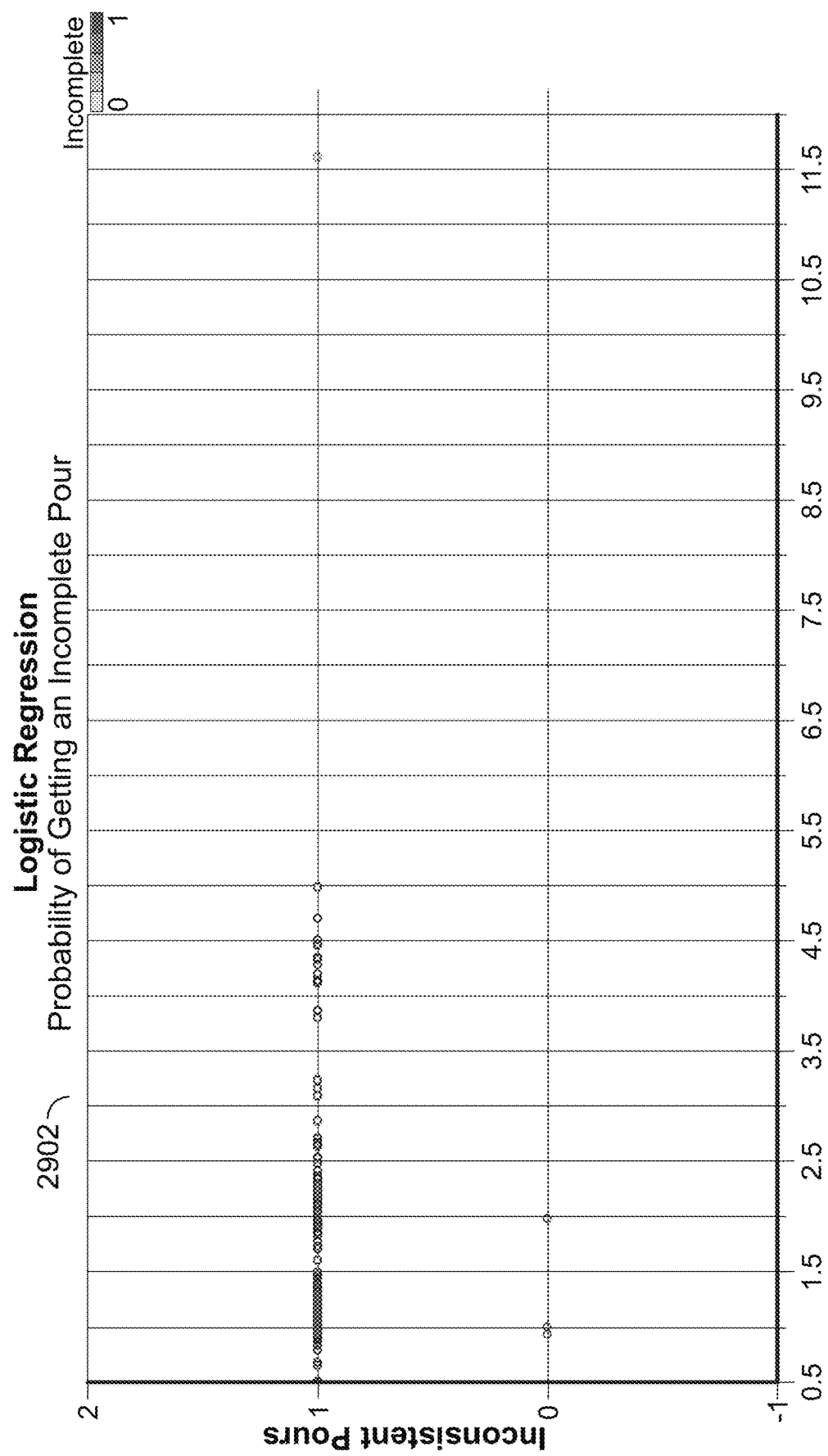
FIG. 29 shows a logistic regression chart of inconsistent pours by volume in ounces in accordance with some embodiments of the present disclosure.

FIG. 29 shows a logistic regression chart 2902 of inconsistent pours by volume in ounces in accordance with some embodiments of the present disclosure. The system may indicate that the probability of getting an incomplete pour is high for certain types of pours, ensuring that an incomplete pour is recorded with a high confidence level.

Figure 30:
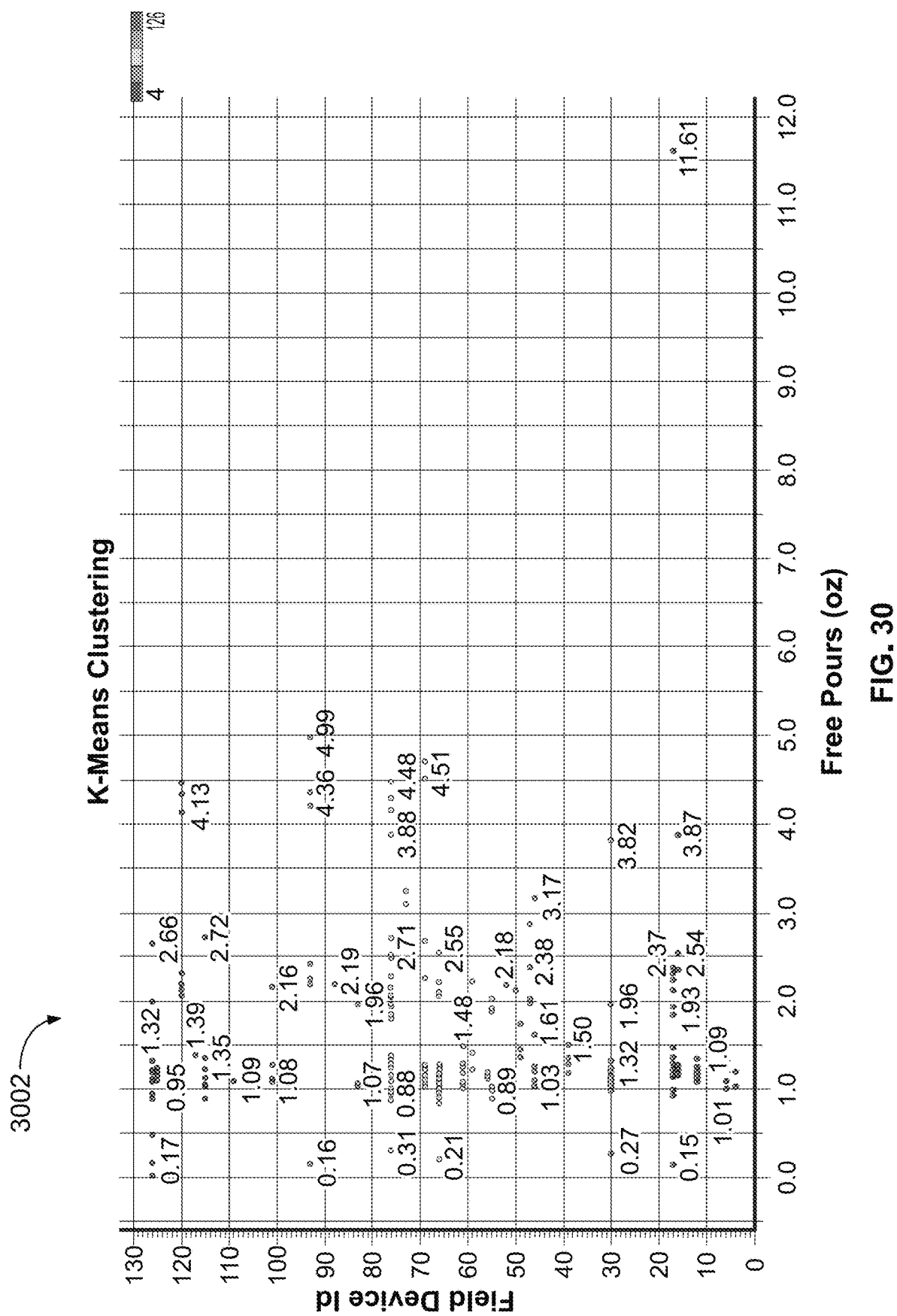
FIG. 30 shows a K-means clustering chart of the quantity of free pours given by each field device in accordance with some embodiments of the present disclosure.

FIG. 30 shows a K-means clustering chart 3002 of the quantity of free pours given by each field device in accordance with some embodiments of the present disclosure. In some embodiments, the field device is indicated by an ID number. The system may show that particularly field device IDs have provided a high volume of free pours on an absolute or percentage basis. Such data may be indicative of employee mis-pours, training opportunities, equipment wear, and other issues, and may be combined with other collected data and analysis as described herein to further diagnose and provide predictive analysis to remedy losses due to improper pours.

Figure 31:
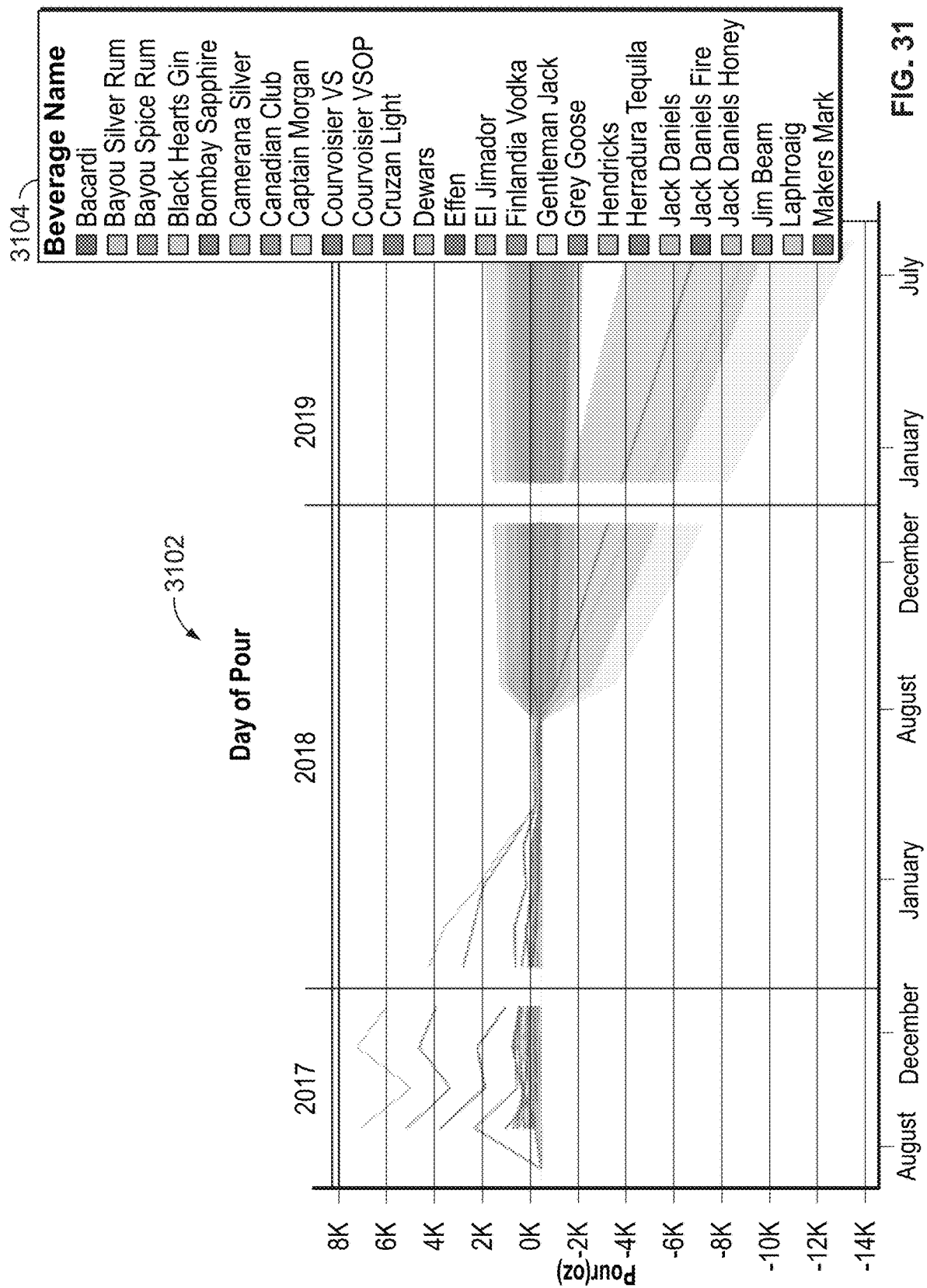
FIG. 31 shows a time series forecasting of pour volume across beverages in accordance with some embodiments of the present disclosure.

FIG. 31 shows a time series forecasting of pour volume 3102 across beverages 3104 in accordance with some embodiments of the present disclosure. In some embodiments, the forecasted data points may be visually distinct from the actual data points (e.g., forecasted data points can be drawn with wider and faintly shadowed lines). In the exemplary embodiment depicted in FIG. 31, the system may predict a decrease in pours for certain beverages, which may lead to a recommendation to purchase fewer of those beverages or recommendations of new recipes to exhaust existing inventory of beverages that are lacking in consumer interest.

FIG. 32 shows a snapshot of pours 3202 for a time period across beverage names at a bar in accordance with some embodiments of the present disclosure. In some embodiments, the beverages may be distinguished from others on the snapshot by color. For example, a "Captain Morgan" beverage had six pours on June 30 as indicated by reference numeral 3204, while a total number of pours 3206 for all beverages over the time period is 1,513 pours.

FIG. 33 shows a snapshot of mis-pours 3302 for a time period across beverage names at a bar in accordance with some embodiments of the present disclosure. In some embodiments, the beverages may be distinguished from others on the snapshot by color. In some embodiments, should the pour data from FIG. 32 be overlaid onto the mis-pour data of FIG. 33, the mis-pour data may be represented as "X"s instead of stars to distinguish it from the pour data. There may also be a threshold of inconsistent pours that can be predetermined (e.g., at least 10 mis-pours indicated by 3306 in a day indicates inconsistent pours). In the exemplary embodiment of FIG. 33, an exemplary 2 mis-pours 3304 occurred on July 4 for Centenario, while a total number of mis-pours for the period is 347.

FIG. 34 shows a snapshot of the cost of mis-pours 3402 for a time period across beverage names at a bar in accordance with some embodiments of the present disclosure. In some embodiments, the cost of mis-pours may be displayed simultaneously by day and by liquor over the total month. The system may display the total amount of money lost to mis-pours 3404 (e.g., $1,023 lost from 209 mis-pours or leakage pours).

Figure 35:
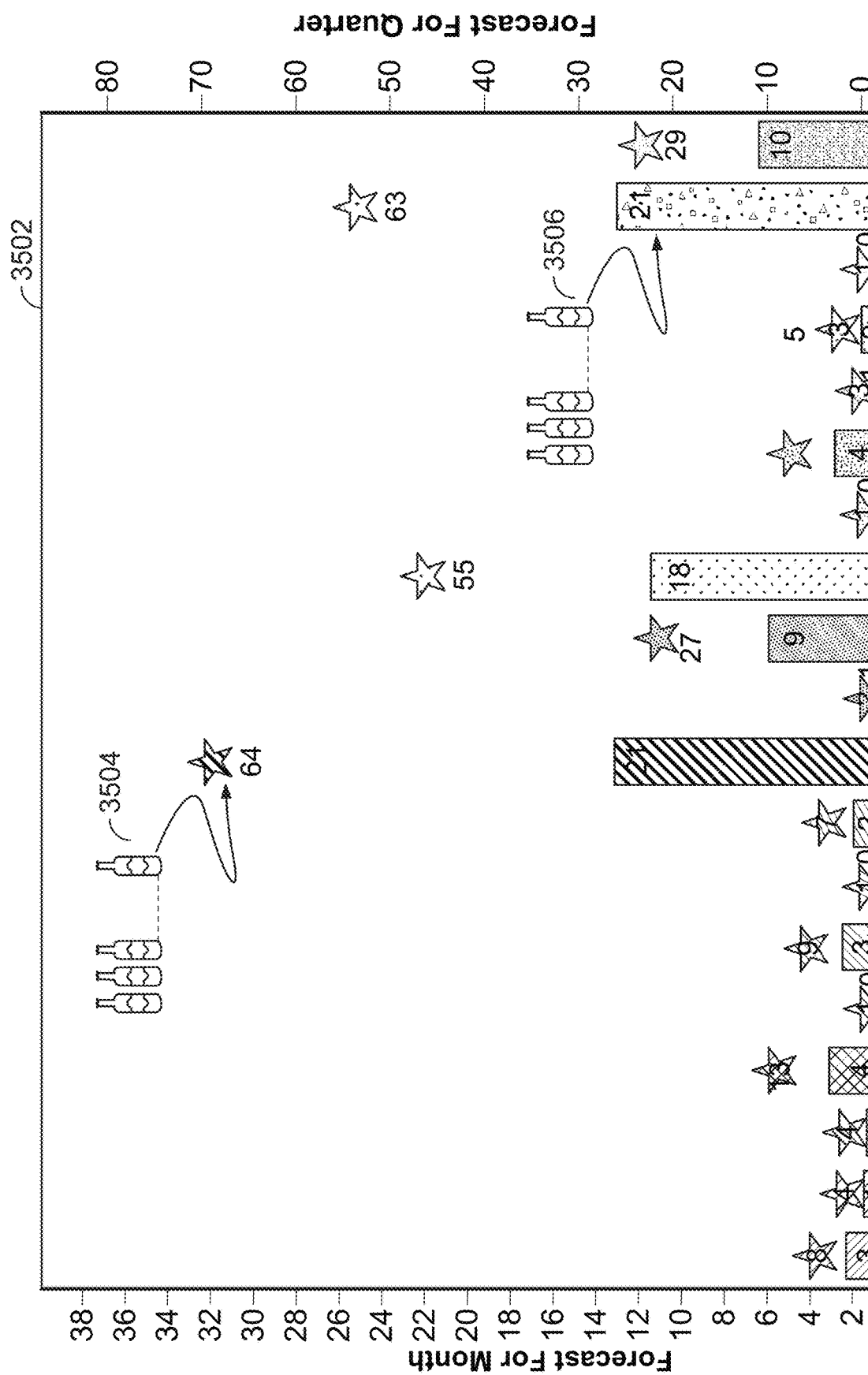
FIG. 35 shows a forecast of liquor inventory for a month and for a quarter across beverages in accordance with some embodiments of the present disclosure.

FIG. 35 shows a forecast of liquor inventory 3502 for a month and for a quarter across beverages in accordance with some embodiments of the present disclosure. In some embodiments, the forecasted liquor inventory for a month is distinguished visually from the forecasted liquor inventory for a quarter (e.g., forecasted liquor inventory for a month is represented by bars such as bar 3506 while forecasted liquor inventory for a quarter is represented as a star 3504). For example, the number of bottles of Patron Silver forecasted for a month may be 21 bottles while the number of bottles forecasted for a quarter may be 63. This information may be used for a variety of inventory controls as described herein (e.g., modifying orders, etc.) and may be integrated with other collected data (e.g., rate of depletion), for example, to enable auto-inventory orders based on pre-determined bottle usage or drink level.

Figure 36:
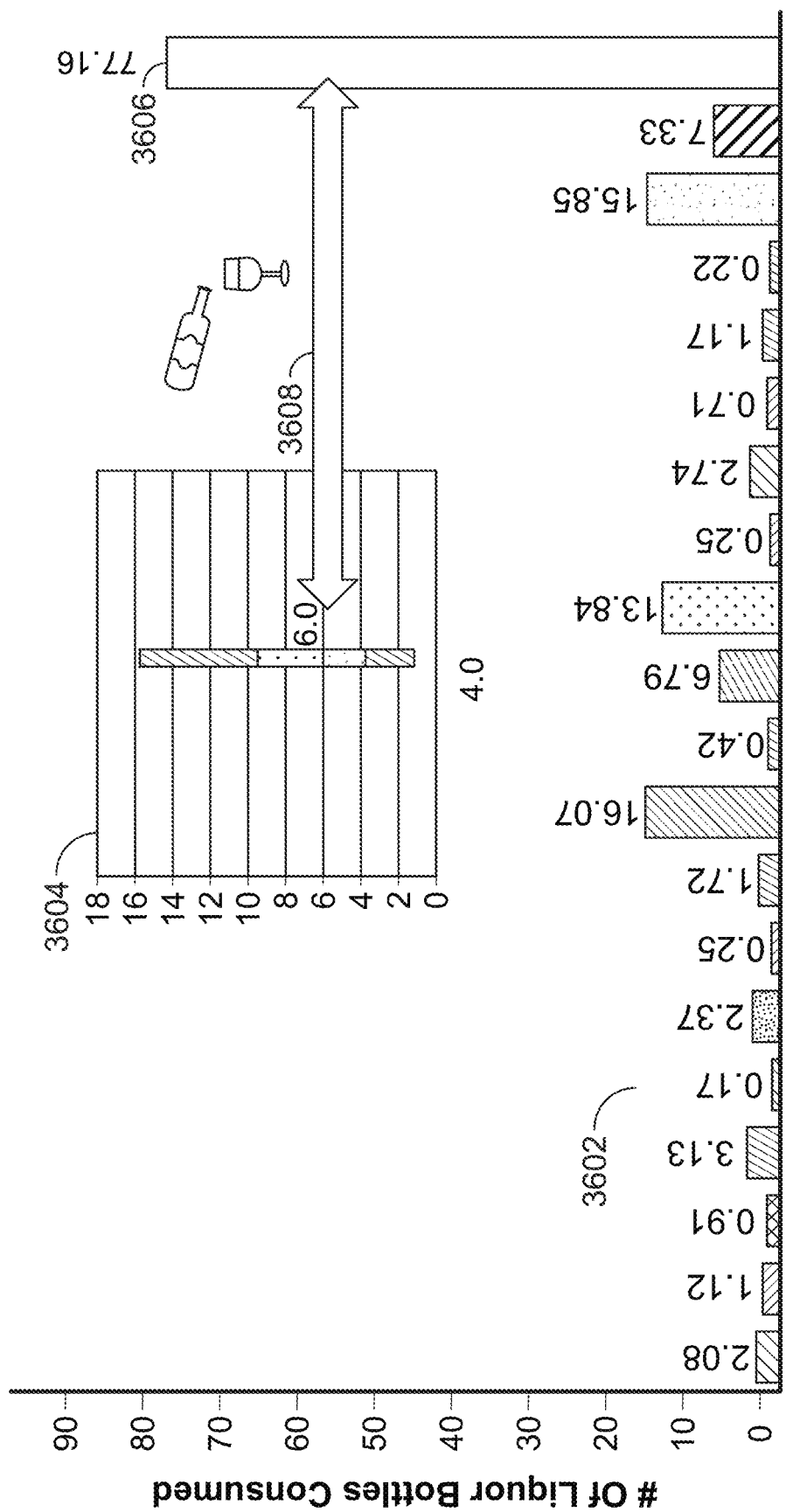
FIG. 36 shows a snapshot of inventory turnover over one month in accordance with some embodiments of the present disclosure.

FIG. 36 shows a snapshot of inventory turnover 3602 over one month in accordance with some embodiments of the present disclosure. In some embodiments, the inventory turnover may be compared 3608 to a benchmark key performance indicator (KPI) 3604. For example, the total number of liquor bottles consumed, as indicated by the snapshot 3606, may be approximately 77 bottles. This example illustrates that 77.16 liquor bottles were consumed in 1 month since every pour was measured by the pour measuring devices. Based on a comparison of inventory, the sitting inventory was consumed in approximately 4 weeks, which compares favorably with the median industry benchmark of 6 weeks for sitting inventory.

Figure 37:
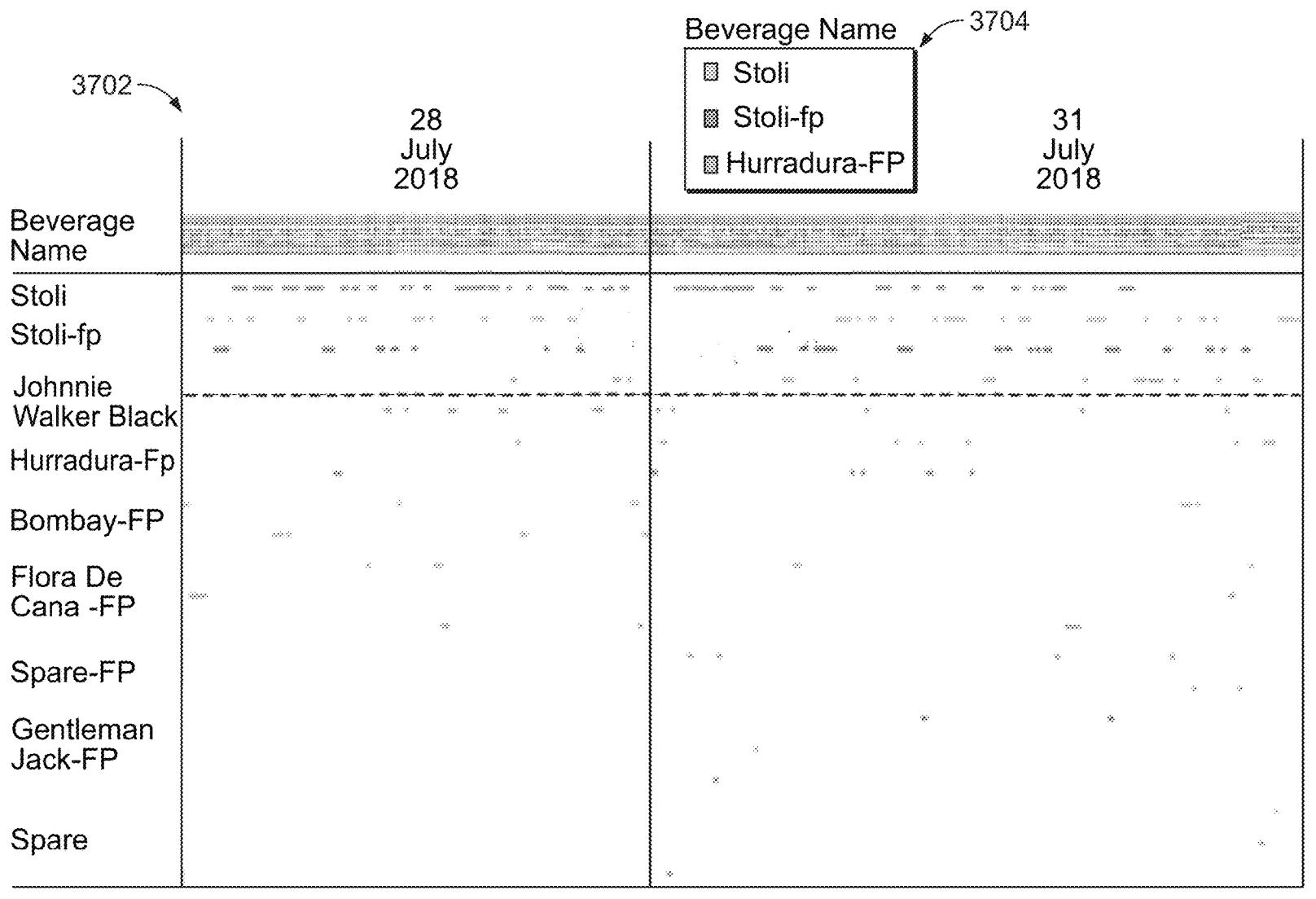

FIG. 37 shows analysis data of pours 3702 by beverage 3704 across two days in accordance with some embodiments of the present disclosure. In some embodiments, there may be a trend showing that a majority of drinks are poured from a small subset of beverages. For example, over 70% of the drinks poured over July 28 and July 29 at two respective establishments are Stoli Vodka and Johnnie Walker Black.

FIG. 38 shows analysis data of the number of pours and mis-pours 3802 by time of day and by beverage 3804 in accordance with some embodiments of the present disclosure. For example, the chart may represent each beverage with a different color and represent the mis-pour or free pour with a shape that is different than the shape used to represent controlled pours.

Figure 39:
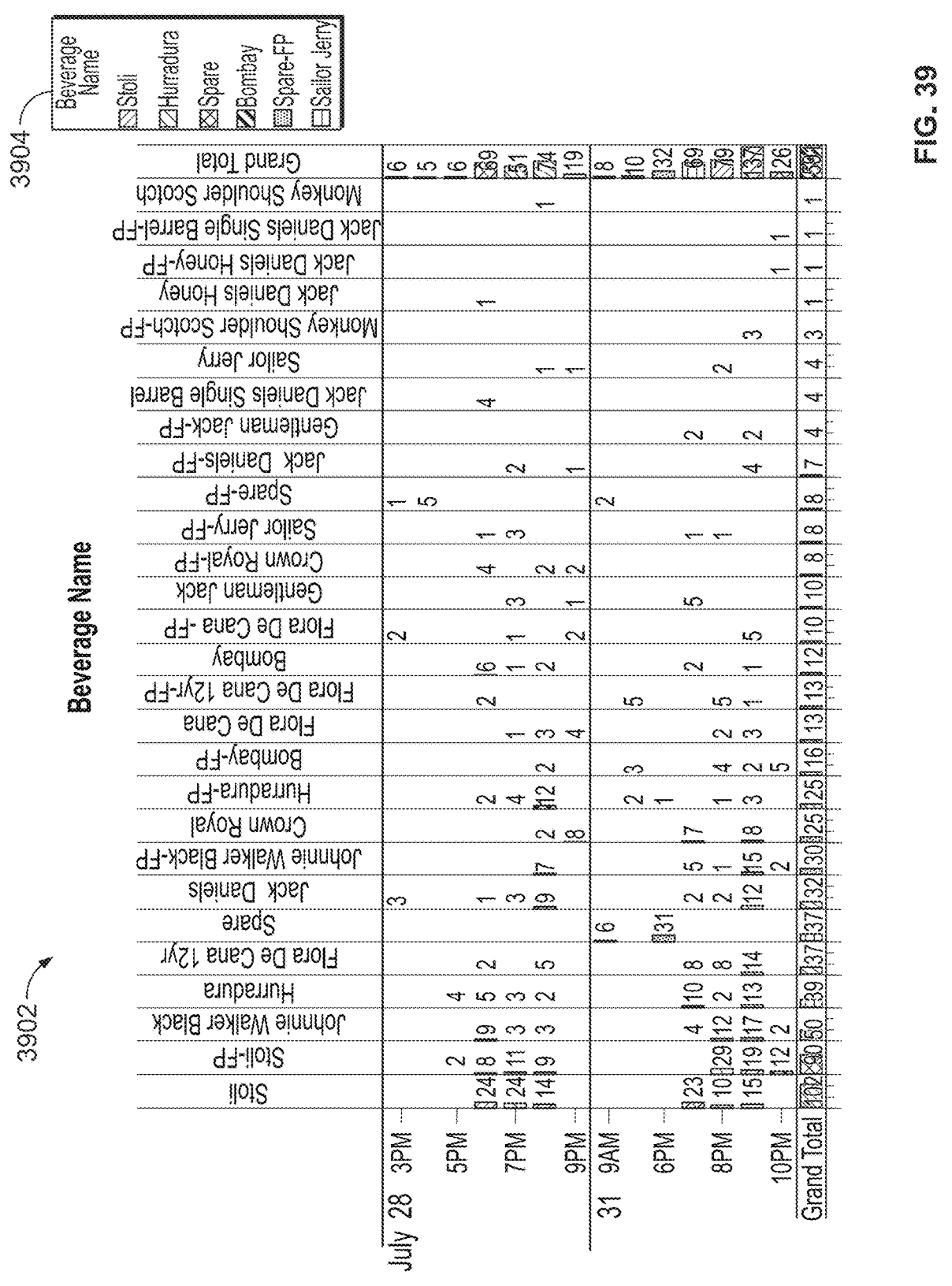

FIG. 39 shows analysis data of beverage trends 3902 by hour and beverage type in accordance with some embodiments of the present disclosure. The chart may indicate which hours of the day have the highest pours and for which beverages 3904. For example, the most pours in a day may occur between 6 PM and 9 PM. The chart may further indicate the most popular liquors. For example, the liquor that is poured the most is Stoli Vodka with 102 total pours.

Figure 40:
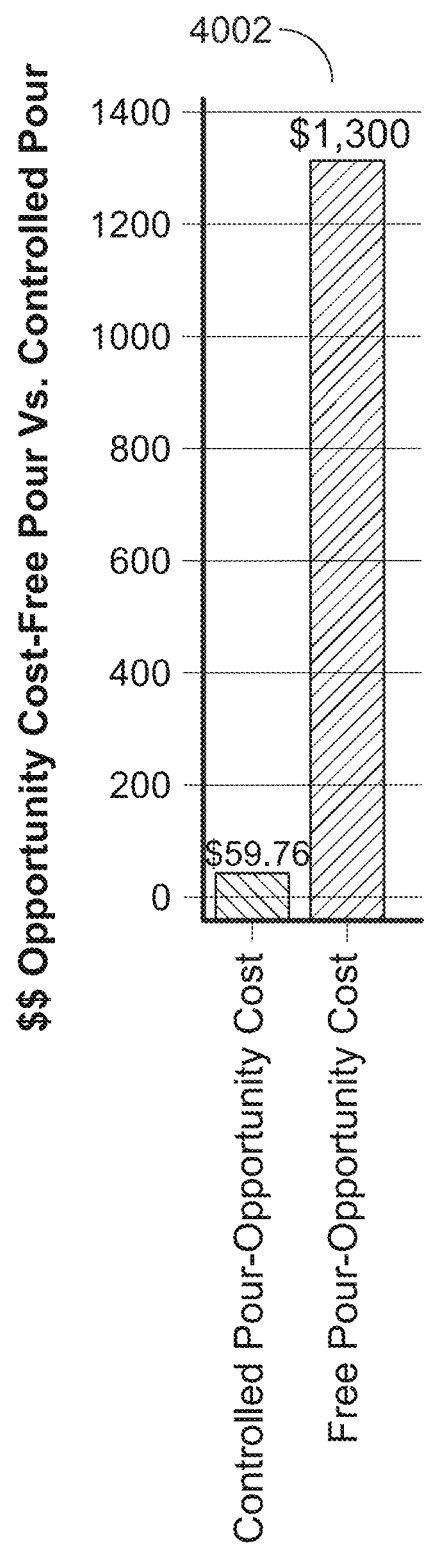
FIG. 40 shows analysis data of the opportunity cost difference between the cost of controlled pours and the cost of free pours over two events in accordance with some embodiments of the present disclosure.

FIG. 40 shows analysis data of the opportunity cost difference 4002 between the cost of controlled pours and the cost of free pours over two events in accordance with some embodiments of the present disclosure. For example, in two days, the system may determine that the total amount of free pours given away cost the venue $1,300.

Figure 41:
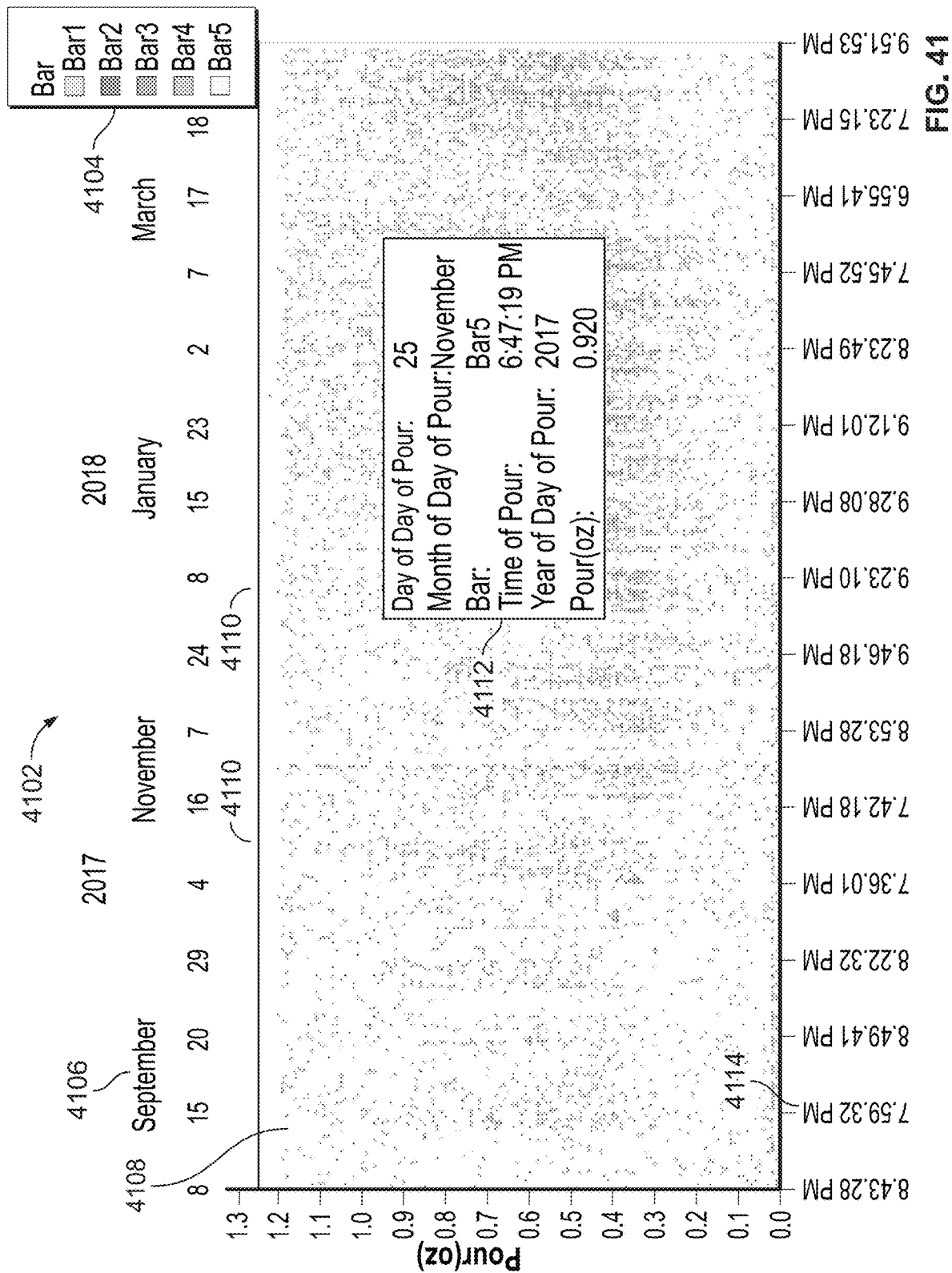
FIG. 41 depicts an exemplary heatmap of a bar operations system by bar in accordance with some embodiments of the present disclosure.

FIG. 41 depicts an exemplary heatmap 4102 of a bar operations system by bar 4104 in accordance with some embodiments of the present disclosure. An x-axis of the heat map may have units of time 4114 and date 4106 while the y-axis may be in units of the volume of pours. Each dot on the heat map signifies a pour for a particular bar 4104 and may be clicked to access specific pour information 4112. What appears to be a solid line 4110 is indicative of 1-ounce pours, which may correspond to the standard pour provided by the beverage control devices.

Figure 42:
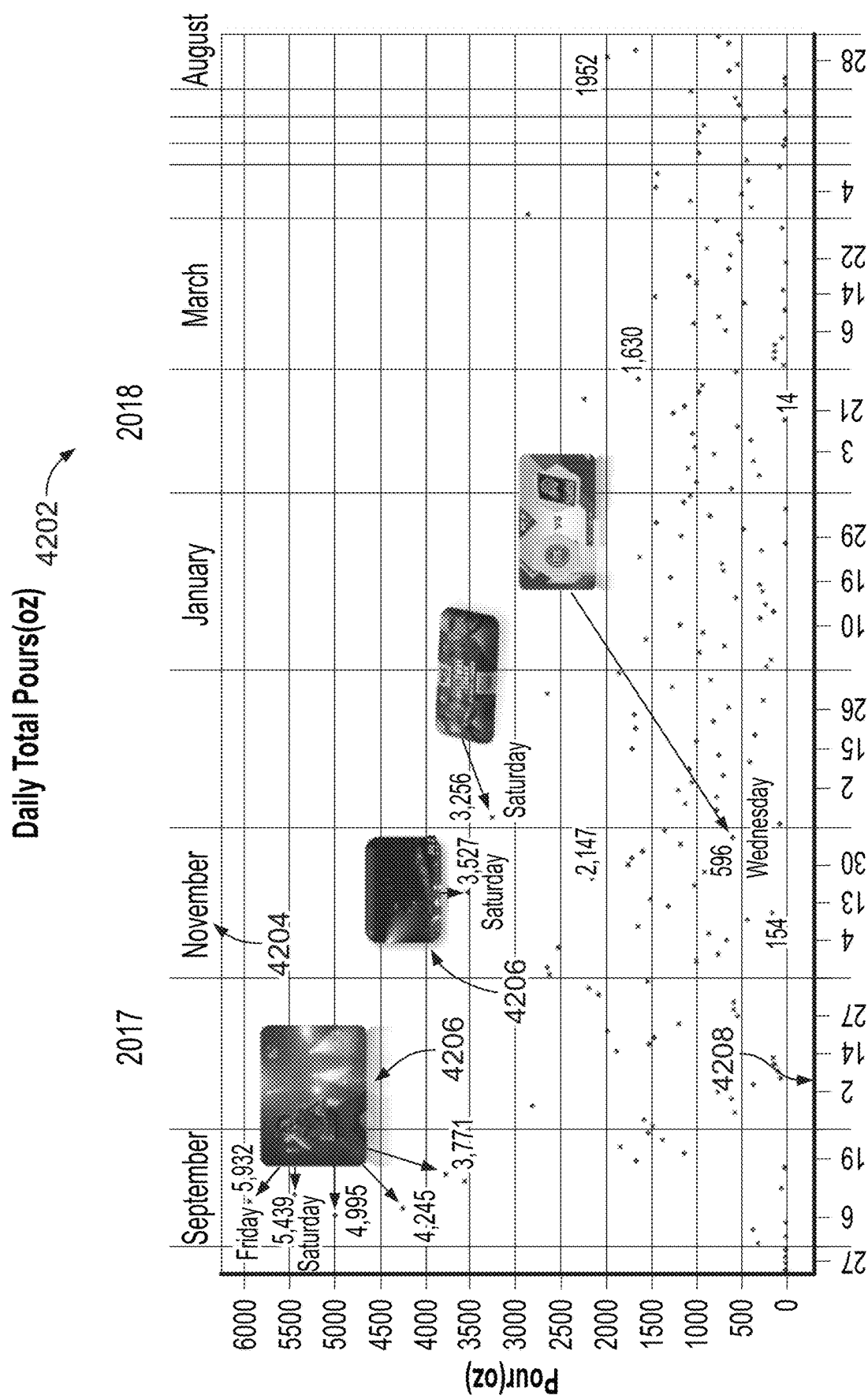
FIG. 42 depicts an exemplary summary report of a bar operations system in accordance with some embodiments of the present disclosure.

FIG. 42 depicts an exemplary summary report 4202 of a bar operations system in accordance with some embodiments of the present disclosure. In the embodiment depicted in FIG. 42, an x-axis timescale may provide day 4208 and month 4204 data, while the y-axis may be in units of total pours by ounces. As can be seen from FIG. 42, the greatest number of pours correspond to days when events 4206 took place in the area of the bar.

Figure 43:
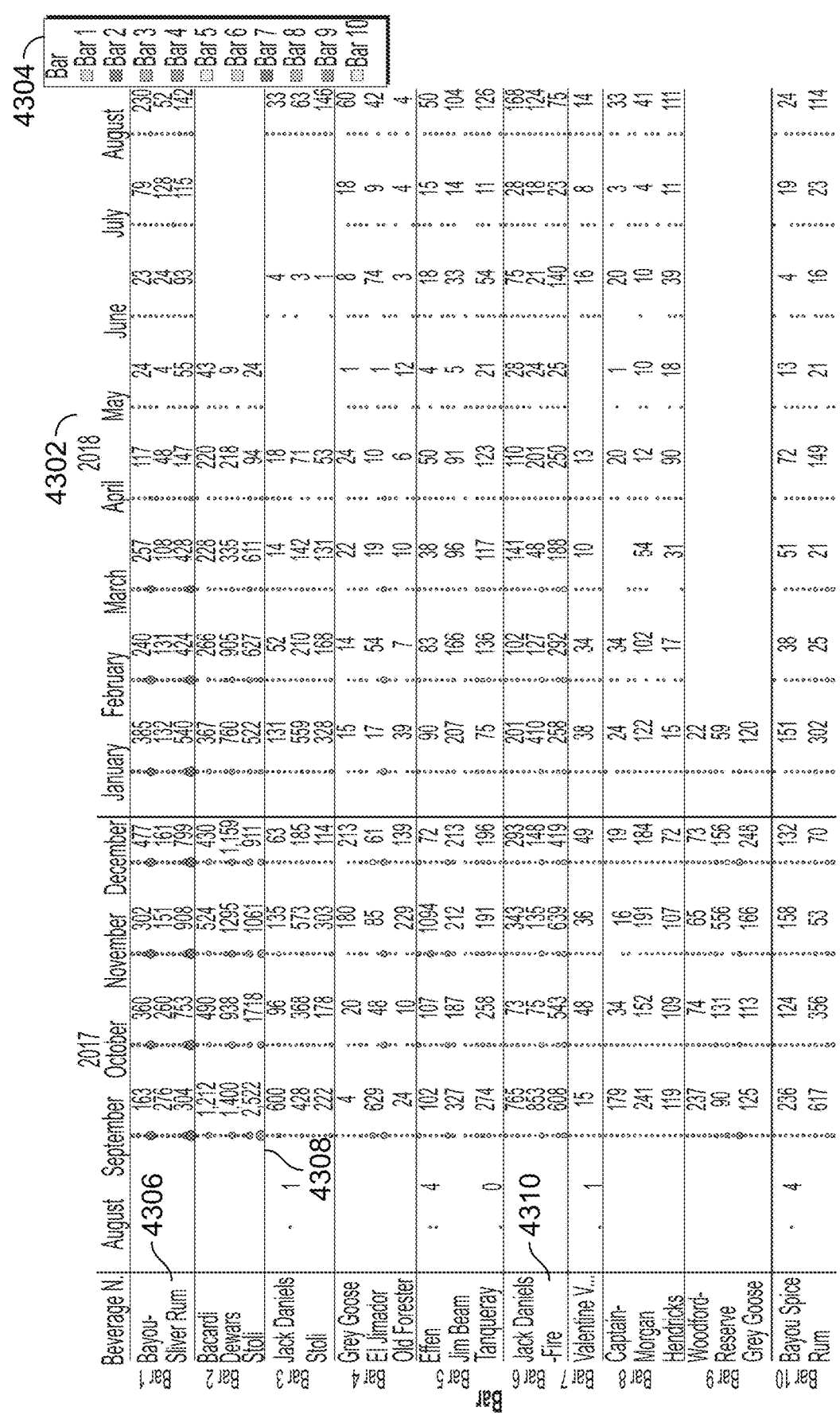
FIG. 43 depicts an exemplary monthly view of a bar operations system by bar in accordance with some embodiments of the present disclosure.

FIG. 43 depicts an exemplary monthly view 4302 of a bar operations system by bar 4304 in accordance with some embodiments of the present disclosure. The y-axis splits out beverages 4310 by bar 4306, while the x-axis depicts pours by month with columns depicting a number of pours and a corresponding visual representation 4308 of the number of pours.

Figure 44:
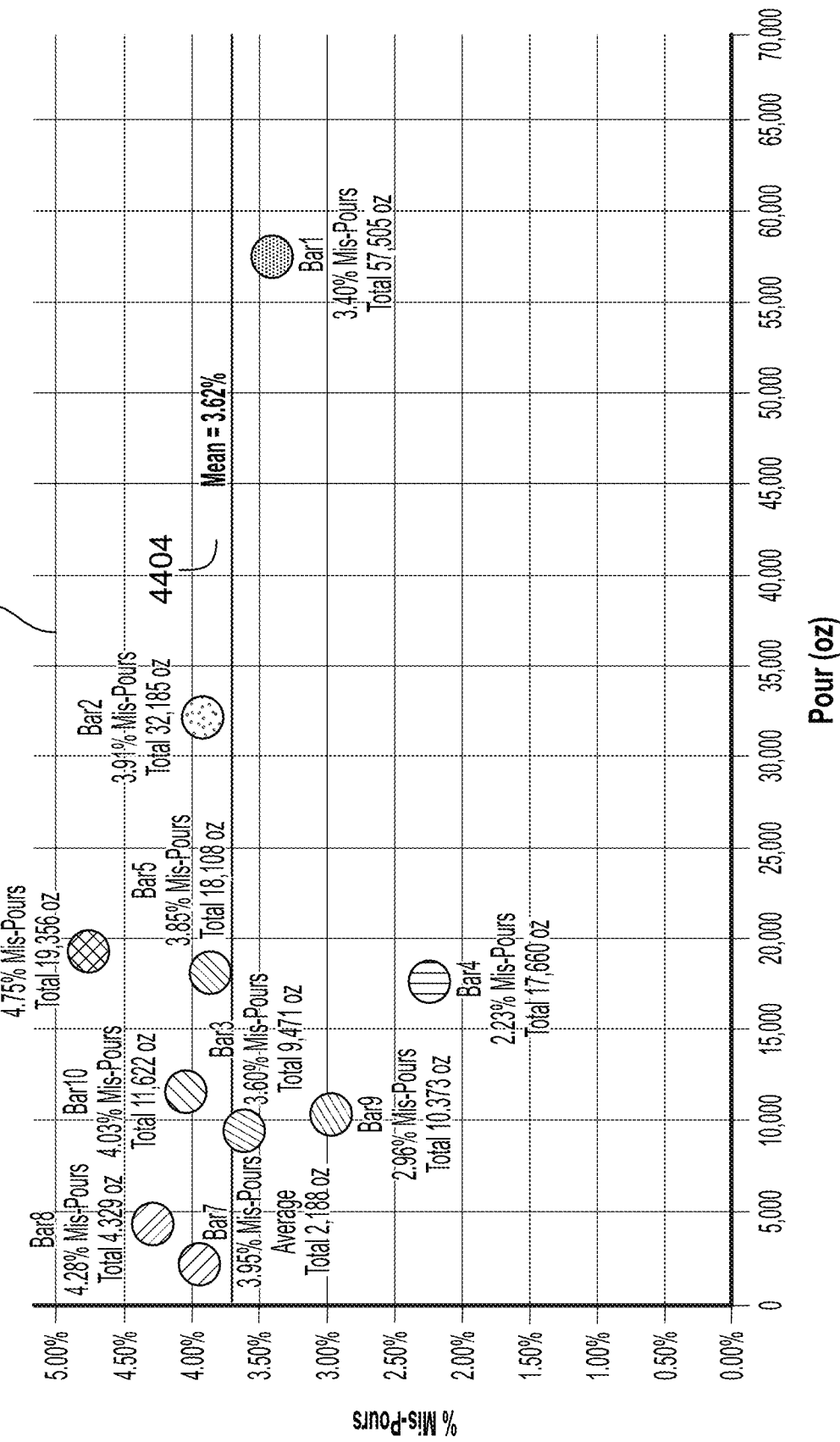
FIG. 44 depicts an exemplary multi-establishment report of pours vs. mis-pours for a bar operations system in accordance with some embodiments of the present disclosure.

FIG. 44 depicts an exemplary multi-establishment report of pours vs. mis-pours 4402 for a bar operations system in accordance with some embodiments of the present disclosure. In the embodiment of FIG. 44, the x-axis aggregates a total volume of pours in ounces for a number of establishments, while the y-axis depicts an associated percentage of mis-pours. Individual establishments are depicted as is a mean value 4404 for all bars.

Figure 45:
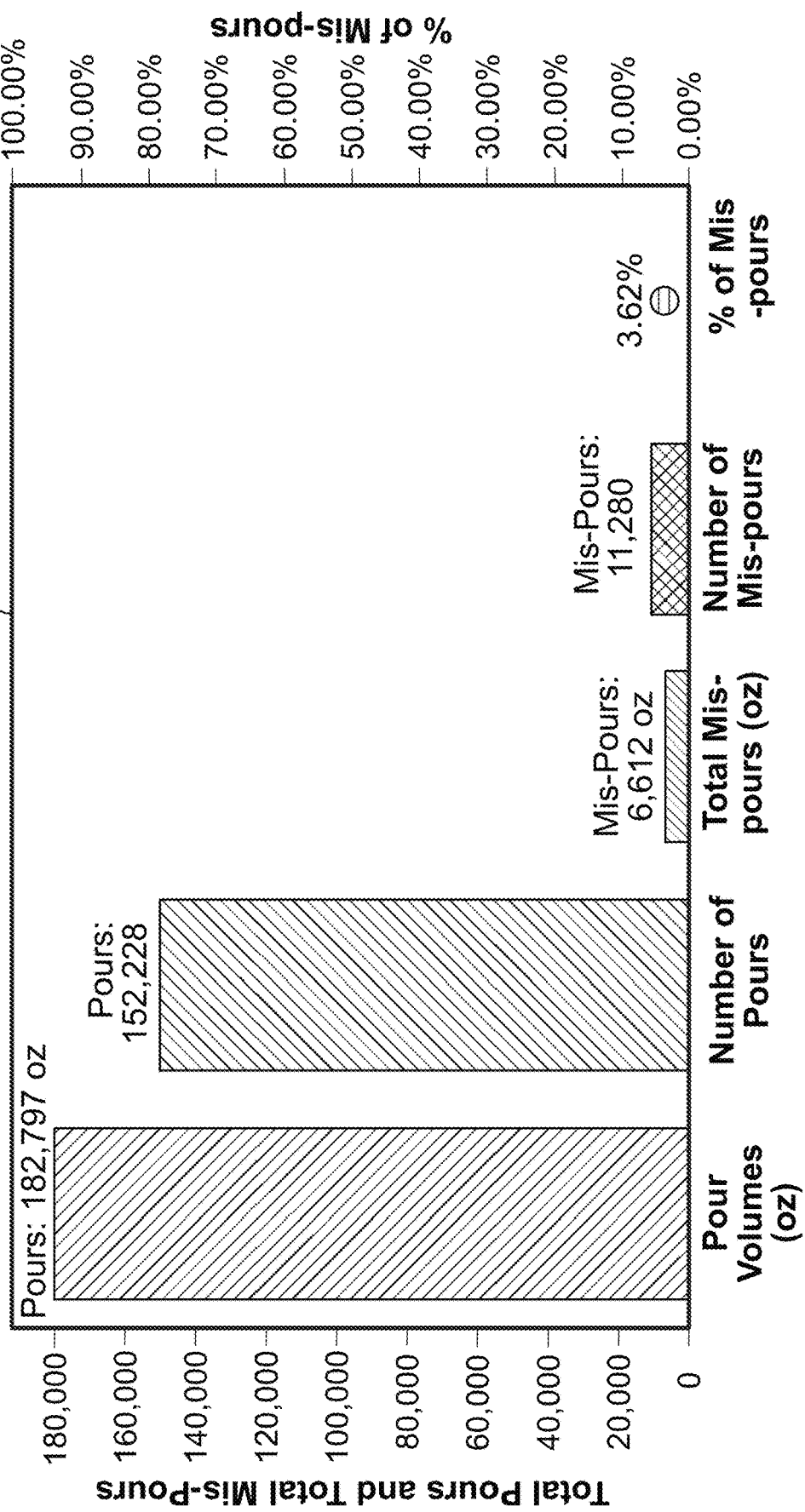
FIG. 45 depicts an exemplary summary report of a bar operations system in accordance with some embodiments of the present disclosure.

FIG. 45 depicts an exemplary summary report 4502 of a bar operations system in accordance with some embodiments of the present disclosure. The summary report aggregates data for number of pours, volume of pours, number of mis-pours, volume of mis-pours, and percentage of mis-pours.

Figure 46:
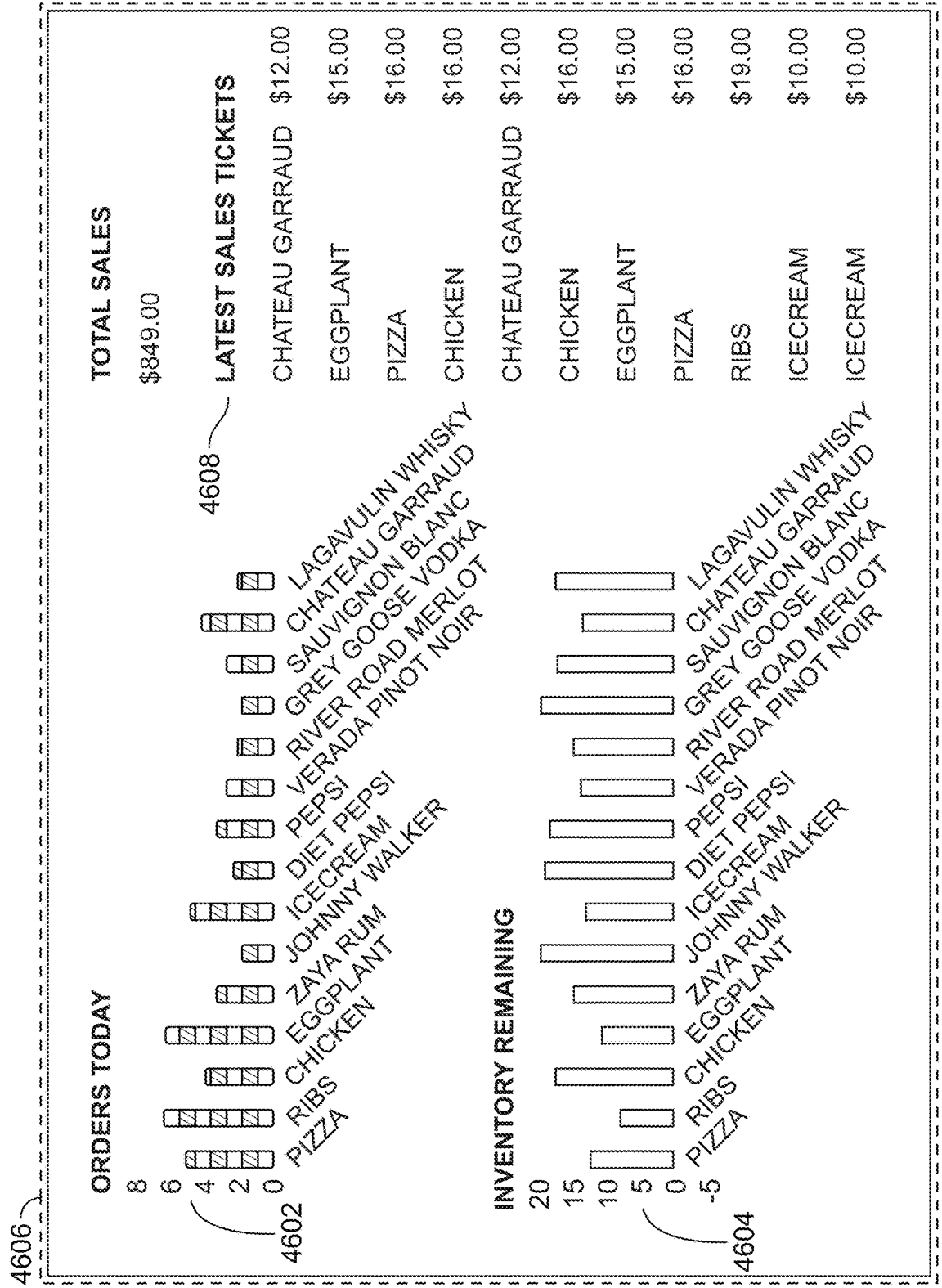
FIG. 46 depicts an exemplary top-level user interface for multi-input data in accordance with some embodiments of the present disclosure.

FIG. 46 depicts an exemplary top-level user interface 4606 for multi-input data in accordance with some embodiments of the present disclosure. For example, FIG. 46 shows an exemplary user interface for orders 4602, inventory 4604, sales, and sales details 4608 in accordance with some embodiments of the present disclosure. This information may be continuously updated during operations based on measured changes, for example, based on point-of-sale information, sensed quantities of inventory ingredients for food items, scrap data, etc.

Figure 47:
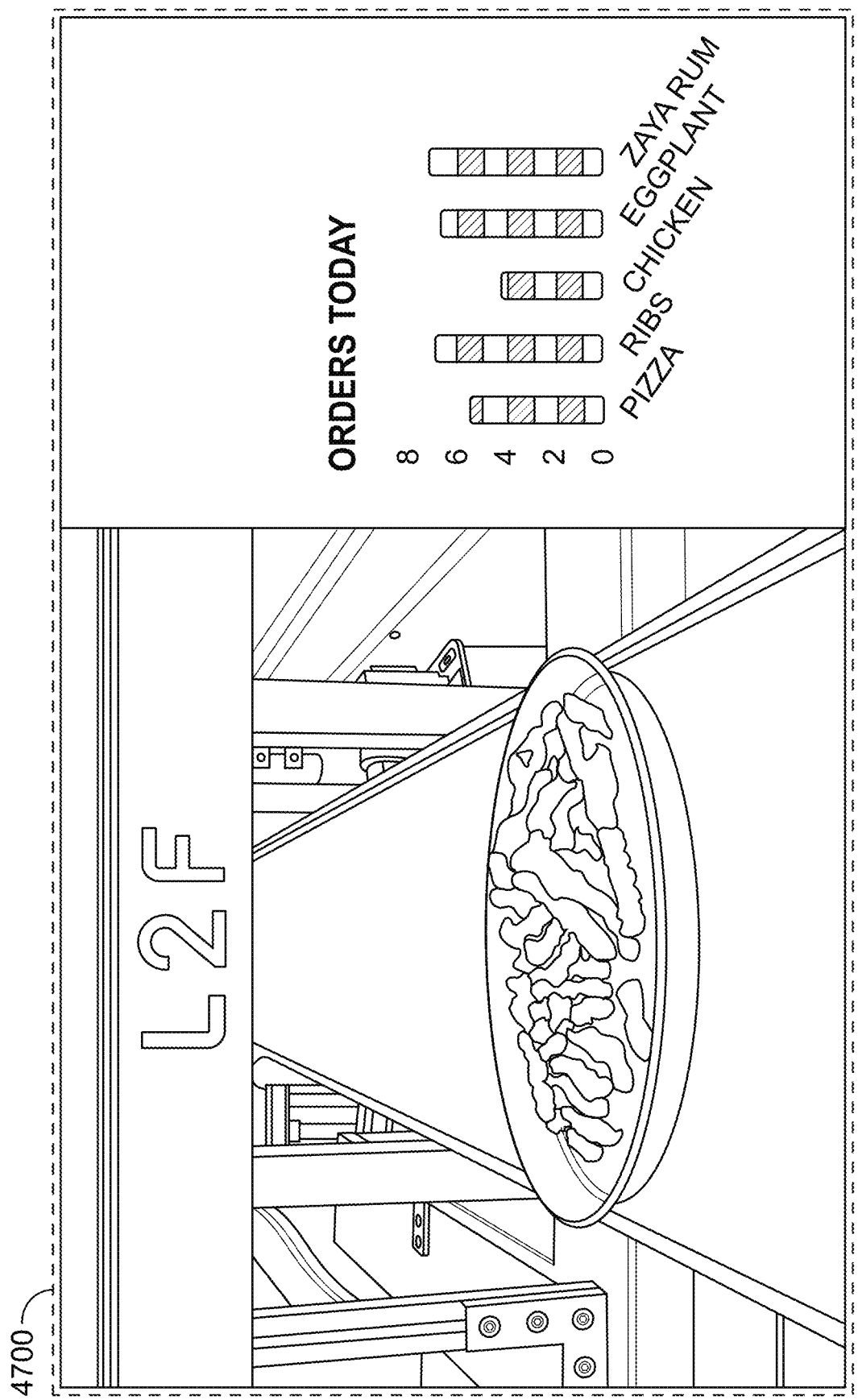
FIG. 47 depicts an exemplary top-level user interface for order aggregation information in accordance with some embodiments of the present disclosure.

FIG. 47 depicts an exemplary top-level user interface for order aggregation information 4702 in accordance with some embodiments of the present disclosure. In the exemplary embodiment of FIG. 47, food items are loaded onto a conveyor of a robotic cooking system, which identifies items, updates order information, performs food preparation operations, delivers the item to appropriate cooking equipment, and provides the completed menu item to another conveyor for distribution to customers.

Figure 48:
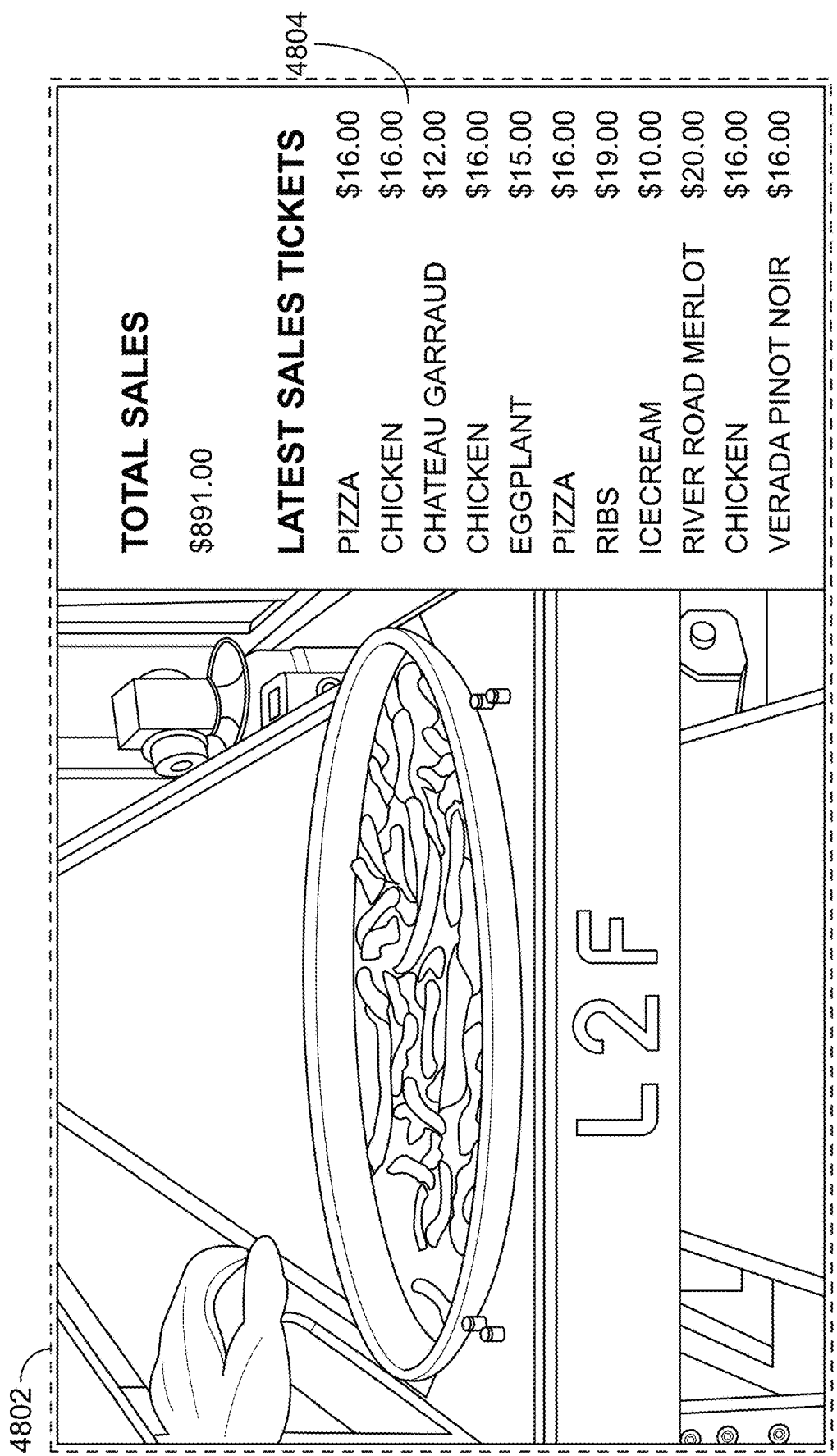
FIG. 48 depicts an exemplary top-level user interface for financial information aggregation in accordance with some embodiments of the present disclosure.

FIG. 48 depicts an exemplary top-level user interface for financial information aggregation 4802 in accordance with some embodiments of the present disclosure. This information may be continuously updated 4804 during operations based on measured changes, for example, based on point-of-sale information, pour data, liquid volume, etc.

FIG. 49 shows an exemplary user interface for inventory control 4902 and 4904 in accordance with some embodiments of the present disclosure. As described herein, a beverage control system may include sensors that monitor and/or control beverage control devices, food preparation equipment, food storage devices, food and beverage inventories, and a variety of other inputs and data sources as described herein. In the exemplary embodiment of FIG. 49, the user interface 4902 to the left depicts a real-time inventory of resources for a number of food and beverage items. The user interface on the right 4904 provides a predictive inventory based on current consumption patterns, indicating, for example, that chicken and Diet Pepsi are likely to fall below required thresholds while Zaya Rum is likely to run out of stock absent corrective action.

Figure 50:
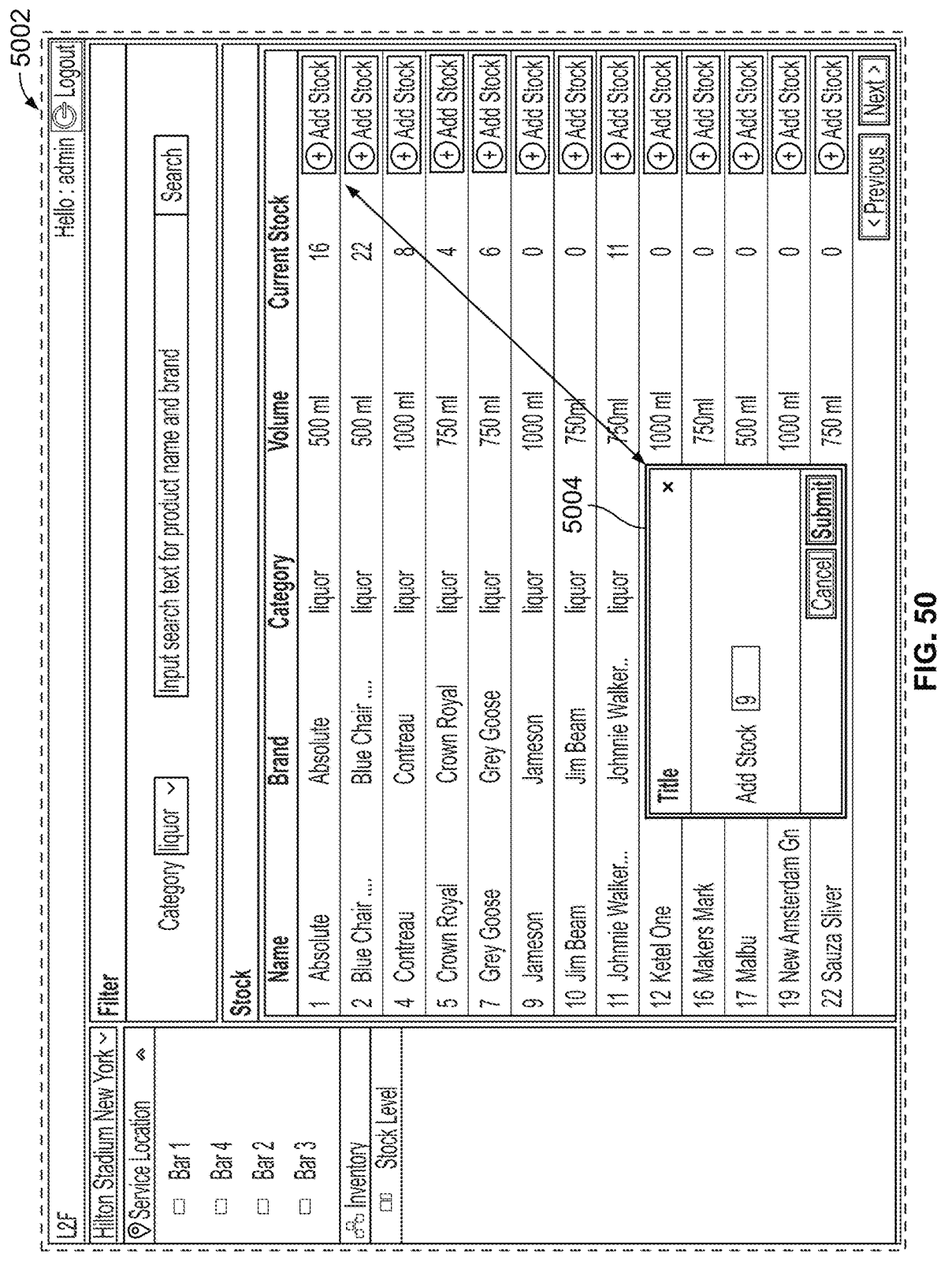

FIG. 50 shows an exemplary user interface for inventory management in accordance with some embodiments of the present disclosure. For example, FIG. 50 shows an exemplary user interface 5002 for a customized login per location and per establishment to access information such as a pour dashboard, reports, and inventory management in accordance with some embodiments of the present disclosure. This information may be continuously updated in the servR website during operations based on categories, such beverage name, brand, category, volume, and the like. An interface for indicating or viewing the addition of stock 5004 may be easily accessed through this interface.

FIG. 51 shows an exemplary user interface for inventory management in accordance with some embodiments of the present disclosure. For example, FIG. 51 shows an exemplary user interface 5102 for inventory management based on categories in accordance with some embodiments of the present disclosure. This information may be continuously updated by the beverage operations software during operations based on beverage name, brand, category, volume, and stock levels. For example, information based on specific categories can be displayed and used to update inventory.

A number of data collection, aggregation, analysis, machine learning, and artificial intelligence techniques may be utilized in a beverage control system. In some embodiments, K-means cluster analysis is applied to a bar operations system. Data clustering can be associated with pour data, mis-pour data, financial information, and other data as described herein. Data clustering shows visually and quantitatively the statistics (average, confidence levels) for pours as well as the deviations for specific orders.

In an exemplary embodiment of data acquisition for AI, the system may collect information such as the quantity of beverage ordered, customer data, amount charged, and pour data. For each pour that occurs at a bar, the pour amount can be captured and relayed by the beverage control device via the gateway to the fog server where the captured pour amount goes through a data classification to determine if the pour amount is a set pour and it matches the charge for the order. For example, a customer may order a drink associated with a recipe that lists two ounces of whiskey. The system may log and display the two ounces of whiskey needed to complete the order and may further provide an indication that the customer's order was completed. The data indicating a completed order may also indicate a mis-pour occurred. In response to a mis-pour, in some embodiments, the system determines the amount the overpoured liquor would have cost. For example, if a bar sells one ounce of whiskey for $4 and the bartender has overpoured by half an ounce, the system may determine that the overpour cost $2.

The AI system may remotely stop beverage pours made in error (e.g., beverage mis-pours) after a set percentage or set amount per pour by monitoring the pours, or based on other criteria as described herein. In this way, a certain margin of beverage mis-pours attributed to customer loyalty top-offs may be allowed at the establishment's discretion (e.g., complimentary pours).

The AI system may provide feedback and feed-forward correction of beverage pour errors (e.g., mis-pours) and beverage dispensing controls. The system may also provide process control for beverage pours. For example, pour patterns may be analyzed by bartender and messages such as auto-stop messages may be transmitted from the fog or cloud server to the beverage control device by sending a signal to the embedded processor within the device, thus preventing any overpours or mis-pours and requiring only complete pours.

The system may perform predictive maintenance of the beverage control device. Examples of maintenance triggers include a low or empty battery on a beverage control device, tampering or removal of the beverage control device on the bottle, incorrectly associated beverage control devices, low or empty bottle content, exceeding a number of pours for the beverage control device, etc. For example, the beverage control device may be equipped with sensors, processors, and communication chips that allow it to send an alert to a gateway device when its battery is less than 10% of its maximum capacity. Predictive maintenance may be based on aggregated data at the entity level or industry level to optimize predictive maintenance routines.

The system may remotely, from the cloud, identify and push desired recipes for pouring various beverages. In some embodiments, the desired recipes may be custom recipes or standard recipes that have been modified. For example, a customer may tell a bartender to follow a recipe for a new cocktail and, in response, the bartender may be able to upload the custom recipe to the cloud-based database of recipes. In this way, the pours of liquor used for this recipe will not appear to be mis-pours that do not follow an existing recipe. In one embodiment, the customer may decide to swap one liquor for another, and this swap can be tracked in the database of recipes in the cloud. For example, a customer may order a Vodka Collins instead of a Tom Collins that usually has gin. The bartender can modify the recipe to log that the pour of vodka instead of gin is not a mis-pour. Furthermore, the customer may be charged the appropriate amount corresponding to the custom recipe. In the example using the Vodka Collins, the customer may be charged appropriately for the swap of vodka for gin.

The system may automatically pair bottles to beverage control devices using suitable sensors to identify bottle labels. For example, the bottle may be embedded with an RFID tag that may be read by a beverage dispense device. In another example, the gateway device may use an embedded camera to scan a QR code placed on the label of the bottle to identify which beverage is associated with the attached beverage control device.

The system may analyze the beverage pour data to predict evolving tastes. For example, the pour data collected may show that there was a drop in pouring white rum. The system may combine the pour data with inventory data to show that the level of coconut milk or cream has not decreased for a certain period. The system can then determine more accurately that cocktails such as piña coladas are not as popular during colder months. The system may additionally analyze drink inventory or customer orders across bars to predict changing tastes. For example, the data collected may show an increased trend in ordering drinks low in sugar (e.g., ketogenic drinks following a trending diet regimen). The system may further recommend drinks to conform to the evolving tastes. The system may identify that a customer, using a customer ID associated with his orders, has been ordering drinks with reduced sugar and in response, provide recommendations for various drinks that conform to the customer's dietary restrictions.

The system may use the beverage pours at locations to forecast emerging drink trends according to location, demographic, region, etc. A bartender in Kentucky may be more likely to stock bourbon because of the localized specialty in producing bourbon. If the beverage pours in Kentucky begin to trend away from bourbon, the unlikely trend is captured by the beverage pours and allows for the bar owner to take corrective action (e.g., order less bourbon).

The system may use social media in the predictive analytics used to manage store inventory, recommend drinks, create events to host at a venue, etc. For example, social media may reflect diet trends, which in turn may be used by bar owners to shape their inventory and menu. In another example, social media may show high attendance for weekly Friday night comedy shows in a neighborhood. A bar owner can use this data to determine that his bar near the comedy club needs to have more liquor, staff, kitchen supplies, etc.

In some embodiments, a component of the system may be offline (e.g., disconnected from the communication network). For example, if a pour sensor is located outside of the wireless reception range of the gateway device, it may store the data it has collected in local memory. Once it has reconnected to the communication network, it may transmit its locally stored data to the gateway device. The pour sensor may be instructed to attempt a certain number of times to contact the gateway device before storing the data locally.

In some embodiments, beverage containers may comprise sensors that are also communicatively interfaced with the gateway device. For example, a level sensor embedded within a wine glass may detect that the wine is nearly or fully consumed. Upon this exemplary detection, the sensor may communicate with an embedded processor and communications device to send an alert to the gateway device or a wearable device. In some embodiments, a customer ID may be associated with a beverage container. The bartender may have a wearable device (e.g., on the wrist or in AR glasses) that is enabled to wireless communicate to the beverage container system. The beverage container system may then transmit information to the wearable device indicating to the bartender that the beverage belonging to that customer ID is fully or nearly consumed.

Due to the connection over the cloud, the analysis and recommendation of beverages may take into account a global taste palette. For example, the system may connect bars in the U.S. with a bar in Japan. A customer in San Francisco may be recommended a trending cocktail recipe in Tokyo due to his preference for rice wines.

The predictive analysis referenced herein may be accomplished through linear regression, logistic regression, K-means, K-Nearest Neighbors (KNN) algorithm, time-series forecasting, any suitable supervised or unsupervised learning technique, or any combination thereof.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for modifying operation of a beverage control device comprising:
   receiving, from each of a plurality of beverage control devices of an establishment, beverage pour data;
   determining, based on the beverage pour data from the plurality of beverage control devices, whether a number of mis-pours for the establishment exceeds a threshold;
   generating, based on a determination that the number of mis-pours for the establishment exceeds the threshold, an instruction to limit flow for a particular beverage control device; and
   transmitting the instruction to the particular beverage control device, wherein the instruction limits the flow of the particular beverage control device.

2. The method of claim 1, wherein the instruction is determined based on data obtained from a Point-of-Sale (POS) system.

3. The method of claim 1, wherein the beverage pour data comprises the number of pours by beverage, pours by bar, pours by time, pours by location, or pours by volume.

4. The method of claim 1, wherein receiving beverage pour data comprises receiving beverage pour data associated with an employee.

5. The method of claim 4, wherein the association with the employee comprises an employee identifier.

6. The method of claim 1, wherein receiving beverage pour data comprises receiving beverage pour data associated with a customer.

7. The method of claim 6, wherein the association with the customer comprises a customer ID.

8. The method of claim 1, wherein receiving beverage pour data comprises receiving beverage pour data associated with secondary beverage information.

9. The method of claim 8, wherein the secondary beverage information comprises bottle location information, wherein the bottle location information is based on information from one or more additional sensors.

10. The method of claim 1, further comprising modifying an operation of a second particular beverage control device, wherein the modification comprises enabling liquid flow, preventing liquid flow, controlling quantity of liquid flow, or controlling flow rate in response to an error criteria for the second particular beverage control device being met, wherein the error criteria corresponds to at least one of a volume of a pour exceeding an allotted pour volume or a number of pours exceeding an allotted pour count per time period.

11. The method of claim 1, wherein the instruction is based on a plurality of bottles required for a customer order, wherein the particular beverage control device is associated with one of the plurality of bottles for the customer order.

12. The method of claim 1, further comprising:
generating a second instruction to update an inventory; and
transmitting the second instruction to update the inventory.

13. The method of claim 1, further comprising:
generating a second instruction to modify an the operation of a secondary device; and
transmitting the second instruction to the secondary device.

14. The method of claim 13, wherein the secondary device is a wearable electronic device associated with an employee.

15. The method of claim 14, wherein the operation of the secondary device comprises granting employee authorization.

16. The method of claim 13, wherein the secondary device is a customer-facing electronic device associated with a customer.

17. The method of claim 16, wherein the operation of the secondary device comprises granting customer authorization.

18. The method of claim 13, wherein the operation of the secondary device comprises granting access to a location.

19. The method of claim 1, wherein generating the instruction is further based on establishment-level data analysis that corresponds to a characterization of at least one of a number of mis-pours or a volume of mis-poured beverage.

20. The method of claim 19, wherein establishment-level data analysis comprises analysis of pours, pricing, over-pours, time of pours, type of beverage, employee information, customer information, point-of-sale information, or other sensor information.

21. The method of claim 1, wherein determining the instruction is further based on entity-level data analysis.

22. The method of claim 21, wherein entity-level data analysis comprises analysis of establishment-level data from a plurality of establishments associated with the entity and additional data external to the plurality of establishments.

23. The method of claim 1, wherein determining the instruction is further based on industry-level data analysis.

24. The method of claim 23, wherein industry-level data analysis comprises analysis of entity-level data from a plurality of entities associated with the industry and additional data external to the plurality of entities.

25. The method of claim 1, wherein determining the instruction is further based on predictive analysis.

26. The method of claim 25, wherein the predictive analysis comprises beverage recommendations.

27. The method of claim 25, wherein the predictive analysis comprises modifications to a plurality of beverage types or quantities of beverage pours.

28. The method of claim 25, wherein the predictive analysis is based on social media data.

29. The method of claim 1, further comprising calculating a forecasted trend using a Naive Bayes classification.

30. The method of claim 1, further comprising calculating a forecasted trend using time series forecasting.

31. The method of claim 1, wherein the instruction comprises a predictive maintenance instruction for the particular beverage control device.

32. The method of claim 1, wherein the instruction comprises information to provide to an employee associated with the device.

33. The method of claim 1, wherein determining the instruction comprises analyzing data using K-means cluster analysis.

34. The method of claim 1, wherein determining an instruction comprises analyzing data using linear regression.

35. The method of claim 1, further comprising:
receiving, from a POS system, an order associated with a customer, wherein the order comprises a requested set of items;
determining that the particular beverage control device is associated with a particular item of the requested set of items;
comparing, from beverage pour data of the particular beverage control device, a poured volume of liquid and a predetermined volume of the liquid for the particular item;
determining, from the comparison, if a mis-pour was made; and
in response to determining that a mis-pour was made:
transmitting an alert; and
storing a record of the mis-pour.

36. The method of claim 1, further comprising:
receiving, from a POS system, a dollar amount charged to a customer;
calculating a dollar amount associated with beverage pour data of the particular beverage control device;
comparing the dollar amount charged to the customer and the dollar amount associated with the beverage pour data;
determining, from the comparison, if a mis-pour was made; and
in response to determining that a mis-pour was made:
transmitting an alert; and
storing a record of the mis-pour.

37. The method of claim 1, further comprising calculating a forecasted trend based on a result of a machine learning algorithm trained based on enterprise-level data or industry-level data.

38. The method of claim 37, wherein the training comprises supervised machine learning based on a secondary data source.

39. A beverage operations system, comprising:
- a wireless communication interface configured to wirelessly communicate with a plurality of beverage control devices;
- a memory comprising instructions stored thereon; and
- a processor coupled to the communication interface and the memory, wherein the processor is configured to execute the instructions to:
- receive, from each of the plurality of beverage control devices of an establishment, beverage pour data;
- determine, based on the beverage pour data from the plurality of beverage control devices that indicates whether a number of mis-pours for the establishment exceeds a threshold, an instruction for a particular beverage control device;
- generate, based on a determination that the pour data indicates the number of mis-pours for the establishment exceeds the threshold, an instruction to limit flow for a particular beverage control device; and
- transmit the instruction to the particular beverage control device, wherein the instruction limits the flow of the particular beverage control device.

40. A non-transitory computer-readable medium having instructions stored thereon, that when executed by a processor of a beverage operations system case the processor to perform operations comprising:
- receiving, from each of a plurality of beverage control devices of an establishment, beverage pour data;
- determining, based on the beverage pour data from the plurality of beverage control devices that indicates whether a number of mis-pours for the establishment exceeds a threshold, an instruction for a particular beverage control device;
- generate, based on a determination that the pour data indicates the number of mis-pours for the establishment exceeds the threshold, an instruction to limit flow for a particular beverage control device; and
- transmitting the instruction to the particular beverage control device, wherein the instruction limits the flow of the particular beverage control device.

* * * * *

UNITED STATES PATENT AND TRADEMARK OFFICE
CERTIFICATE OF CORRECTION

| | |
|---|---|
| PATENT NO. | : 11,673,788 B2 |
| APPLICATION NO. | : 16/780793 |
| DATED | : June 13, 2023 |
| INVENTOR(S) | : Rao et al. |

It is certified that error appears in the above-identified patent and that said Letters Patent is hereby corrected as shown below:

In the Claims

In Column 29, Claim 13, Line 41, delete "an the" and insert -- an --, therefor.

Signed and Sealed this
Twelfth Day of September, 2023

*Katherine Kelly Vidal*

Katherine Kelly Vidal
*Director of the United States Patent and Trademark Office*